(12) United States Patent
Bø

(10) Patent No.: US 11,500,115 B2
(45) Date of Patent: Nov. 15, 2022

(54) SEISMIC DATA INTERPRETATION SYSTEM

(71) Applicant: Schlumberger Technology Corporation, Sugar Land, TX (US)

(72) Inventor: Trond Hellem Bø, Randaberg (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/973,332

(22) PCT Filed: Jun. 7, 2019

(86) PCT No.: PCT/US2019/036032
§ 371 (c)(1),
(2) Date: Dec. 8, 2020

(87) PCT Pub. No.: WO2019/241062
PCT Pub. Date: Dec. 19, 2019

(65) Prior Publication Data
US 2021/0247534 A1   Aug. 12, 2021

Related U.S. Application Data

(60) Provisional application No. 62/683,011, filed on Jun. 10, 2018.

(51) Int. Cl.
*G01V 1/30* (2006.01)
*G06N 3/08* (2006.01)

(52) U.S. Cl.
CPC ............. *G01V 1/302* (2013.01); *G06N 3/08* (2013.01); *G01V 2210/64* (2013.01)

(58) Field of Classification Search
CPC .......... G01V 1/302; G01V 1/306; G01V 1/50; G01V 2210/64; G06N 3/08; G06N 3/0445; G06N 3/0481; G06N 20/10; G06N 20/20; G06N 5/003
See application file for complete search history.

(56) References Cited

U.S. PATENT DOCUMENTS

| 5,870,691 A | 2/1999 | Partyka et al. |
| 2001/0037178 A1 | 11/2001 | Bush |

(Continued)

FOREIGN PATENT DOCUMENTS

| CN | 103400021 A | * 11/2013 | ............. G06F 19/00 |
| KR | 101706245 | 2/2017 | |

(Continued)

OTHER PUBLICATIONS

International Preliminary Report on Patentability of International Patent Application No. PCT/US2019/036032 dated Dec. 15, 2020.

(Continued)

*Primary Examiner* — Tarun Sinha
*Assistant Examiner* — Lal C Mang

(57) ABSTRACT

A method can include accessing a trained machine model as trained to analyze digital seismic data of a region with respect to a structural feature of a geologic region; analyzing at least a portion of the digital seismic data using the trained machine model to generate results; and outputting the results as indicators of spatial locations of the structural feature of the geologic region.

20 Claims, 35 Drawing Sheets

Pseudo tracking algorithm:      Method 3300

Learn prediction model based on input points and surrounding data as positive and negative examples For each point in input points:
    Mark trace as tracked
    Add point to output points For each point in input points:
    For each neighbour trace:
        If(trace not tracked already)
            For each minima or maxima within vertical window (for instance [-5, +5] samples up/down)
                Evaluate candidate point with model and put in priority queue While more points in priority queue with score above confidence threshold (for instance 0.5)
    Take out first point in priority queue
    Add point to output points
    Mark trace as tracked
    For each neighbour trace:
        If(trace not tracked already)
            For each minima or maxima within vertical window (for instance [-5, +5] samples up/down)
                Evaluate candidate point with model and put in priority queue Return output points

(56) References Cited

U.S. PATENT DOCUMENTS

| | | | | |
|---|---|---|---|---|
| 2004/0071363 | A1* | 4/2004 | Kouri | G06K 9/36 |
| | | | | 382/276 |
| 2010/0161232 | A1 | 6/2010 | Chen et al. | |
| 2011/0311129 | A1* | 12/2011 | Milanfar | G01V 1/34 |
| | | | | 702/16 |
| 2013/0064040 | A1* | 3/2013 | Imhof | G01V 1/30 |
| | | | | 367/73 |
| 2013/0345985 | A1 | 12/2013 | Priezzhev et al. | |
| 2014/0043938 | A1* | 2/2014 | Sinha | G01V 1/50 |
| | | | | 367/31 |
| 2016/0313463 | A1 | 10/2016 | Wahrmund et al. | |
| 2017/0254910 | A1 | 9/2017 | Can et al. | |

FOREIGN PATENT DOCUMENTS

| | | | | |
|---|---|---|---|---|
| WO | WO-2017206157 | A1 * | 12/2017 | ............. E21B 44/02 |
| WO | WO2017206157 | A1 | 12/2017 | |

OTHER PUBLICATIONS

Search Report and Written Opinion of International Patent Application No. PCT/US2019/036032 dated Sep. 27, 2019, 9 pages.
Glinsky, M. E. et al., "Automatic event picking in prestack migrated gathers using a probabilistic neural network", Geophysics, 2001, 66(5), pp. 1488-1496.
Extended European Search Report issued in European patent Application No. 19820565.0 dated Jan. 28, 2022, 6 pages.

\* cited by examiner

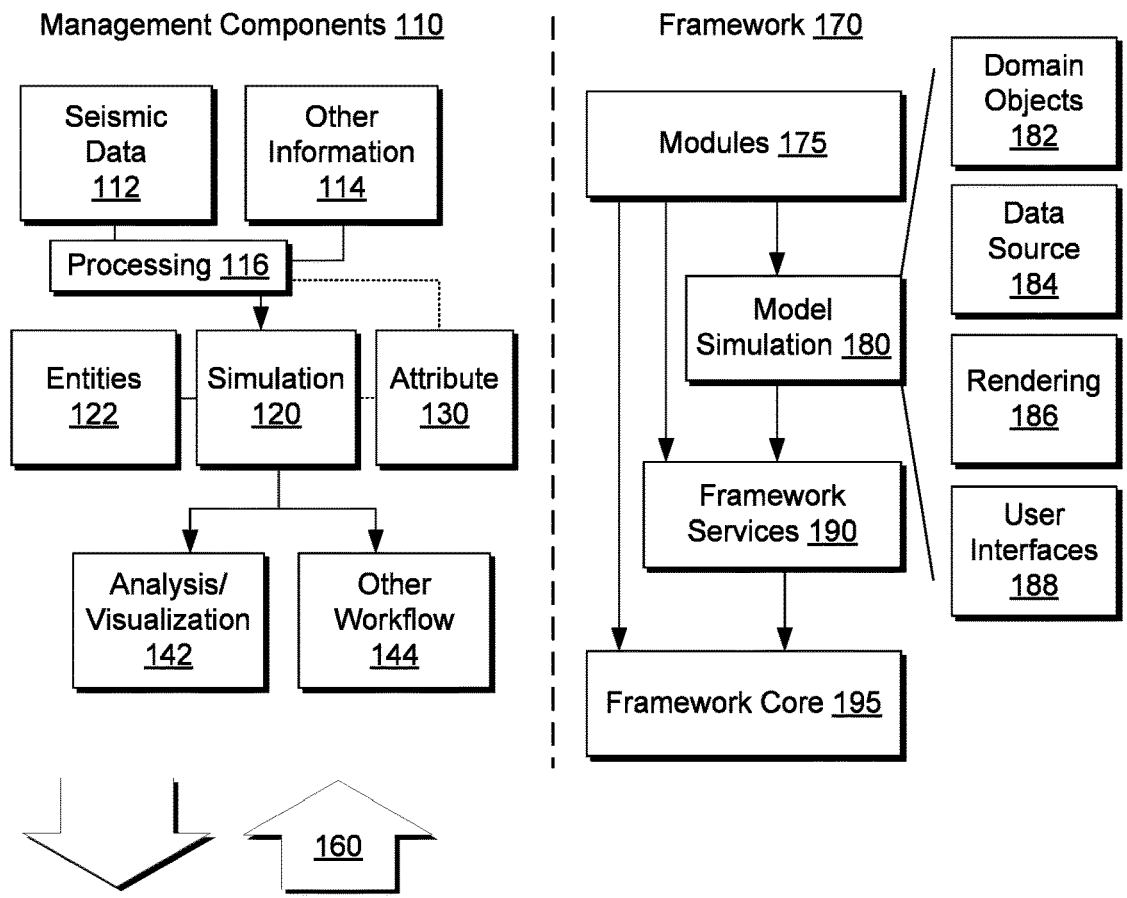
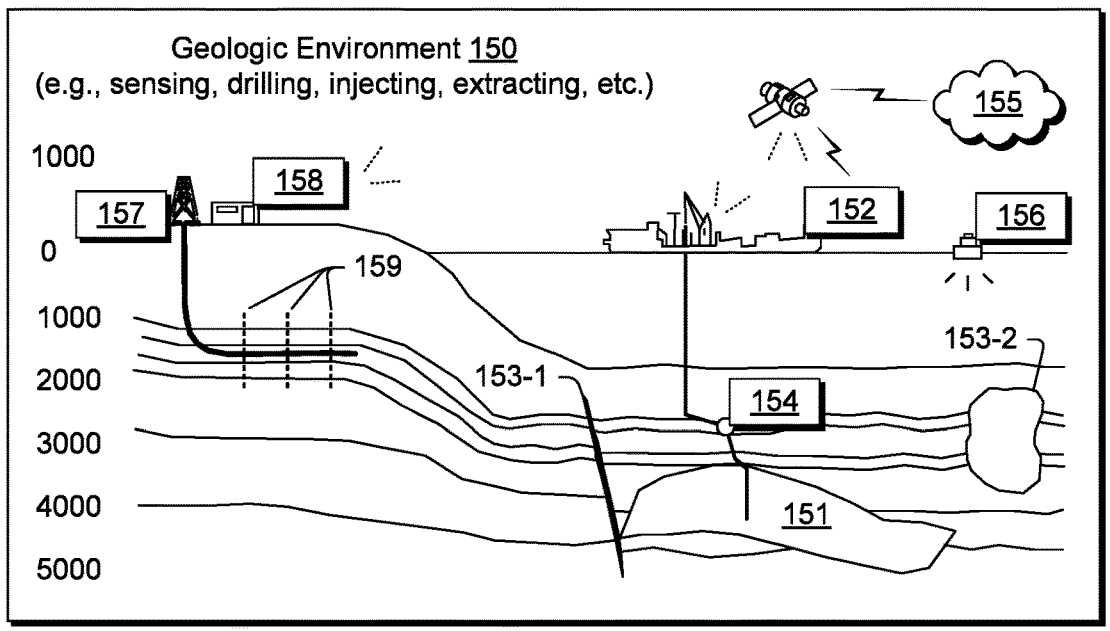
Fig. 1

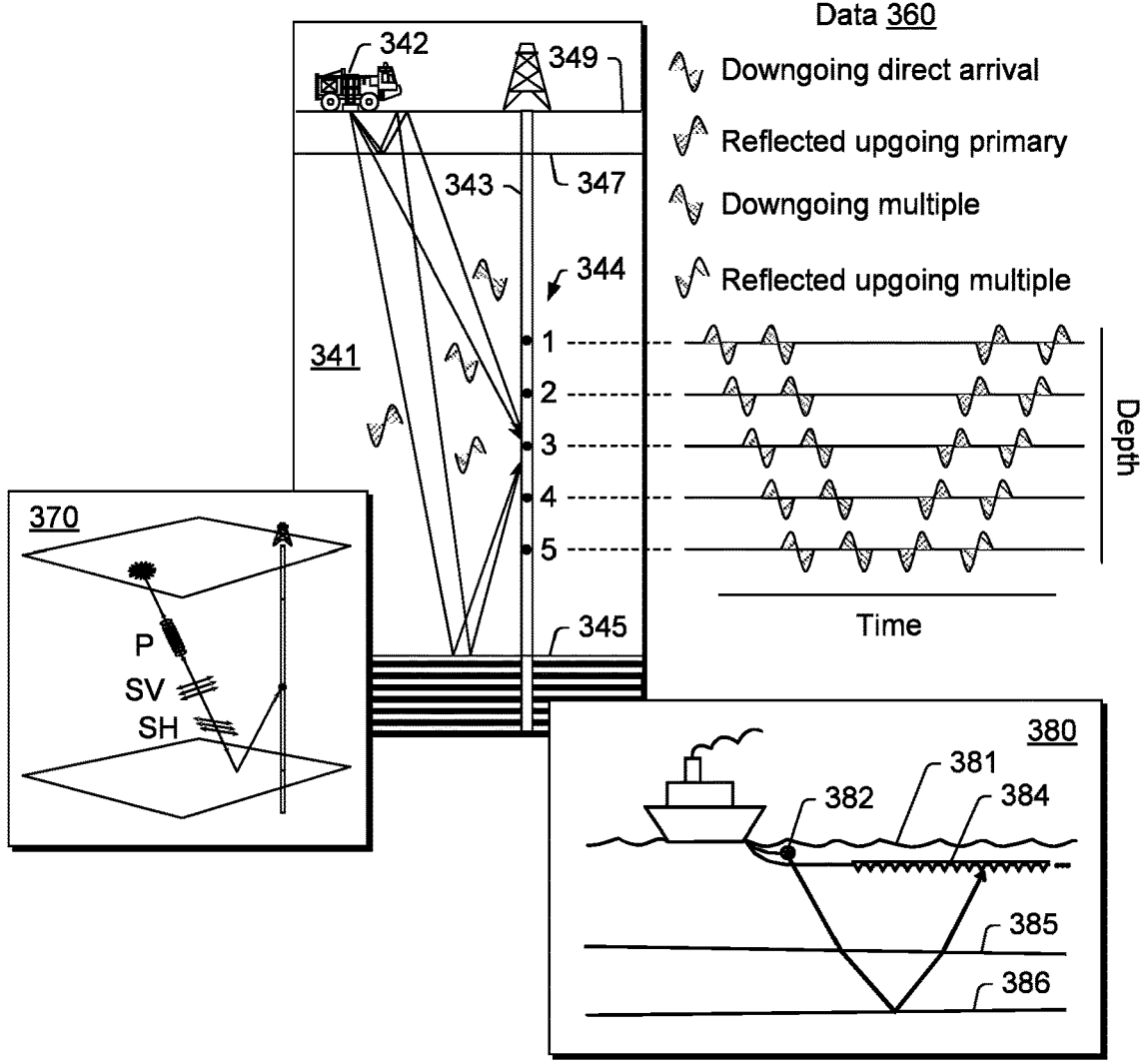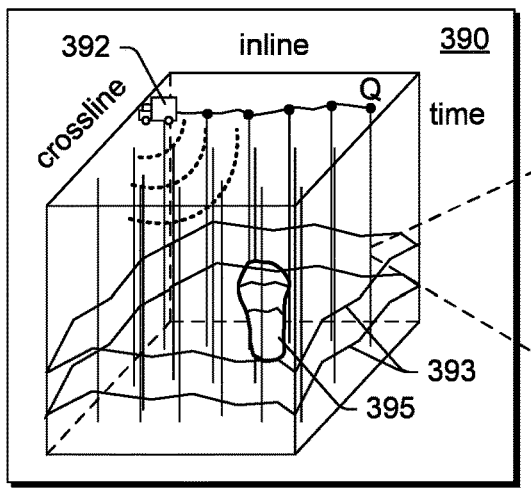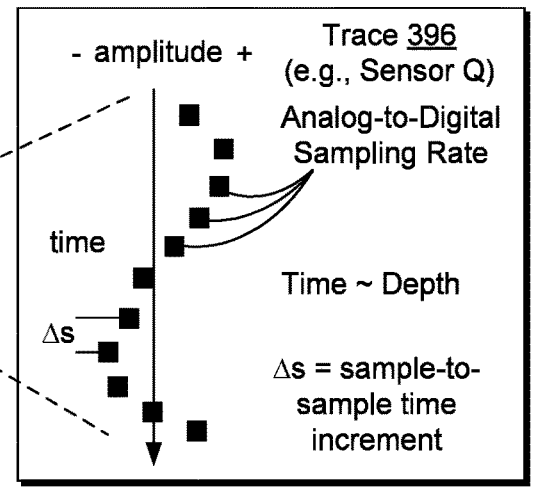
Fig. 3

GUI 2200

Method 2800
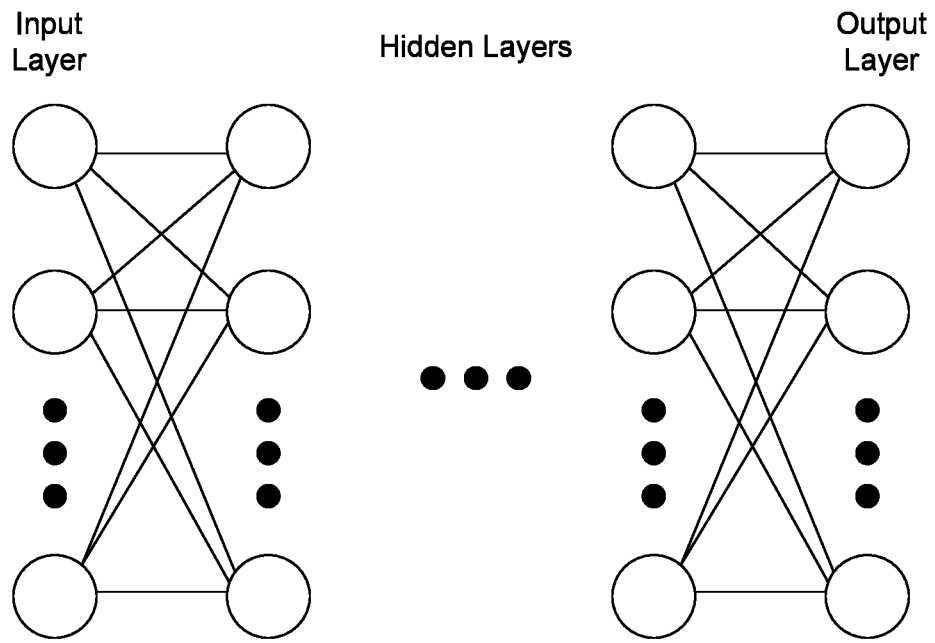
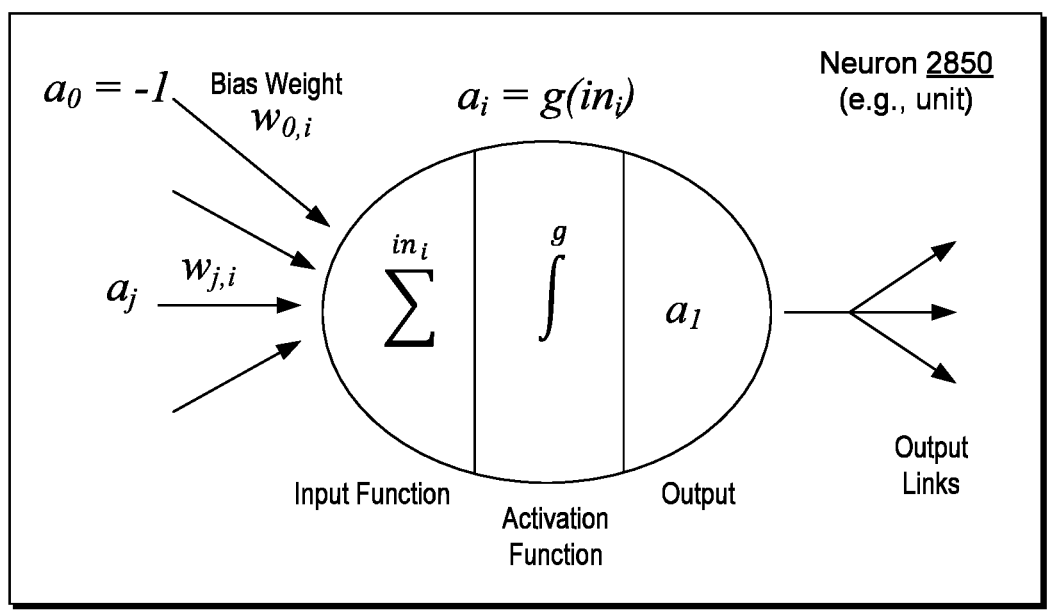
Fig. 28

Method 3000

⦿ MLTrackerWF [Workflow]

GUI 3010

| Name | | Value |
|---|---|---|
| Cube | ▶ | 🧊 New Cube |
| Points | ▶ | ⦾ 8 Points |
| UseNN | | ☐ |
| UseAvoidPoints | | ☐ |
| Avoid | ▶ | |

| Apply | OK | Cancel |

Fig. 30

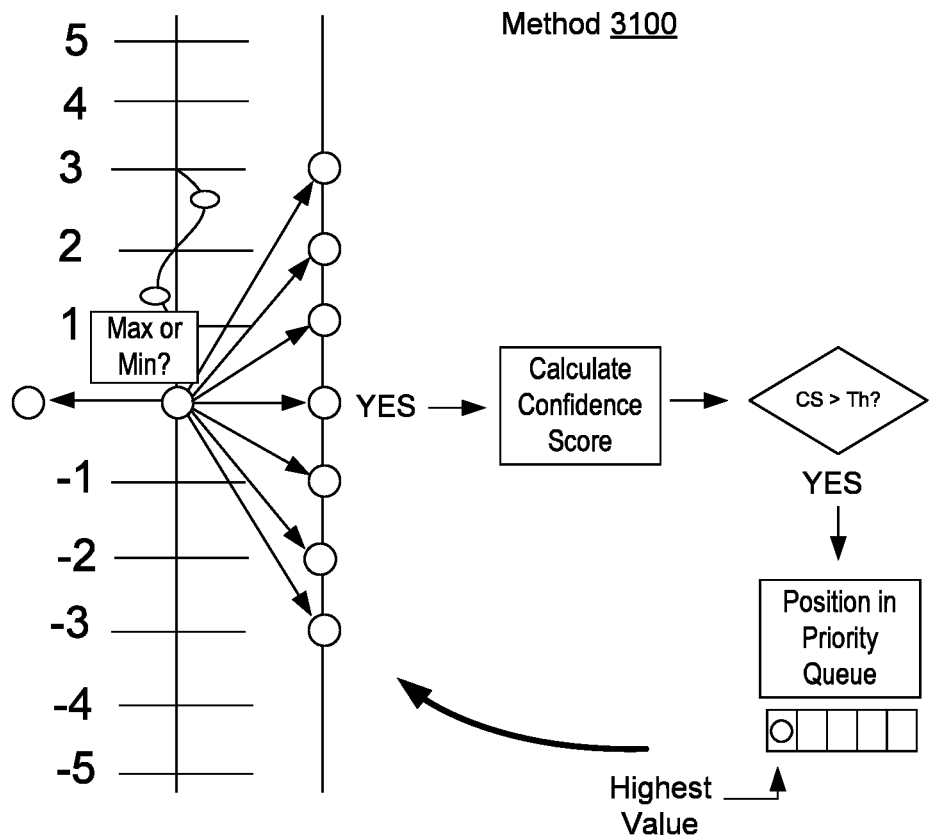
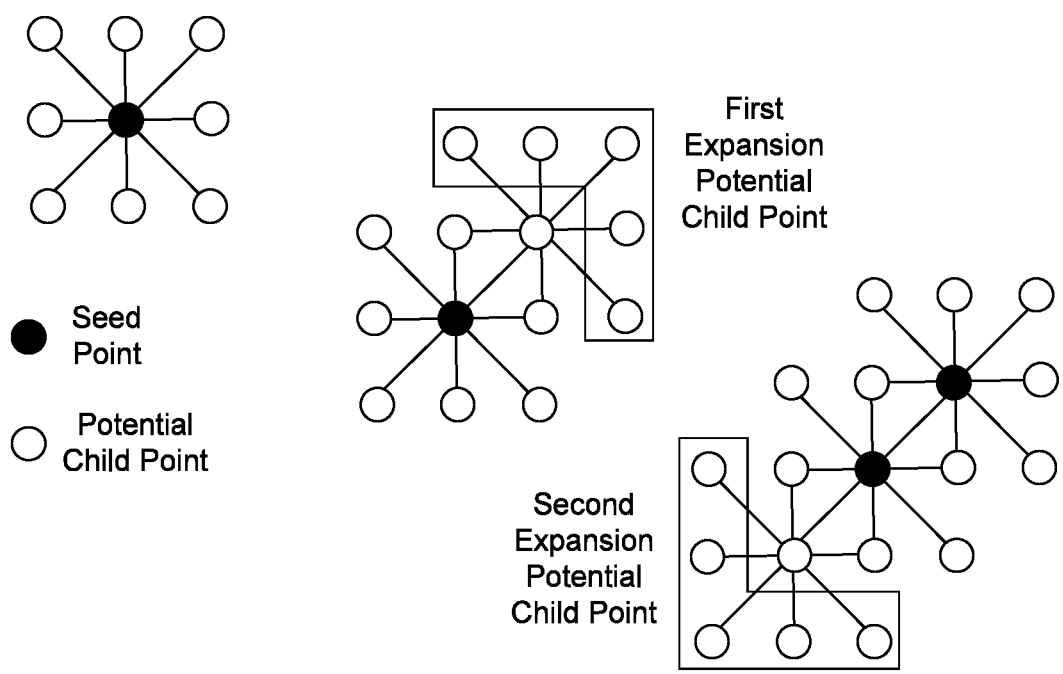
Fig. 31

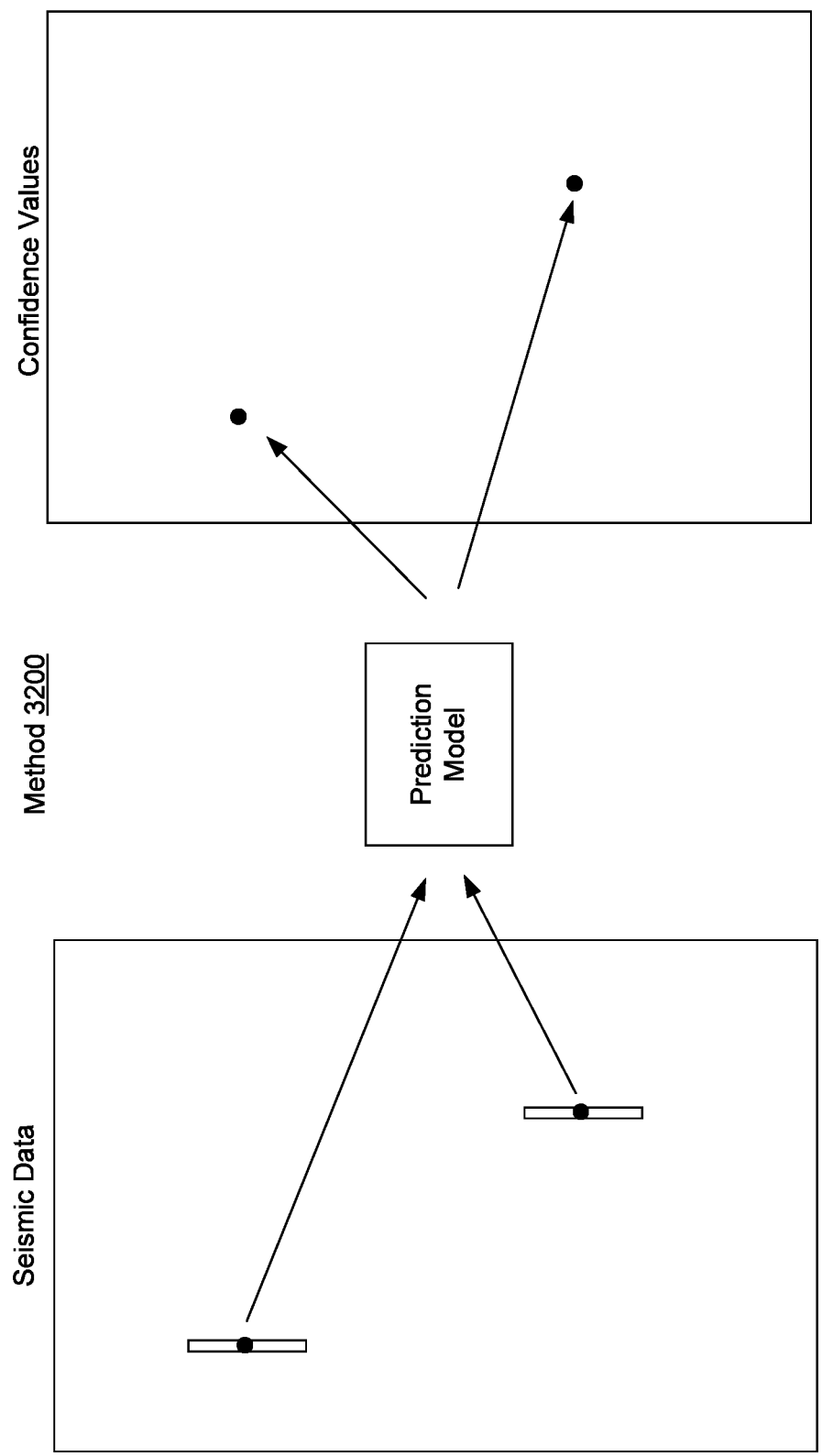

Method 3300

Pseudo tracking algorithm:

Learn prediction model based on input points and surrounding data as positive and negative examples For each point in input points:
    Mark trace as tracked
    Add point to output points For each point in input points:
    For each neighbour trace:
        If(trace not tracked already)
            For each minima or maxima within vertical window (for instance [-5, +5] samples up/down)
                Evaluate candidate point with model and put in priority queue While more points in priority queue with score above confidence threshold (for instance 0.5)
    Take out first point in priority queue
    Add point to output points
    Mark trace as tracked
    For each neighbour trace:
        If(trace not tracked already)
           For each minima or maxima within vertical window (for instance [-5, +5] samples up/down)
                Evaluate candidate point with model and put in priority queue Return output points

Fig. 33

SEISMIC DATA INTERPRETATION SYSTEM

RELATED APPLICATION

This application claims the benefit of and priority to a US Provisional application having Ser. No. 62/683,011, filed 10 Jun. 2018, which is incorporated by reference herein.

BACKGROUND

In oil and gas exploration, interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc.

SUMMARY

A method can include accessing a trained machine model as trained to analyze digital seismic data of a region with respect to a structural feature of a geologic region; analyzing at least a portion of the digital seismic data using the trained machine model to generate results; and outputting the results as indicators of spatial locations of the structural feature of the geologic region. A system can include a processor; memory operatively coupled to the processor; and processor-executable instructions stored in the memory to instruct the system to: access a trained machine model as trained to analyze digital seismic data of a region with respect to a structural feature of a geologic region; analyze at least a portion of the digital seismic data using the trained machine model to generate results; and output the results as indicators of spatial locations of the structural feature of the geologic region. One or more computer-readable storage media can include computer-executable instructions executable to instruct a computing system to: access a trained machine model as trained to analyze digital seismic data of a region with respect to a structural feature of a geologic region; analyze at least a portion of the digital seismic data using the trained machine model to generate results; and output the results as indicators of spatial locations of the structural feature of the geologic region. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates an example system that includes various components for modeling a geologic environment and various equipment associated with the geologic environment;

FIG. 3 illustrates an example of a technique that may acquire data;

FIG. 28 illustrates an example of a method and an example of a neuron;

FIG. 30 illustrates an example of a method and an example of a graphical user interface;

FIG. 31 illustrates an example of a method;

FIG. 32 illustrates an example of a method;

FIG. 33 illustrates an example of a method as pseudo-code;

DETAILED DESCRIPTION

Figure 2:
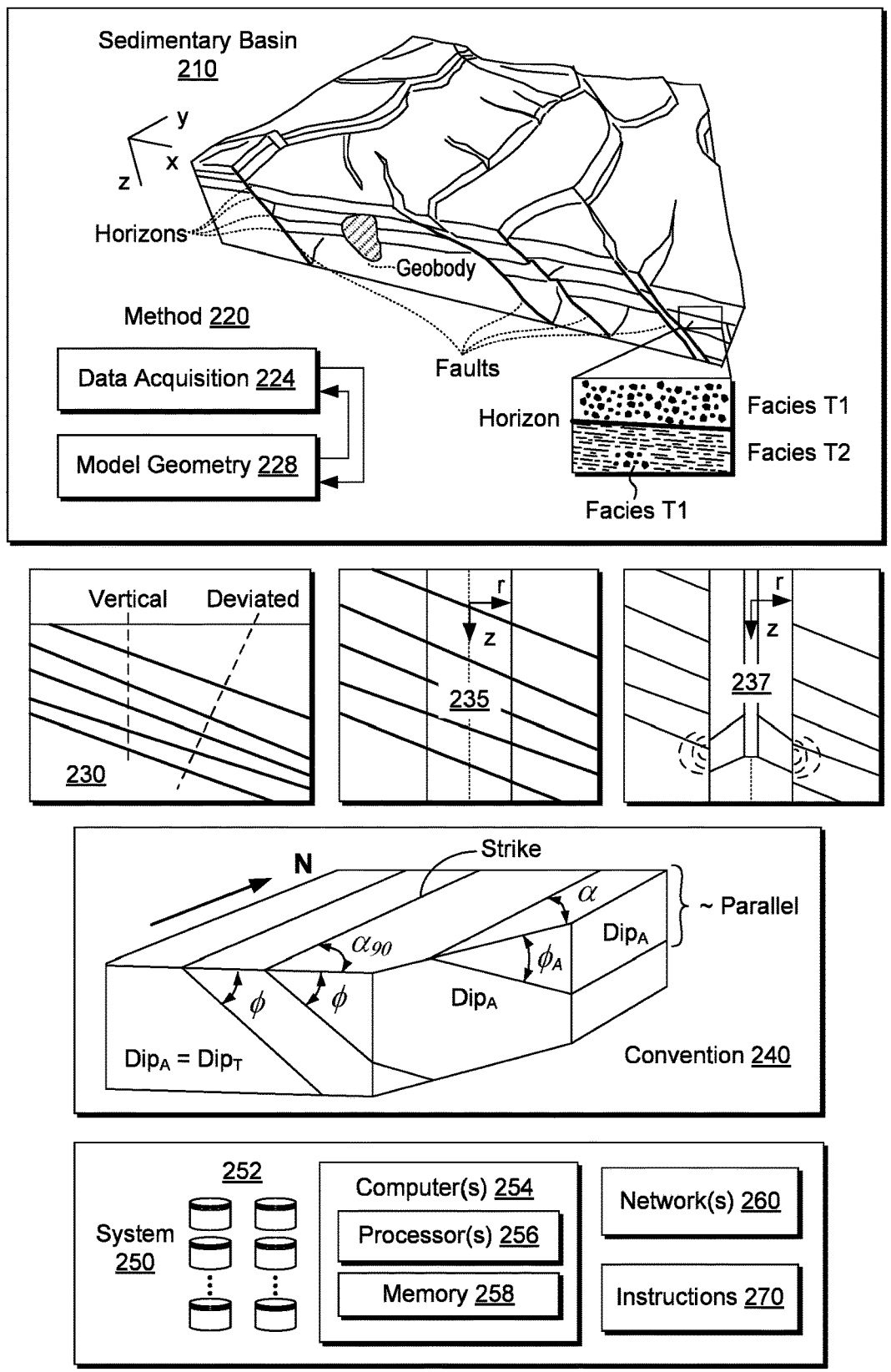
FIG. 2 illustrates an example of a sedimentary basin, an example of a method, an example of a formation, an example of a borehole, an example of a borehole tool, an example of a convention and an example of a system.

This description is not to be taken in a limiting sense, but rather is made merely for the purpose of describing the general principles of the implementations. The scope of the described implementations should be ascertained with reference to the issued claims.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. An example of an object-based framework is the MICROSOFT .NET framework (Redmond, Wash.), which provides a set of extensible object classes. In the .NET framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE reservoir simulator (Schlumberger Limited, Houston Tex.), the INTERSECT reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a framework such as the PETREL seismic to simulation software framework (Schlumberger Limited, Houston, Tex.). The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a framework environment marketed as the OCEAN framework environment (Schlumberger Limited, Houston, Tex.) allows for integration of add-ons (or plug-ins) into a PETREL framework workflow. The OCEAN framework environment leverages .NET tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework may be implemented within or in a manner operatively coupled to the DELFI cognitive exploration and production (E&P) environment (Schlumberger Limited, Houston, Tex.), which is a secure, cognitive, cloud-based collaborative environment that integrates data and workflows with digital technologies, such as artificial intelligence and machine learning. As an example, such an environment can provide for operations that involve one or more computational frameworks. For example, various types of computational frameworks may be utilized within an environment such as a drilling plan framework, a seismic-to-simulation framework (e.g., PETREL framework, Schlumberger Limited, Houston, Tex.), a measurements framework (e.g., TECHLOG framework, Schlumberger Limited, Houston, Tex.), a mechanical earth modeling (MEM) framework (PETROMOD framework, Schlumberger Limited, Houston, Tex.), an exploration risk, resource, and value assessment framework (e.g., GEOX, Schlumberger Limited, Houston, Tex.), a reservoir simulation framework (INTERSECT, Schlumberger Limited, Houston, Tex.), a surface facilities framework (e.g., PIPESIM, Schlumberger Limited, Houston, Tex.), a stimulation framework (MANGROVE framework, Schlumberger Limited, Houston, Tex.). As an example, one or more methods may be implemented at least in part via a framework (e.g., a computational framework) and/or an environment (e.g., a computational environment).

FIG. 1 also shows an example of a framework 170 that includes a model simulation layer 180 along with a framework services layer 190, a framework core layer 195 and a modules layer 175. The framework 170 may include the OCEAN framework where the model simulation layer 180 is the PETREL model-centric software package that hosts OCEAN framework applications. In an example embodiment, the PETREL software may be considered a data-driven application. The PETREL software can include a framework for model building and visualization. As mentioned, the PETREL framework may be implemented in conjunction with the DELFI environment.

As an example, seismic data may be processed using a framework such as the OMEGA framework (Schlumberger Limited, Houston, Tex.). The OMEGA framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA framework.

A framework for processing data may include features for 2D line and 3D seismic surveys. Modules for processing seismic data may include features for prestack seismic interpretation (PSI), optionally pluggable into a framework such as the OCEAN framework. A workflow may be specified to include processing via one or more frameworks, plug-ins, add-ons, etc. A workflow may include quantitative interpretation, which may include performing pre- and post-stack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL software, for example, that operates on seismic data, seismic attribute(s), etc. As an example, a workflow may be a process implementable in the OCEAN framework. As an example, a workflow may include one or more worksteps that access a module such as a plug-in (e.g., external executable code, etc.).

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1. One or more operations may be performed in an environment based at least in part on such characterization of a subsurface environment or environments (e.g., via acquired data, simulation, modeling, etc.).

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A modeling framework marketed as the PETROMOD framework (Schlumberger Limited, Houston, Tex.) includes features for input of various types of information (e.g., seismic, well, geological, etc.) to model evolution of a sedimentary basin. The PETROMOD framework provides for petroleum systems modeling via input of various data such as seismic data, well data and other geological data, for example, to model evolution of a sedimentary basin. The PETROMOD framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL framework, workflows may be constructed to provide basin-to-prospect scale exploration solutions. Data exchange between frameworks can facilitate construction of models, analysis of data (e.g., PETROMOD framework data analyzed using PETREL framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $\text{Dip}_A$ for angle $\alpha$); however, it is possible that the apparent dip is equal to the true dip (see, e.g., $\phi$ as $\text{Dip}_A = \text{Dip}_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $\text{Dip}_A = \text{Dip}_T$ for angle $\alpha_{90}$ with respect to the strike). As indicated, dip observed in a cross-section in any other direction is apparent dip (see, e.g., surfaces labeled $\text{Dip}_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $\text{Dip}_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Data-based interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more sets of instructions 270. As to the one or more computers 254, each computer may include one or more processors (e.g., or processing cores) 256 and memory 258 for storing instructions (e.g., one or more of the one or more sets of instructions 270), for example, executable by at least one of the one or more processors 256. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more sets of instructions 270 may include instructions (e.g., stored in the memory 258) executable by one or more processors of the one or more processors 256 to instruct the system 250 to perform various actions. As an example, the system 250 may be configured such that the one or more sets of instructions 270 provide for establishing the framework 170 of FIG. 1 or a portion thereof. As an example, one or more methods, techniques, etc. may be performed using one or more sets of instructions, which may be, for example, one or more of the one or more sets of instructions 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than about 1 Hz and/or optionally more than about 100 Hz). Seismic data may be processed and interpreted, for example, to understand better composition, fluid content, extent and geometry of subsurface rocks.

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 370 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques. As an example of parameters that can characterize anisotropy of media (e.g., seismic anisotropy, etc.), consider the Thomsen parameters $\varepsilon$, $\delta$ and $\gamma$.

FIG. 3 also shows an example of a marine acquisition technique 380 where a vessel can tow various equipment. As shown in FIG. 3, below an air-water interface 381, a sea or ocean bottom surface 385 exists and, further below, exist one or more other surfaces 386. The vessel can tow an energy source 382 and sensors 384, which can include, for example, at least one geophone and a hydrophone. As an example, a geophone may be a sensor configured for seismic acquisition, whether onshore and/or offshore, that can detect velocity produced by seismic waves and that can, for example, transform motion into electrical impulses. As an example, a geophone may be configured to detect motion in a single direction. As an example, a geophone may be configured to detect motion in a vertical direction. As an example, three mutually orthogonal geophones may be used in combination to collect so-called 3C seismic data. As an example, a hydrophone may be a sensor configured for use in detecting seismic energy in the form of pressure changes under water during marine seismic acquisition. As an example, hydrophones may be positioned along a string or strings to form a streamer or streamers that may be towed by a seismic vessel (e.g., or deployed in a bore). Thus, in the example of FIG. 3, at least one geophone can provide for motion detection and a hydrophone can provide for pressure detection. As an example, the data (e.g., analog and/or digital) may be transmitted via equipment, for example, for processing, etc.

As an example, a method may include analysis of hydrophone response and vertical geophone response, which may help to improve a PZ summation, for example, by reducing receiver ghost (e.g., deghosting) and/or free surface-multiple noise contamination. As an example, a ghost may be defined as a reflection of a wavefield as reflected from a water surface (e.g., water and air interface) that is located above a receiver, a source, etc. (e.g., a receiver ghost, a source ghost, etc.). As an example, a receiver may experience a delay between an upgoing wavefield and its downgoing ghost, which may depend on depth of the receiver.

As an example, a surface marine cable (e.g., a streamer) may be or include a buoyant assembly of electrical wires that connect sensors and that can relay seismic data to the recording seismic vessel. As an example, a multi-streamer vessel may tow more than one streamer cable to increase the amount of data acquired in one pass. As an example, a marine seismic vessel may be about 75 m long and travel about 5 knots, for example, while towing arrays of air guns and streamers containing sensors, which may be located, for example, about a few meters below the surface of the water. A so-called tail buoy may assist crew in location an end of a streamer. As an example, an air gun may be activated periodically, such as about intervals of 25 m (e.g., about intervals of 10 seconds) where the resulting sound wave travels into the Earth, which may be reflected back by one or more rock layers to sensors on a streamer, which may then be relayed as signals (e.g., data, information, etc.) to equipment on the tow vessel.

As an example, a seismic survey may be a land survey, a well survey, a combination of well and another type of survey, a marine survey, etc. As to marine surveys, while a vessel-based technique is illustrated as an example, other examples can be or can include use of seabed equipment (e.g., one or more of ocean-bottom node (OBN) and ocean-bottom cable (OBC)).

As an example, a seismic survey can generate seismic data, which can be in the form of seismic traces. Such data may be in a spatial domain or spatial and temporal domains (e.g., consider time, frequency, etc.). Seismic data can include indicia of one or more events. An event can be defined as an appearance of seismic data as diffraction, reflection, refraction or other similar feature produced by an arrival of seismic energy. As an example, an event can be a single wiggle within a trace (e.g., amplitude versus time or distance), or a consistent lining up of several wiggles over several traces. As an example, an event in a seismic section can represent a geologic interface, such as a fault, unconformity or change in lithology.

As an example, a seabed (e.g., ocean bottom) can be an event. In such an example, where a marine survey generates seismic traces with seabed events, the seismic traces can be analyzed to determine a surface that represents a seabed. Such an event can be a first event in a trace where one or more additional events represent structure(s) below the seabed. In a land survey, a first event may be determined, for example, via trace analysis where a change in amplitude with respect to time (e.g., or depth) is indicative of a reflector, etc. A series of events may be ordered where, for example, the order may be expected to remain consistent over a region.

As an example, an inversion technique may be applied to generate a model of a subterranean region of the Earth. Such a technique may aim to reproduce a layer model where interfaces between layers represent reflectors that give rise to respective events. As an example, one or more types of data may be received and used in solving an inverse problem that outputs a model (e.g., a reflectivity model, an impedance model, a fluid flow model, etc.).

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, a geobody 395, energy emitted by a transmitter of the acquisition equipment 392 can reflect off the layers 393 and the geobody 395. Evidence of such reflections may be found in the acquired traces (e.g., as events, etc.). As to the portion of a trace 396, energy received may be discretized by an analog-to-digital converter (ADC) that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

A 4D seismic survey involves acquisition of 3D seismic data at different times over a particular area. Such an approach can allow for assessing changes in a producing hydrocarbon reservoir with respect to time. As an example, changes may be observed in one or more of fluid location and saturation, pressure and temperature. 4D seismic data can be considered to be a form of time-lapse seismic data.

As an example, a seismic survey and/or other data acquisition may be for onshore and/or offshore geologic environments. As to offshore, as mentioned, streamers, seabed cables, nodes and/or other equipment may be utilized. As an example, nodes can be utilized as an alternative and/or in addition to seabed cables, which have been installed in several fields to acquire 4D seismic data. Nodes can be deployed to acquire seismic data (e.g., 4D seismic data) and can be retrievable after acquisition of the seismic data. As an example, a 4D seismic survey may call for one or more processes aimed at repeatability of data. A 4D survey can include two phases: a baseline survey phase and a monitor survey phase.

As an example, seismic data may be processed in a technique called "depth imaging" to form an image (e.g., a depth image) of reflection amplitudes in a depth domain for a particular target structure (e.g., a geologic subsurface region of interest).

As an example, seismic data may be processed to obtain an elastic model pertaining to elastic properties of a geologic subsurface region. For example, consider elastic properties such as density, compressional (P) impedance, compression velocity ($v_p$)-to-shear velocity ($v_s$) ratio, anisotropy, etc. As an example, an elastic model can provide various insights as to a surveyed region's lithology, reservoir quality, fluids, etc.

Figure 4:
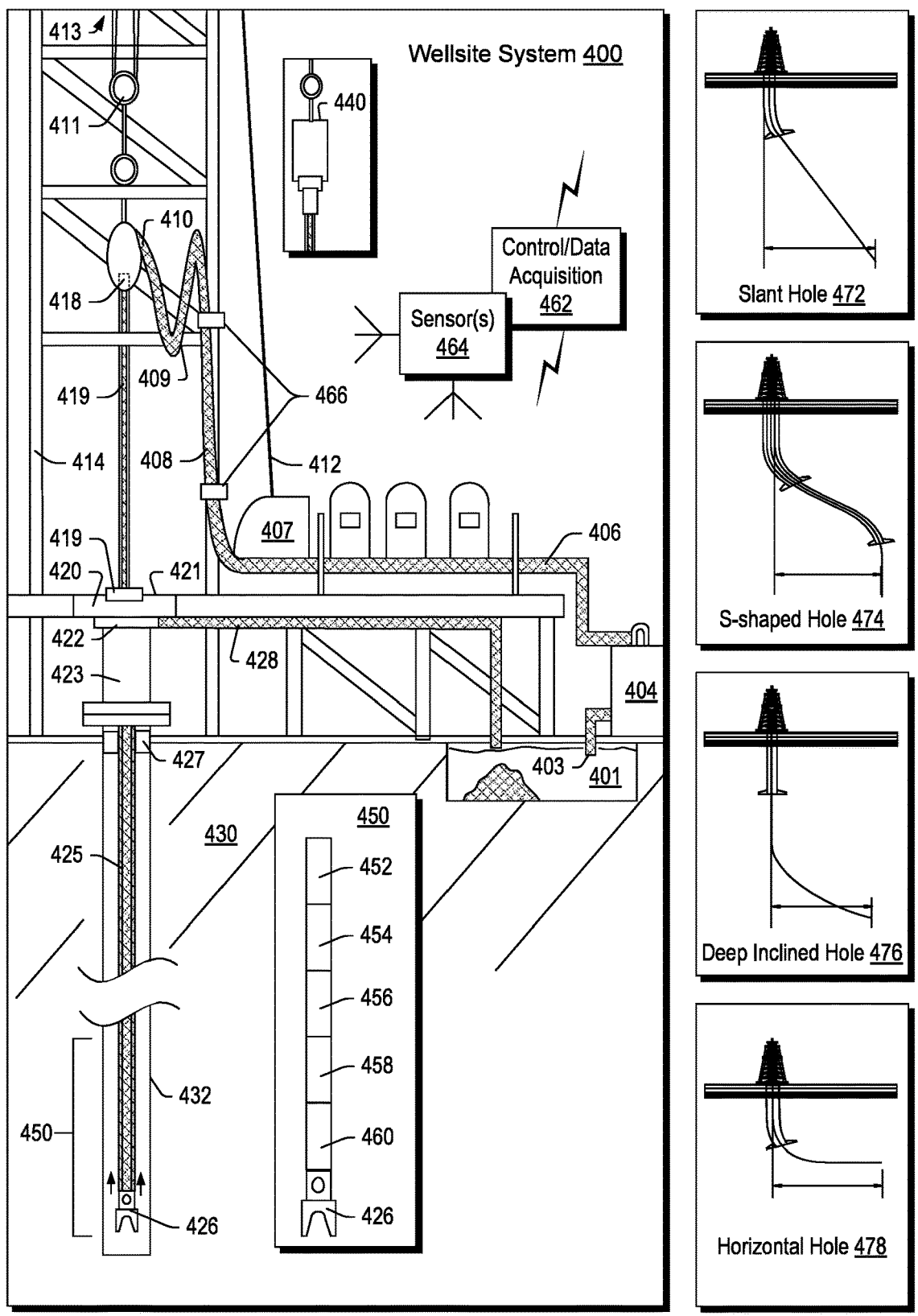
FIG. 4 illustrates examples of equipment including examples of downhole tools and examples of bores.

FIG. 4 shows an example of a wellsite system 400 (e.g., at a wellsite that may be onshore or offshore). As shown, the wellsite system 400 can include a mud tank 401 for holding mud and other material (e.g., where mud can be a drilling fluid), a suction line 403 that serves as an inlet to a mud pump 404 for pumping mud from the mud tank 401 such that mud flows to a vibrating hose 406, a drawworks 407 for winching drill line or drill lines 412, a standpipe 408 that receives mud from the vibrating hose 406, a kelly hose 409 that receives mud from the standpipe 408, a gooseneck or goosenecks 410, a traveling block 411, a crown block 413 for carrying the traveling block 411 via the drill line or drill lines 412, a derrick 414, a kelly 418 or a top drive 440, a kelly drive bushing 419, a rotary table 420, a drill floor 421, a bell nipple 422, one or more blowout preventors (BOPs) 423, a drillstring 425, a drill bit 426, a casing head 427 and a flow pipe 428 that carries mud and other material to, for example, the mud tank 401.

In the example system of FIG. 4, a borehole 432 is formed in subsurface formations 430 by rotary drilling; noting that various example embodiments may also use directional drilling.

As shown in the example of FIG. 4, the drillstring 425 is suspended within the borehole 432 and has a drillstring assembly 450 that includes the drill bit 426 at its lower end. As an example, the drillstring assembly 450 may be a bottom hole assembly (BHA).

The wellsite system 400 can provide for operation of the drillstring 425 and other operations. As shown, the wellsite system 400 includes the platform 411 and the derrick 414 positioned over the borehole 432. As mentioned, the wellsite system 400 can include the rotary table 420 where the drillstring 425 pass through an opening in the rotary table 420.

As shown in the example of FIG. 4, the wellsite system 400 can include the kelly 418 and associated components, etc., or a top drive 440 and associated components. As to a kelly example, the kelly 418 may be a square or hexagonal metal/alloy bar with a hole drilled therein that serves as a mud flow path. The kelly 418 can be used to transmit rotary motion from the rotary table 420 via the kelly drive bushing 419 to the drillstring 425, while allowing the drillstring 425 to be lowered or raised during rotation. The kelly 418 can pass through the kelly drive bushing 419, which can be driven by the rotary table 420. As an example, the rotary table 420 can include a master bushing that operatively couples to the kelly drive bushing 419 such that rotation of the rotary table 420 can turn the kelly drive bushing 419 and hence the kelly 418. The kelly drive bushing 419 can include an inside profile matching an outside profile (e.g., square, hexagonal, etc.) of the kelly 418; however, with slightly larger dimensions so that the kelly 418 can freely move up and down inside the kelly drive bushing 419.

As to a top drive example, the top drive 440 can provide functions performed by a kelly and a rotary table. The top drive 440 can turn the drillstring 425. As an example, the top drive 440 can include one or more motors (e.g., electric and/or hydraulic) connected with appropriate gearing to a short section of pipe called a quill, that in turn may be screwed into a saver sub or the drillstring 425 itself. The top drive 440 can be suspended from the traveling block 411, so the rotary mechanism is free to travel up and down the derrick 414. As an example, a top drive 440 may allow for drilling to be performed with more joint stands than a kelly/rotary table approach.

In the example of FIG. 4, the mud tank 401 can hold mud, which can be one or more types of drilling fluids. As an example, a wellbore may be drilled to produce fluid, inject fluid or both (e.g., hydrocarbons, minerals, water, etc.).

In the example of FIG. 4, the drillstring 425 (e.g., including one or more downhole tools) may be composed of a series of pipes threadably connected together to form a long tube with the drill bit 426 at the lower end thereof. As the drillstring 425 is advanced into a wellbore for drilling, at some point in time prior to or coincident with drilling, the mud may be pumped by the pump 404 from the mud tank 401 (e.g., or other source) via a the lines 406, 408 and 409 to a port of the kelly 418 or, for example, to a port of the top drive 440. The mud can then flow via a passage (e.g., or passages) in the drillstring 425 and out of ports located on the drill bit 426 (see, e.g., a directional arrow). As the mud exits the drillstring 425 via ports in the drill bit 426, it can then circulate upwardly through an annular region between an outer surface(s) of the drillstring 425 and surrounding wall(s) (e.g., open borehole, casing, etc.), as indicated by directional arrows. In such a manner, the mud lubricates the drill bit 426 and carries heat energy (e.g., frictional or other energy) and formation cuttings to the surface where the mud (e.g., and cuttings) may be returned to the mud tank 401, for example, for recirculation (e.g., with processing to remove cuttings, etc.).

The mud pumped by the pump 404 into the drillstring 425 may, after exiting the drillstring 425, form a mudcake that lines the wellbore which, among other functions, may reduce friction between the drillstring 425 and surrounding wall(s) (e.g., borehole, casing, etc.). A reduction in friction may facilitate advancing or retracting the drillstring 425. During a drilling operation, the entire drill string 425 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 426 of the drill string 425 at a bottom of a wellbore, pumping of the mud commences to lubricate the drill bit 426 for purposes of drilling to enlarge the wellbore. As mentioned, the mud can be pumped by the pump 404 into a passage of the drillstring 425 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 425) may be transmitted uphole to an uphole device, which may relay such information to other equipment for processing, control, etc.

As an example, telemetry equipment may operate via transmission of energy via the drillstring 425 itself. For example, consider a signal generator that imparts coded energy signals to the drillstring 425 and repeaters that may receive such energy and repeat it to further transmit the coded energy signals (e.g., information, etc.).

As an example, the drillstring 425 may be fitted with telemetry equipment 452 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 4, an uphole control and/or data acquisition system 462 may include circuitry to sense pressure pulses generated by telemetry equipment 452 and, for example, communicate sensed pressure pulses or information derived therefrom for process, control, etc.

The assembly 450 of the illustrated example includes a logging-while-drilling (LWD) module 454, a measuring-while-drilling (MWD) module 456, an optional module 458, a rotary steerable system and motor 460 (RSS), and the drill bit 426.

The LWD module 454 may be housed in a suitable type of drill collar and can contain one or a plurality of selected types of logging tools. It will also be understood that more than one LWD and/or MWD module can be employed, for example, as represented at by the module 456 of the drillstring assembly 450. Where the position of an LWD module is mentioned, as an example, it may refer to a module at the position of the LWD module 454, the module 456, etc. An LWD module can include capabilities for measuring, processing, and storing information, as well as for communicating with the surface equipment. In the illustrated example, the LWD module 454 may include a seismic measuring device.

The MWD module 456 may be housed in a suitable type of drill collar and can contain one or more devices for measuring characteristics of the drillstring 425 and the drill bit 426. As an example, the MWD tool 454 may include equipment for generating electrical power, for example, to power various components of the drillstring 425. As an example, the MWD tool 454 may include the telemetry equipment 452, for example, where the turbine impeller can generate power by flow of the mud; it being understood that other power and/or battery systems may be employed for purposes of powering various components. As an example, the MWD module 456 may include one or more of the following types of measuring devices: a weight-on-bit measuring device, a torque measuring device, a vibration measuring device, a shock measuring device, a stick slip measuring device, a direction measuring device, and an inclination measuring device.

As to the RSS 460, various types of suitable rotary steerable tool configurations may be used. For example, a RSS may include a substantially non-rotating (or slowly rotating) outer housing employing blades that engage the wellbore wall. Engagement of the blades with the wellbore wall is intended to eccenter the tool body, thereby pointing or pushing the drill bit in a desired direction while drilling. A rotating shaft deployed in the outer housing transfers rotary power and axial weight-on-bit to the drill bit during drilling. Accelerometer and magnetometer sets may be deployed in the outer housing and therefore are non-rotating or rotate slowly with respect to the wellbore wall. As an example, a RSS such as the POWERDRIVE rotary steerable systems (Schlumberger Limited, Houston, Tex.) can fully rotate with a drill string (e.g., an outer housing rotates with the drill string). As an example, a RSS can make use of an internal steering mechanism that can operate without demand of contact with a wellbore wall and can enable a tool body to fully rotate with the drill string. As an example, a RSS can include features that provide for the use of mud actuated blades (or pads) that contact a wellbore wall. The extension of the blades (or pads) can be rapidly and continually adjusted as such a system rotates in a wellbore. As an example, a RSS can include and make use of a lower steering section joined at a swivel with an upper section. Such a swivel can be actively tilted via pistons so as to change angle of a lower section with respect to the upper section and maintain a desired drilling direction as the BHA rotates in a wellbore. As an example, one or more accelerometer and magnetometer sets may rotate with the drill string or may alternatively be deployed in an internal roll-stabilized housing such that they remain substantially stationary (in a bias phase) or rotate slowly with respect to the wellbore (in a neutral phase). To drill a desired curvature, the bias phase and neutral phase can be alternated during drilling at a predetermined ratio (referred to as the steering ratio (SR)).

As an example, deviation of a bore may be accomplished in part by use of a downhole motor and/or a turbine. As to a motor, for example, a drillstring can include a positive displacement motor (PDM). The deviation may also be accomplished by using a rotary steerable system (RSS).

FIG. 4 also shows some examples of types of holes that may be drilled. For example, consider a slant hole 472, an S-shaped hole 474, a deep inclined hole 476 and a horizontal hole 478.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 4, the wellsite system 400 can include one or more sensors 464 that are operatively coupled to the control and/or data acquisition system 462. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 400. As an example, a sensor or sensor may be at an offset wellsite where the wellsite system 400 and the offset wellsite are in a common field (e.g., oil and/or gas field).

As an example, one or more of the sensors 464 can be provided for tracking pipe, tracking movement of at least a portion of a drillstring, etc.

As an example, the system 400 can include one or more sensors 466 that can sense and/or transmit signals to a fluid conduit such as a drilling fluid conduit (e.g., a drilling mud conduit). For example, in the system 400, the one or more sensors 466 can be operatively coupled to portions of the standpipe 408 through which mud flows. As an example, a downhole tool can generate pulses that can travel through the mud and be sensed by one or more of the one or more sensors 466. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 400 can include a transmitter that can generate signals that can be transmitted downhole via mud (e.g., drilling fluid) as a transmission medium.

As an example, a method can include seismic-while-drilling. For example, consider the SEISMICVISION seismic-while-drilling equipment (Schlumberger Limited, Houston, Tex.), which can provide time-depth-velocity information in real time during drilling operations. Seismic-while-drilling can include acquiring borehole seismic measurements (e.g., optionally including real time checkshot, interval velocity data, etc.) that can help to reduce uncertainty ahead of a bit (e.g., from several hundred feet or more). As an example, real time waveforms can be transmitted to surface through MWD telemetry for quality control of downhole data, etc. In seismic-while-drilling, real time waveform resolution and sufficient length can provide for look-ahead vertical seismic profile (VSP) processing. Seismic-while-drilling may be combined with one or more other techniques, which may facilitate structural identification (e.g., interpretations), model building, etc. Seismic-while-drilling may be utilized to guide drilling, for example, according to a planned trajectory and/or to determine when or where to deviate from a planned trajectory (e.g., update one or more target locations, etc.).

Figure 5:
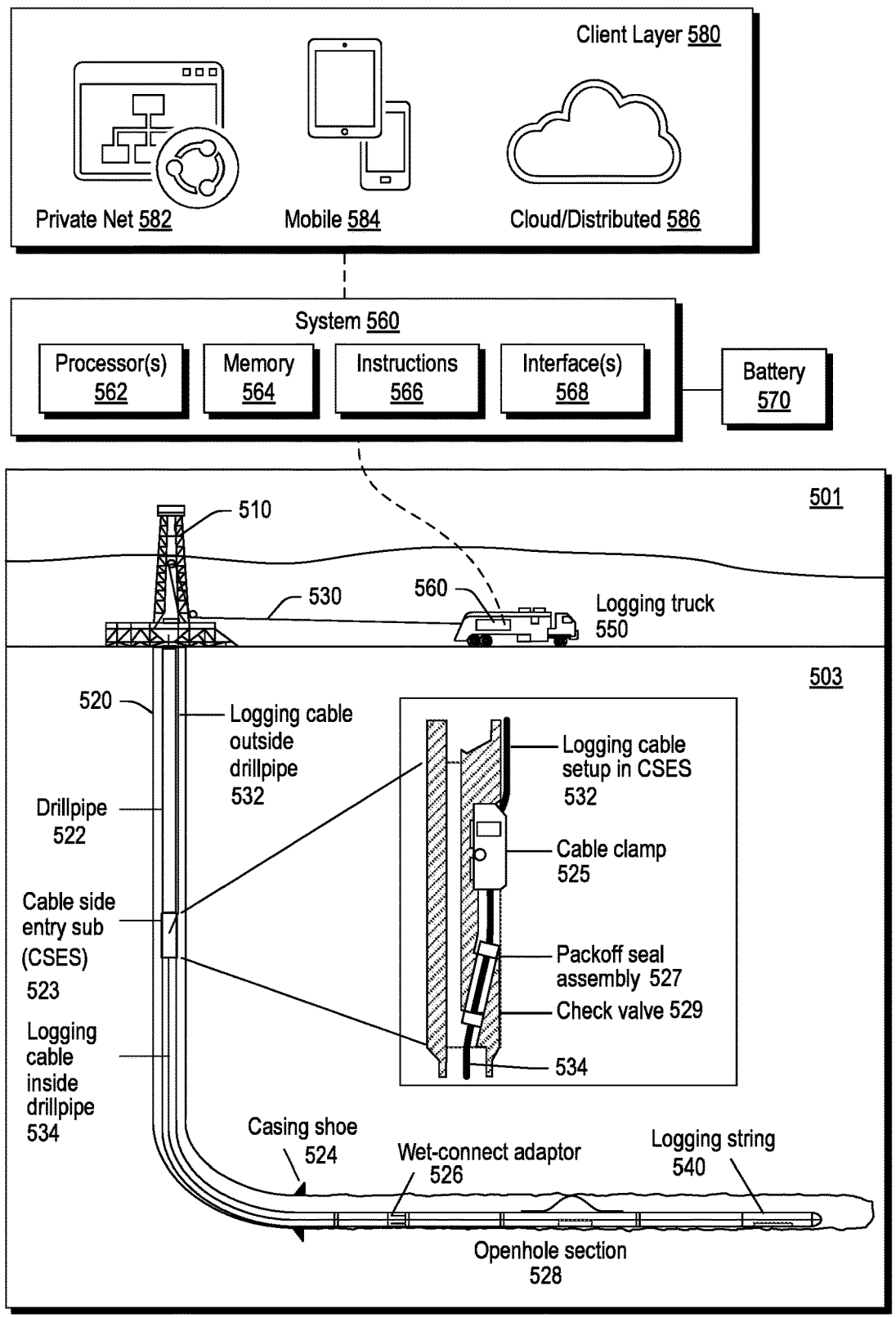
FIG. 5 illustrates examples of equipment including examples of downhole tools.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

As an example, a seismic workflow may provide for processing of microseismic data as a type of seismic data. Microseismic monitoring (e.g., a type of seismic survey) provides a valuable tool to evaluate hydraulic fracture treatments in real-time and can be utilized in planning and managing reservoir development. Microseismic event locations, source characteristics and attributes provide can provide estimates of hydraulic fracturing geometry that can be evaluated with respect to a completion plan and expected fracture growth. Microseismic event derived attributes such as fracture azimuth, height and length, location and complexity, may be utilized to determine the extent of fracture coverage of the reservoir target and effective stimulated volume, as well as in diagnosing under-stimulated sections of the reservoir and in planning re-stimulation of under-producing perforations and wells. Microseismic event locations can also help to avoid hazards during stimulation (e.g. faults, karst, aquifers, etc.). As an example, a method can include modifications to one or more treatment plans and operations based at least in part on microseismic interpretations as part of a seismic interpretation workflow.

Integrated workflows leveraging multi-scale, multi-domain measurements and microseismic interpretation can allow for optimization of hydraulic fracturing treatment for increased production. Such integrated completions planning workflows may use a wide variety of information about the geology (e.g., lithology, stress contrast, natural fracturing, structural or depositional dip, faulting), and the associated rock properties, (e.g., noise, slowness, anisotropy, attenuation) to improve hydraulic fracturing operations to lead to improved hydraulic fracture stimulations, completion plans, and well placement and, thereby, improved production. As an example, microseismic event locations and attributes may be integrated and compared with treatment pressure records, proppant concentration, and injection rate to better perform field operations.

FIGS. 1, 2, 3, 4 and 5 show various examples of equipment in various examples of environments. As an example, one or more workflows may be implemented to perform operations using equipment in one or more environments. As an example, a workflow may aim to understand an environment. As an example, a workflow can include performing a seismic survey, which may be land-based, sea-based (e.g., vessel, ocean bottom, etc.) or land and sea-based. As an example, a seismic survey can include an acquisition geometry where receivers and/or sources are positioned according to the acquisition geometry. As an example, a seismic survey may be performed using one or more receivers and/or one or more sources positioned in a subterranean environment, for example, in a borehole. As an example, a workflow can include acquiring various types of data, which may include seismic data as a type of data and one or more other types of geophysical data, which may include imagery data (e.g., borehole imagery, satellite imagery, drone imagery, etc.).

As an example, a workflow may aim to drill into an environment, for example, to form a bore defined by surrounding earth (e.g., rock, fluids, etc.). As an example, a workflow may aim to acquire data from a downhole tool disposed in a bore where such data may be acquired via a drilling tool (e.g., as part of a bottom hole assembly) and/or a wireline tool. As an example, a workflow may aim to support a bore, for example, via casing. As an example, a workflow may aim to fracture an environment, for example, via injection of fluid. As an example, a workflow may aim to produce fluids from an environment via a bore. As an example, a workflow may utilize one or more frameworks that operate at least in part via a computer (e.g., a computing device, a computing system, etc.).

Figure 6:
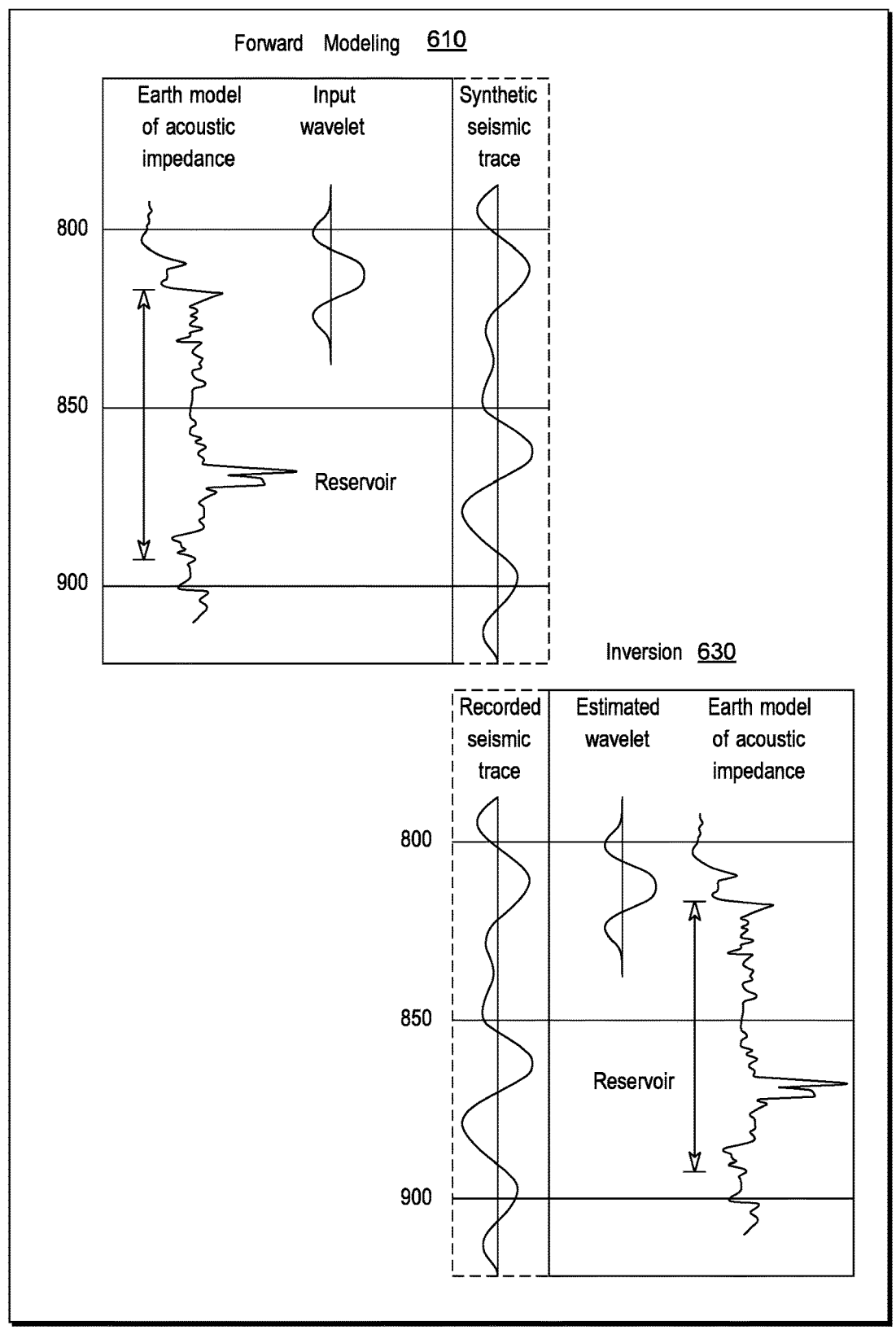
FIG. 6 illustrates an example of forward modeling and inversion as to seismic data and an Earth model of acoustic impedance.

FIG. 6 shows an example of forward modeling 610 and an example of inversion 630 (e.g., an inversion or inverting). As shown, the forward modeling 610 progresses from an earth model of acoustic impedance and an input wavelet to a synthetic seismic trace while the inversion 630 progresses from a recorded seismic trace to an estimated wavelet and an earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., depth).

As an example, a method may employ amplitude inversion. For example, an amplitude inversion method may receive arrival times and amplitude of reflected seismic waves at a plurality of reflection points to solve for relative impedances of a formation bounded by the imaged reflectors. Such an approach may be a form of seismic inversion for reservoir characterization, which may assist in generation of models of rock properties.

As an example, an inversion process can commence with forward modeling, for example, to provide a model of layers with estimated formation depths, thicknesses, densities and velocities, which may, for example, be based at least in part on information such as well log information. A model may account for compressional wave velocities and density, which may be used to invert for P-wave, or acoustic, impedance. As an example, a model can account for shear velocities and, for example, solve for S-wave, or elastic, impedance. As an example, a model may be combined with a seismic wavelet (e.g., a pulse) to generate a synthetic seismic trace.

Inversion can aim to generate a "best-fit" model by, for example, iterating between forward modeling and inversion while seeking to minimize differences between a synthetic trace or traces and actual seismic data.

As an example, a framework such as the ISIS inversion framework (Schlumberger Limited, Houston Tex.) may be implemented to perform an inversion. As an example, a framework such as the Linearized Orthotropic Inversion framework (Schlumberger Limited, Houston, Tex.) may be implemented to perform an inversion.

As mentioned above, as to seismic data, forward modeling can include receiving an earth model of acoustic impedance and an input wavelet to a synthetic seismic trace while inverting can include progressing from a recorded seismic trace to an estimated wavelet and an earth model of acoustic impedance.

As an example, another approach to forward modeling and inversion can be for measurements acquired at least in part via a downhole tool where such measurements can include one or more of different types of measurements, which may be referred to as multi-physics measurements. As an example, multi-physics measurements may include logging while drilling (LWD) measurements and/or wireline measurements. As an example, a method can include joint petrophysical inversion (e.g., inverting) for interpretation of multi-physics logging-while-drilling (LWD) measurements and/or wireline (WL) measurements.

As an example, a method can include estimating static and/or dynamic formation properties from a variety of logging while drilling (LWD) measurements (e.g., including pressure, resistivity, sonic, and nuclear data) and/or wireline (WL) measurements, which can provide for, at least, formation parameters that characterize a formation. As an example, where a method executes during drilling, LWD measurements may be utilized in a joint inversion to output formation parameters (e.g., formation parameter values) that may be utilized to guide the drilling (e.g., to avoid sticking, to diminish one or more types of formation damage, etc.).

In petroleum exploration and development, formation evaluation is performed for interpreting data acquired from a drilled borehole to provide information about the geological formations and/or in-situ fluid(s) that can be used for assessing the producibility of reservoir rocks penetrated by the borehole.

As an example, data used for formation evaluation can include one or more of core data, mud log data, wireline log data (e.g., wireline data) and LWD data, the latter of which may be a source for certain type or types of formation evaluation (e.g., particularly when wireline acquisition is operationally difficult and/or economically unviable).

As to types of measurements, these can include, for example, one or more of resistivity, gamma ray, density, neutron porosity, spectroscopy, sigma, magnetic resonance, elastic waves, pressure, and sample data (e.g., as may be acquired while drilling to enable timely quantitative formation evaluation).

Table 1, below, shows some examples of data, which may be referred to as "log" data that are associated with petrophysical and rock physics properties calculation and analysis.

TABLE 1

Examples of Log Data

| Name | Uses |
| --- | --- |
| Gamma Ray (GR) | Lithology interpretation, shale volume calculation, calculate clay volume, permeability calculation, porosity calculation, wave velocity calculation, etc. |
| Spontaneous Potential (SP) | Lithology interpretation, Rw and Rwe calculation, detect permeable zone, etc. |
| Caliper (CALI) | Detect permeable zone, locate a bad hole |
| Shallow Resistivity (LLS and ILD) | Lithology interpretation, finding hydrocarbon bearing zone, calculate water saturation, etc. |
| Deep Resistivity (LLD and ILD) | Lithology interpretation, finding hydrocarbon bearing zone, calculate water saturation, etc. |
| Density (RHOB) | Lithology interpretation, finding hydrocarbon bearing zone, porosity calculation, rock physics properties (AI, SI, $\sigma$, etc.) calculation, etc. |
| Neutron Porosity (BPHI or TNPH or NPHI) | Finding hydrocarbon bearing zone, porosity calculation, etc. |
| Sonic (DT) | Porosity calculation, wave velocity calculation, rock physics properties (AI, SI, $\sigma$, etc.) calculation, etc. |
| Photoelectric (PEF) | Mineral determination (for lithology interpretation) |

Information from one or more interpretations can be utilized in one or more manners with a system that may be a well construction ecosystem. For example, seismic data may be acquired and interpreted and utilized for generating one or more models (e.g., earth models) for purposes of construction and/or operation of one or more wells.

Figure 7:
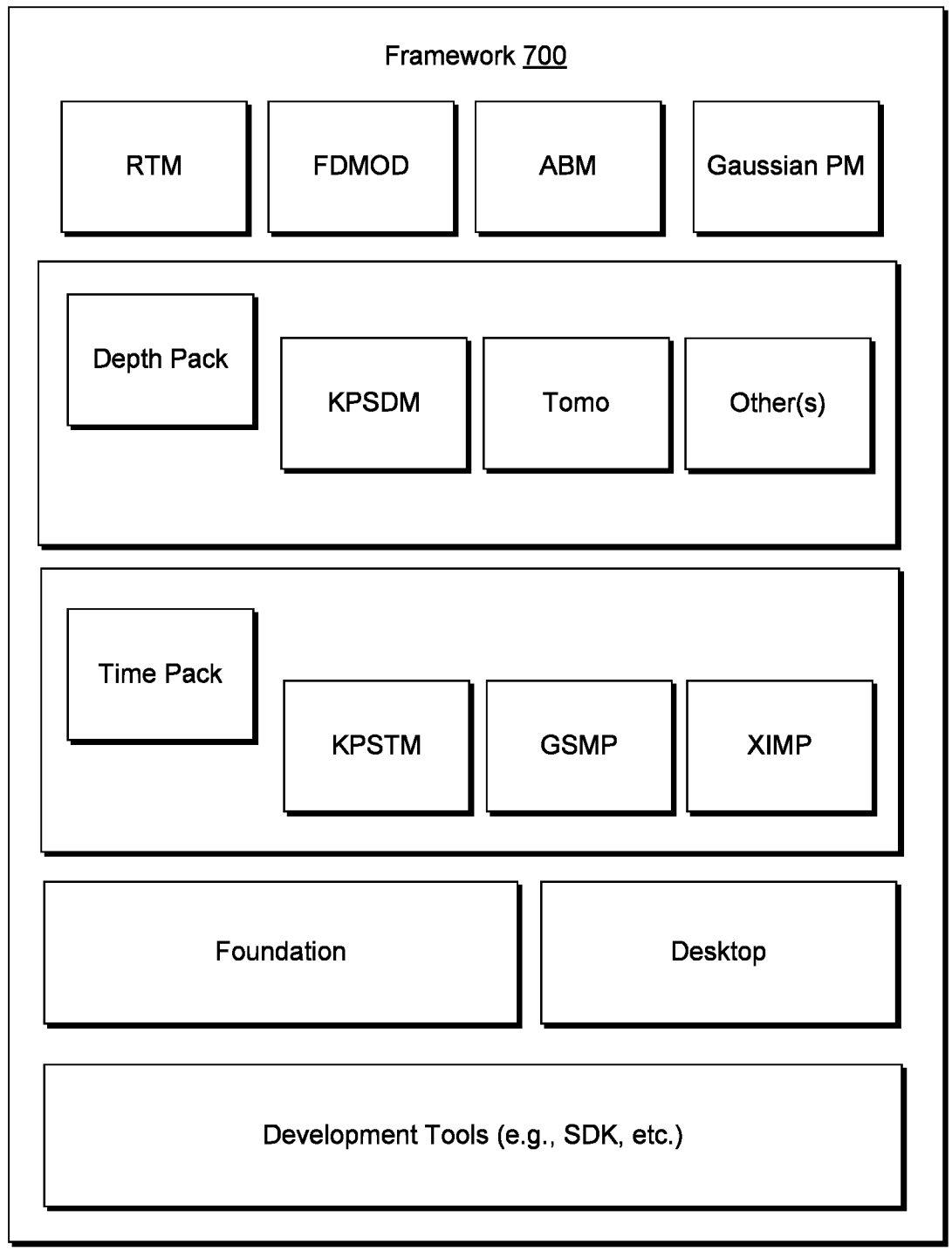
FIG. 7 illustrates an example of a computational framework.

FIG. 7 shows an example of a computational framework 700 that can include one or more processors and memory, as well as, for example, one or more interfaces. The computational framework of FIG. 7 can include one or more features of the OMEGA framework (Schlumberger Limited, Houston, Tex.), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 7, the computational framework 700 includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

The framework 700 can include features for geophysics data processing. The framework 700 can allow for processing various types of data such as, for example, one or more of: land, marine, and transition zone data; time and depth data; 2D, 3D, and 4D surveys; isotropic and anisotropic (TTI and VTI) velocity fields; and multicomponent data.

The framework 700 can allow for transforming seismic, electromagnetic, microseismic, and/or vertical seismic profile (VSP) data into actionable information, for example, to perform one or more actions in the field for purposes of resource production, etc. The framework 700 can extend workflows into reservoir characterization and earth modelling. For example, the framework 700 can extend geophysics data processing into reservoir modelling by integrating with the PETREL framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 700 may provide support for field to final imaging, to prestack seismic interpretation and quantitative interpretation, from exploration to development.

As an example, the FDMOD component can be instantiated via one or more CPUs and/or one or more GPUs for one or more purposes. For example, consider utilizing the FDMOD for generating synthetic shot gathers by using full 3D, two-way wavefield extrapolation modelling, the same wavefield extrapolation logic matches that are used by reverse-time migration (RTM). FDMOD can model various aspects and effects of wave propagation. The output from FDMOD can be or include synthetic shot gathers including direct arrivals, primaries, surface multiples, and interbed multiples. The model can be specified on a dense 3D grid as velocity and optionally as anisotropy, dip, and variable density. As an example, survey designs can be modelled to ensure quality of a seismic survey, which may account for structural complexity of the model. Such an approach can enable evaluation of how well a target zone will be illuminated. Such an approach may be part of a quality control process (e.g., task) as part of a seismic workflow. As an example, a FDMOD approach may be specified as to size, which may be model size (e.g., a grid cell model size). Such a parameter can be utilized in determining resources to be allocated to perform a FDMOD related processing task. For example, a relationship between model size and CPUs, GPUs, etc., may be established for purposes of generating results in a desired amount of time, which may be part of a plan (e.g., a schedule) for a seismic interpretation workflow.

As an example, as survey data become available, interpretation tasks may be performed for building, adjusting, etc., one or more models of a geologic environment. For example, consider a vessel that transmits a portion of acquired data while at sea and that transmits a portion of acquired data while in port, which may include physically offloading one or more storage devices and transporting such one or more storage devices to an onshore site that includes equipment operatively coupled to one or more networks (e.g., cable, etc.). As data are available, options exist for tasks to be performed.

Various embodiments of the present disclosure may provide systems, methods, and computer-readable storage media for the interpretation of data into reservoir characterization workflows. In certain embodiments, this approach may reduce the time spent on interpretation in reservoir characterization studies while increasing quality and productivity, while reducing cost. A reservoir characterization can be more accurate when utilizing one or more automated interpretation techniques.

As an example, a method can include applying machine learning and artificial intelligence for seismic surface extraction. In various instances, for various regions of the Earth, vast amounts of training data are not available for specific surfaces. In such instances, available data may include some semi-manually interpreted data. For acceptable learning to generate a trained system, reliable training data is desirable as well as minimal user input (e.g., human time, resources, etc.).

As an example, a method can implement an integrated approach where tracking and learning gradually expand the amount of available training data and improve a model or models for a signature of a subterranean surface such as indicated in a trace of seismic data (see, e.g., the trace 396 of FIG. 3, which is given as amplitude with respect to time in 1-D, noting that time may be a proxy for depth or distance).

As an example, a method for training a machine model may operate in an interactive manner where, for example, a user may select or enter training information to train a machine model or where a user selects an automated technique for selection of training information to train a machine model. As an example, training information can include position information for one or more events. For example, a user may pick a point on a rendered visualization of seismic data where the point represents an event or an automated technique may analyze seismic data for one or more points that represent one or more events.

As an example, a method can commence with as little as a single point picked by a user that interacts with a graphic user interface (GUI) as rendered to a display of a seismic data interpretation system (e.g., a computational framework). In such an example, a user may interact with the system via a mouse, a finger, a voice command, a stylus, etc., such that a point can be registered with respect to seismic data (e.g., a seismic cube in three-dimensions) where that point can be associated, for example, with a trace. In such an example, the point may be determined to be a point corresponding to a trace, whether the trace is specified with respect to time or another dimension. In such an example, the point may correspond to an amplitude that is defined by a dimension along a trace (e.g., as an event, etc.). As an example, a point can be associated with a window, which may extend in one or more directions. In a 1-D scenario, for a trace defined with respect to time, the window may extend to lesser time and/or to greater time than the time of a particular, specific point. As a trace can be of a known location given a seismic survey geometry, the location of the trace may be known or approximated based on information from a seismic survey geometry (e.g., location of a receiver that received seismic energy represented in an amplitude versus time 1-D trace, etc.). As an example, a picked point can be deemed, visually by an interpreter, to be associated with a feature such as a reflector or other geologic feature in a subterranean environment. In such a manner, a seismic survey can be transformed into a model of the subterranean environment that was surveyed.

As an example, given at least one picked point, a method can involve subsequent robust tracking to provide additional training data while generating a more robust machine learning model to recognize the specific surface to which the point corresponds (e.g., a surface of a geologic feature). In such an example, a method can construct an acceptable amount of training data from minimal user input (e.g., at least one picked point).

In various seismic interpretation workflows, seismic surface tracking involves many parameters that demand fine-tuning depending on the surface to be tracked. As an example, a seismic interpretation system that utilizes machine learning and artificial intelligence can learn to recognize a surface signature automatically by self-tuning (e.g., learning), which can save an interpreter a considerable amount of work. For example, consider a self-tuning approach with few parameters compared to a manual-tuning approach with many parameters. The former can allow an interpreter to proceed with various interpretation tasks, optionally with quick revision, without having to navigate to parameter fields of a GUI to tune, readjust, etc., a listing of many parameters. Further, a method can include generating and outputting confidence information that can allow a user to determine quality of interpretation. For example, consider a method that includes generating a confidence cube as a type of interpretation attribute that can be visualized by rendering visualizations of the confidence cube (e.g., volumes, slides, lines, points, etc.) to a display. In such an example, a user may select one or more portions of underlying seismic data for acceptance, revision, etc., based on such rendered visualizations where the user has an indication as to confidence and hence quality (e.g., whether good or poor).

As mentioned, a method can include commencing by receiving one or more points indicating a surface to recognize and extract from seismic data. Such a point or points and the seismic data provide a first basis for extracting training data for machine learning. As machine learning can involve both positive and negative examples, amplitude data surrounding points in example data can be extracted as positive examples. Negative examples may for instance be extracted around other locations than indicated by the input points. For example, a metric may be utilized that is a distance metric or time metric (e.g., as to trace data) that is based on geologic knowledge as to a region of the Earth such that the negative example is likely to be sufficiently different than the positive example.

As an example, to minimize the chance of false negative examples, negative examples may be taken from other positions along the same traces as the positive examples were extracted from. An example in this case can be the amplitude values around a specified position in the seismic cube. Examples may also include attribute data derived from the seismic data (e.g., one or more seismic attributes, other attributes, etc.).

Given positive and negative example data, machine learning or statistical learning may be applied to learn a model M (e.g., a machine model) to predict whether an example seismic data profile is representing a surface of interest or not. In this context, profile can mean the surrounding data. As an example, a learned model (e.g., a trained model) may produce output in the range [0, 1], or other ranges indicating a confidence that the provided example data is the desired surface.

As mentioned, confidence values may be stored in the form of an array that corresponds to a seismic data array. As an example, a point may include one or more confidence values, which may provide for directionality and/or other metrics. As an example, a method can include calculating information based on one or more types of data that can be other than seismic data. For example, consider wireline data, measurement/logging while drilling data, etc. In such examples, one or more metrics may be calculated based on such data where a confidence may be determined based at least in part on at least one of the one or more metrics. As an example, consider a confidence as to a signature and a confidence as to a location based on data acquired from a borehole or, for example, a type of lithology, fluid, etc., based on data acquired from a borehole that may be assessed using seismic data. As such, one type of confidence can be associated with a seismic signature and another type of confidence can be associated with at least one other type of information.

As an example, a model that is generated may be applied for one or more purposes, as may be appropriate for one or more workflows. For example, consider using the aforementioned model M as a quality metric for surface tracking (e.g., seismic surface tracking), as a "detector" in seismic data, and/or as a converter to produce a confidence display volume/2D line as a further interpretation aid.

Used as a quality metric in surface tracking, a model M may provide the basis for determining whether a surface tracking algorithm can confidently track further on a surface as it started with or whether it is advisable to stop (e.g., end of the surface, change in seismic signature, etc.).

As an example, where 4D seismic survey data are available, one or more signatures, models, etc., may be reapplied. For example, consider utilizing a method that involves training on a baseline seismic survey at a time T0 and then acquiring seismic data via a monitor seismic survey at a time T1. In such an example, training/learning from the baseline seismic survey data may be applied to interpret the monitor seismic survey data and/or new training/learning may be applied to the monitor seismic survey data where information generated thereby (e.g., as to signatures, model, etc.) can be compared to information generated from the baseline seismic survey. In such an example, a comparison between information may provide for an understanding as to physical changes that may have occurred in the geologic region surveyed with respect to time. In such an example, ultimate interpretation results may be compared as well as information generated through use of a seismic interpretation system that utilized machine learning and artificial intelligence to automatically assess seismic data.

As to use as a "detector" for scanning through a seismic volume, a model M may detect and suggest positions in the volume that are likely to be the same surface as one or more starting points. Used as a converter for visual aid, a model M may guide and ease further interpretation as it can be used to highlight places in seismic data which the model M indicates as likely to be the same surface, and thus, for example, may be picked next.

As an example, the model M may be an artificial neural network model, a statistical model, or another type of numeric, computational structure that can capture a seismic signature of a surface with sufficient precision to distinguish it from one or more other surfaces in seismic data. Precision of a model can depend on the selected surface, the amount of training data, the seismic data quality, and the selection of method for estimating M.

Various examples are described herein, which include an example of a radial basis function (RBF) approach. An example of an RBF can be an RBF that includes features suited for handling seismic traces. For example, consider a RBF that includes a heavy tail or fat tail. A fat-tailed distribution may be defined as a type of a probability distribution that exhibits a large skewness or kurtosis, relative to that of either a normal distribution or an exponential distribution.

As an example, a RBF can include a decay term or terms. For example, consider quadratic decay. In such an example, confidence can decrease away from a distribution and may converge toward a value (e.g., consider converging towards 0.5, etc.). As an example, consider the following equation as exhibiting decay with dimension d (e.g., division by $(1+d^2)$):

$$\frac{c}{1+d^2}$$

As an example, radial basis functions can include many partial distributions for each class in a classification problem. Nevertheless, 1D observations regarding Gauss versus a heavy tailed density function holds for more than one kernel function for each class and for many-dimensional problems. With Gaussians, it is possible to assign high class confidence to outliers far away from previously observed data. However, this is far less likely with heavy tailed density functions. Heavy tailed radial basis density functions (RBF or RBDF) based on existing seismic data observations tend to be more robust to making grossly inaccurate predictions than Gaussians.

As to use for tracking, a model M may be refined and improved by relearning based on the tracked points and extraction of new/expanded training data based on both the starting points and the tracked points. Such a method may be, for example, a continuous or stepwise process.

Figure 8:
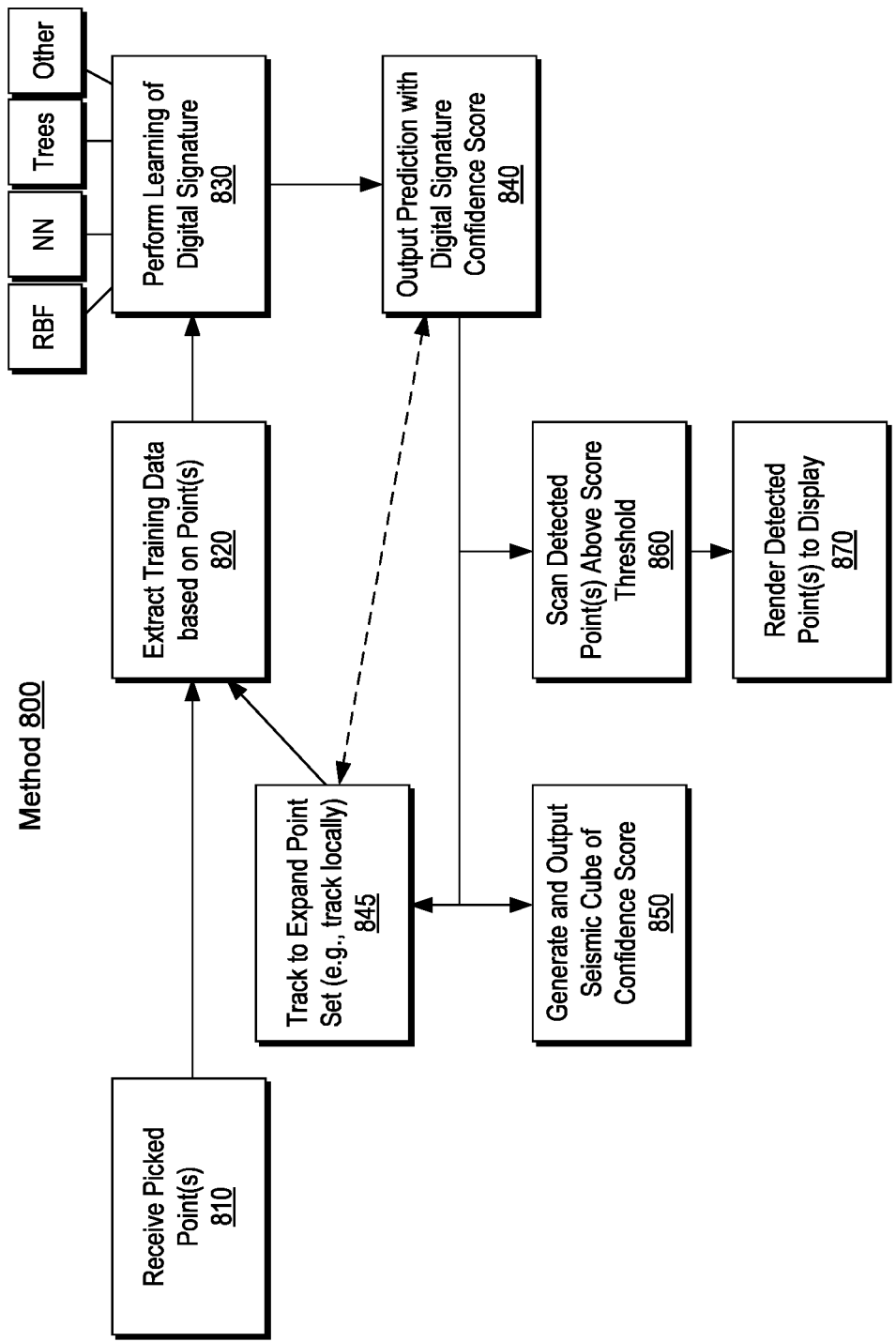
FIG. 8 illustrates an example of a method.

FIG. 8 shows an example of a method 800 that includes various blocks that can be implemented by a seismic interpretation system, which can be a computational framework. As shown in FIG. 8, the method 800 includes a reception block 810 for receiving one or more picked points (e.g., by an interpreter, interpreters, a machine, machines, etc.), an extraction block 820 for extracting training data based on the one or more picked points, a performance block 830 for performing learning of a digital signature (e.g., a seismic signature as in digital seismic data, which can be in the form of a model), an output block 840 for outputting predictions with at least corresponding digital signature confidence scores, a track block 845 for tracking to expand a point set (e.g., locally and/or otherwise), a generation and output block 850 for generating and outputting a seismic cube of confidence scores (e.g., or other type of data structure), a scan detection block 860 for scanning detected point(s) above a score threshold (e.g., an adjustable confidence score threshold, etc.), and a render block 870 to render one or more detected points to a display, which may be according to application of the score threshold (e.g., above, below, at, within a range thereof, etc.).

As indicated in the method 800, one parameter can be a score threshold. As an example, another parameter can be a window, for example, to be utilized for extracting training data based on one or more picked points. As yet another example, a parameter can pertain to "negative" examples, which may be to assure that a "negative" example is sufficient different from a "positive" example (e.g., of a picked point). As an example, a method may be implemented where both positive and negative points are picked as examples. As explained with respect to the example of FIG. 8, the method 800 can be implemented with few parameters and may be implemented in a manner where a user does not have to set a parameter. For example, the window may be set by default or otherwise automatically determined, the negative examples may be automatically determined and a score threshold may be automatically determined or, for example, available as a graphical control on a graphical user interface rendered to a display where it is adjustable as to value, range, etc., by a user. For example, consider a slider control where a user may adjust the slider up or down to set a score threshold where a computational framework automatically renders information to the display based on the action of the slider. In such an example, a computer may render one or more surfaces, portions thereof, etc., to a display using points that correspond to confidences above or below a score threshold.

As shown in the example of FIG. 8, the performance block 830 may include performing learning using one or more techniques, which can include RBFs, neural networks (NN), trees and/or one or more other techniques. As such, a learning block for digital signature based learning may apply one or more different machine learning techniques. As mentioned, RBFs may be utilized, which may include one or more heavy tail RBFs, etc.

Figure 9:
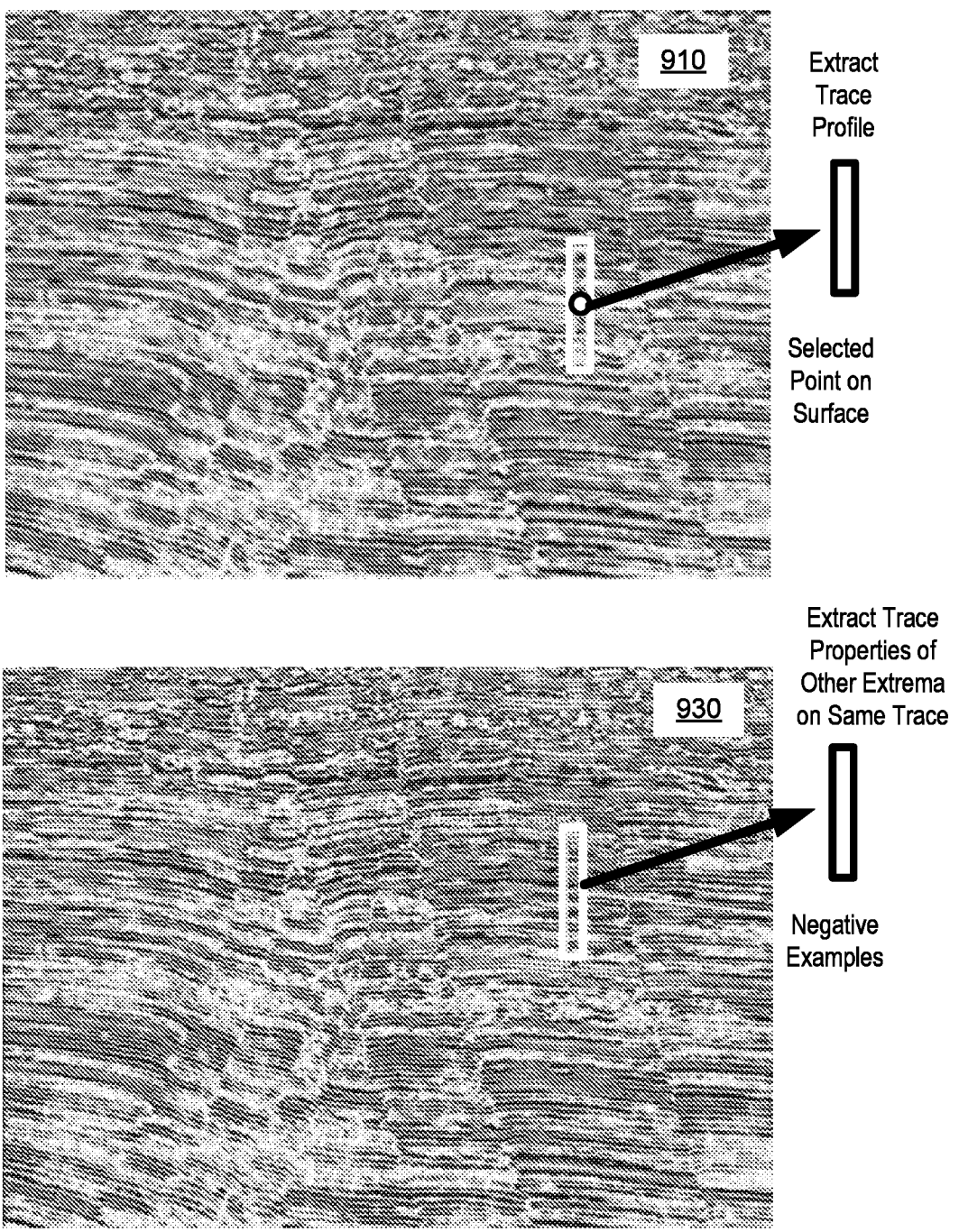
FIG. 9 illustrates example graphical user interfaces.

Various trials utilized a method implemented via a seismic interpretation system that included receiving data from a seismic cube S and a set of points P as input, representing positions in the seismic data where a surface is located. Given the seismic data and the points, the following method actions include:
1. Extraction of training data
2. Learning of a model M (e.g., a radial basis function model):
   a. Output QC metrics concerning the accuracy of the model
3. Tracking starting from P, evaluating data from S with M where and if to track:
   a. Output a point set P* representing the tracked points, of which P is a subset.
4. Create an output volume S* by converting S to [0, 1] data with M
5. Detect throughout S* positions with scores compared to some threshold calculated in action 2, above:
   a. Create a point set P' indicating these positions
   b. P' may be from a random subset of traces to save time and space FIG. 9 shows example graphical user interfaces (GUIs) 910 and 930 as to an example extraction of training data based on a surface point (see circle in the GUI 910). The GUI 910 shows picking of a point on a surface as represented in seismic data as acquired for a geologic region where a window is also shown for extraction of a trace profile where such a profile can be referred to as a positive profile or a positive example; whereas, the GUI 930 shows negative examples where a trace is extracted of another portion of the trace as in the GUI 910 where the trace window covers a portion of the trace not covered in the window of the GUI 910. As indicated, the center of the window of the negative example is at a position above (e.g., earlier time, lesser depth, etc.) the center of the window of the positive example. As an example, a method can include positive and negative points where, for example, negative points may be referred to as avoid points.

As an example, extraction of training data can be performed by taking a sub-image around each point in P (e.g., seismic trace data around each point in P), which can be positive examples. In such an example, amplitude values can be extracted at subsample precision with interpolation, since surface points may not fall precisely on the positions of voxels in a seismic cube or pixels in a seismic section (e.g., arrays of seismic data, seismic images, seismic volumes, etc.). Negative examples can be extracted in a manner akin to positive examples, however, from different positions along a common trace with a positive example. Thus, a single trace can provide one or more negative examples and one or more positive examples. As an example, a negative example may be taken from a trace that does not include a corresponding positive example; however, an approach that takes a negative example and a positive example from a common trace may increase computational efficiency where a trace is stored as a 1-D data structure in memory of a storage device (e.g., amplitude versus time or depth). For example, consider a vector where a vector can be loaded into memory upon selection of a point and where that vector can be a source of a positive example and one or more negative examples (e.g., portions of the vector as accessed and loaded into RAM, etc.).

When learning a model M for prediction, as mentioned, one or more approaches may be taken. Various trials included implementation of radial basis functions to calculate a prediction. Such an approach is in the category of instance based learning, where K nearest neighbors is an example of an implementation. In a nearest neighbor classification, a method can include storing observed examples in a database, and to predict, finding K nearest neighbors and producing a prediction based on a weighted distance function. Such an approach can demand considerable storage space and considerable computational resources to produce a result.

Another approach can involve linear classification with one centroid for each class, and where the prediction is a function of the distances to the class centroids. Radial basis functions can include selecting class centroids based on training data, where there may be more than one centroid per class. Radial basis functions can therefore represent high dimensional non-linear manifolds that a linear classifier does not, while also being capable of reducing storage and/or computational demands, for example, by having less data to save and compare to than a nearest neighbor classifier.

As an example, a selected approach for creating M can be a RBF approach or optionally random forests (trees) or artificial neural networks (NN) or another approach (see, e.g., FIG. 8).

As an example, more than one approach may be implemented. As an example, a method can include selecting an approach for creating a model M where the model M can be used to produce confidence values, for example, in a range [0, 1] given a new example. Such a method can be implemented with single or manifold uses in one or more workflows. As mentioned, in tracking, a point set P can be expanded gradually into a point set P* by looking locally at nearby traces if the seismic expression of candidate surfaces match with the selected surface above a threshold value. Using a priority queue, a workflow can involve tracking the best matching new points first.

As mentioned, a workflow can include use of a confidence surface or confidence volume based on machine learning output, for example as to visualization and/or quality control of one or more tracked surfaces. Given a "confidence attribute", which may be calculated for a tracked surface, a user may compare one or more approaches for one or more picked points (e.g., positive examples) and optionally for one or more negative examples. A visualization rendered to a display may highlight if the surface has a consistent signal over a portion or portions thereof. If one or more portions (e.g., parts) of the surface have low confidence score(s), this may indicate that such a portion or portions may not be following the geologic surface in the seismic data. As an example, a confidence attribute may be stored as a confidence attribute cube (e.g., volume), a confidence attribute section (e.g., a slice), or in another form. As an example, a confidence attribute may be considered to be a particular type of seismic attribute that can be utilized for one or more purposes.

As an example, if a tracker performs unacceptably in tracking within one or more areas because of nearby similar seismic events (e.g., reflections, etc.), a method can include entering an extra point set representing one or more surfaces not to be tracked. Such a point set can then be given extra emphasis in learning, for example, as part of negative examples, to reduce risk of making such mistakes in the tracking again. Such a point set can alter confidence scoring such that the extra points receive a lower score than if they were not given special emphasis.

Figure 10:
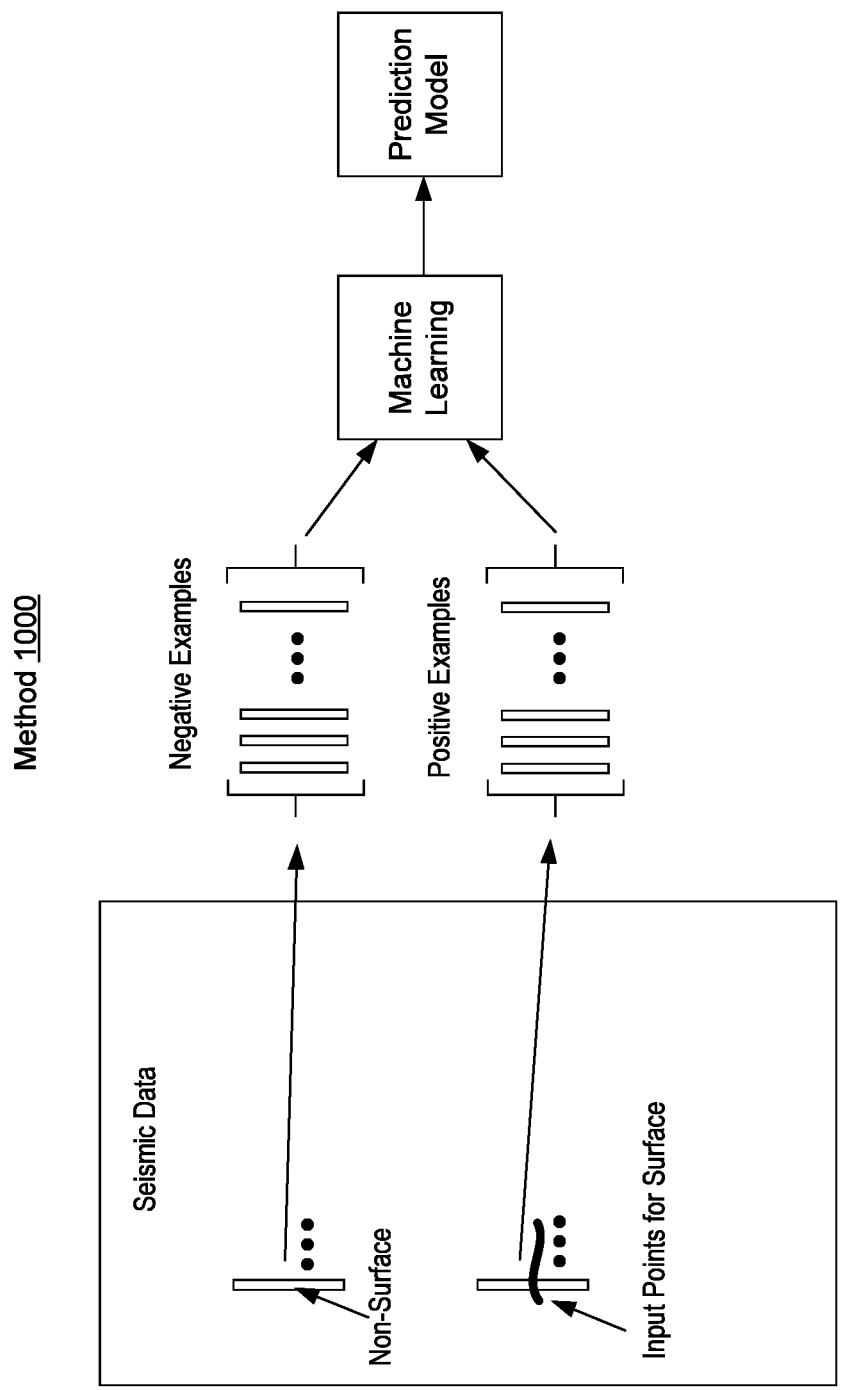
FIG. 10 illustrates an example of a method.

FIG. 10 shows an example of a method 1000 that includes selecting positive and negative examples and utilizing machine learning to generate a model that can be utilized for analyzing seismic data and for making predictions within such seismic data as to whether portions of the seismic data correspond to a geologic feature or not. While various examples pertain to selecting (e.g., picking and assessing) surfaces, as an example, a feature can include a seismic survey feature such as an artifact such as an acquisition geometry artifact. As an example, a seismic interpretation system can include artifact (e.g., a type of noise) identification and surface identification. In such an example, a user may pick points that are representative of an artifact and pick points that are representative of a surface. Such an approach may help to reduce one or more artifacts and enhance one or more surfaces.

Again, the example method 1000 of FIG. 10 shows extracting training data from seismic as input points where positive examples are extracted as sub-images around input points and negative examples are extracted as sub-images elsewhere. These examples can be used for machine learning to obtain a prediction model. For example, a workflow can include selection of points, which can be of various types (e.g., positive, negative, etc.) and generating a prediction model as a machine model via machine learning.

Figure 11:
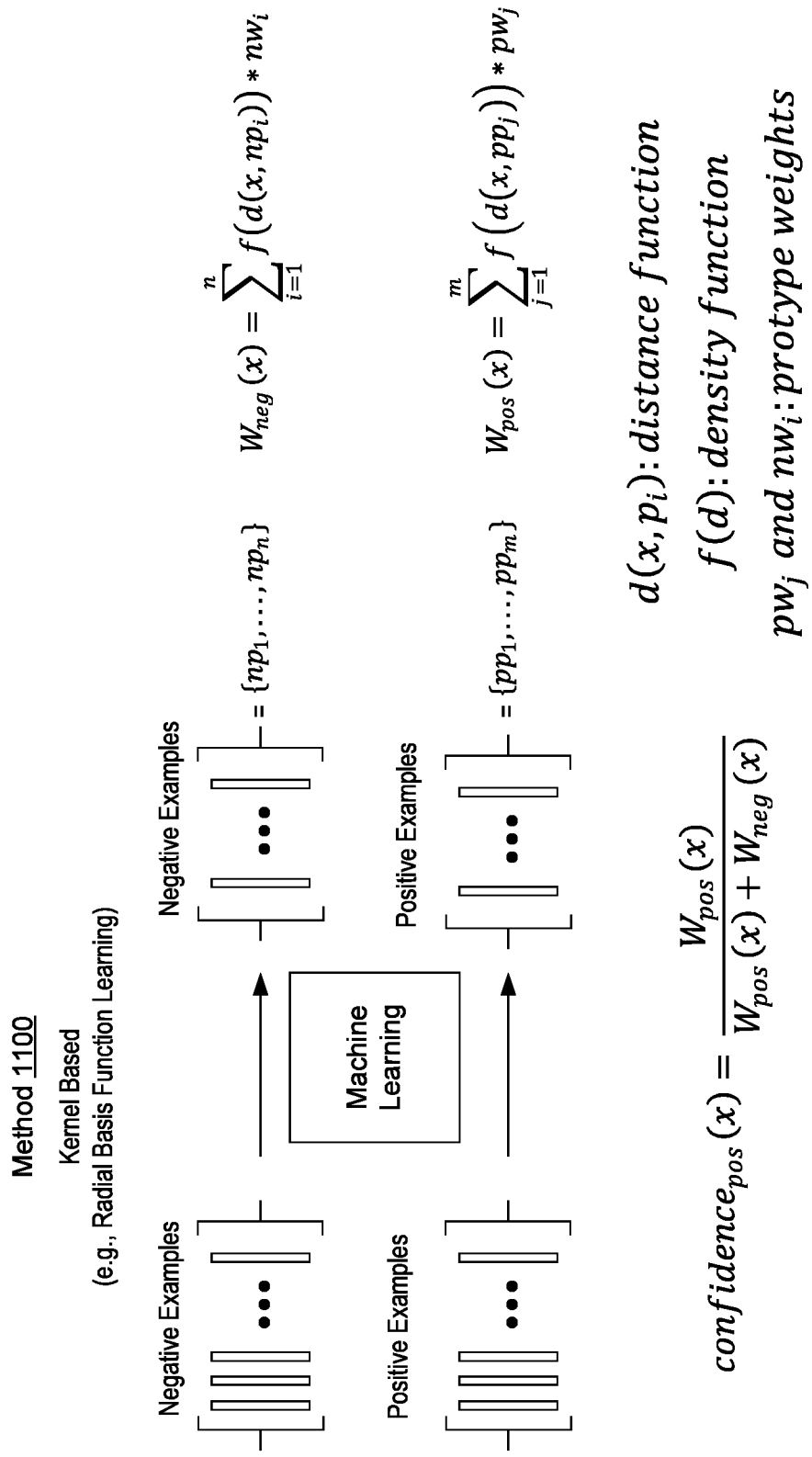
FIG. 11 illustrates an example of a method.

FIG. 11 shows an example of a method 1100 for radial basis function (RBF) learning. As shown, negative and positive examples can be compressed into a smaller set of positive and negative prototype patterns. Given the prototype patterns, the confidence of each class (negative or positive) can be a multimodal relative density function (MRDF) composed from individual density functions around each prototype pattern. Prototype density can be based on a distance function between example and prototype pattern. While distance is mentioned, generally, a dimension can be utilized where such a dimension can be a distance, a time or other measure.

Figure 12:
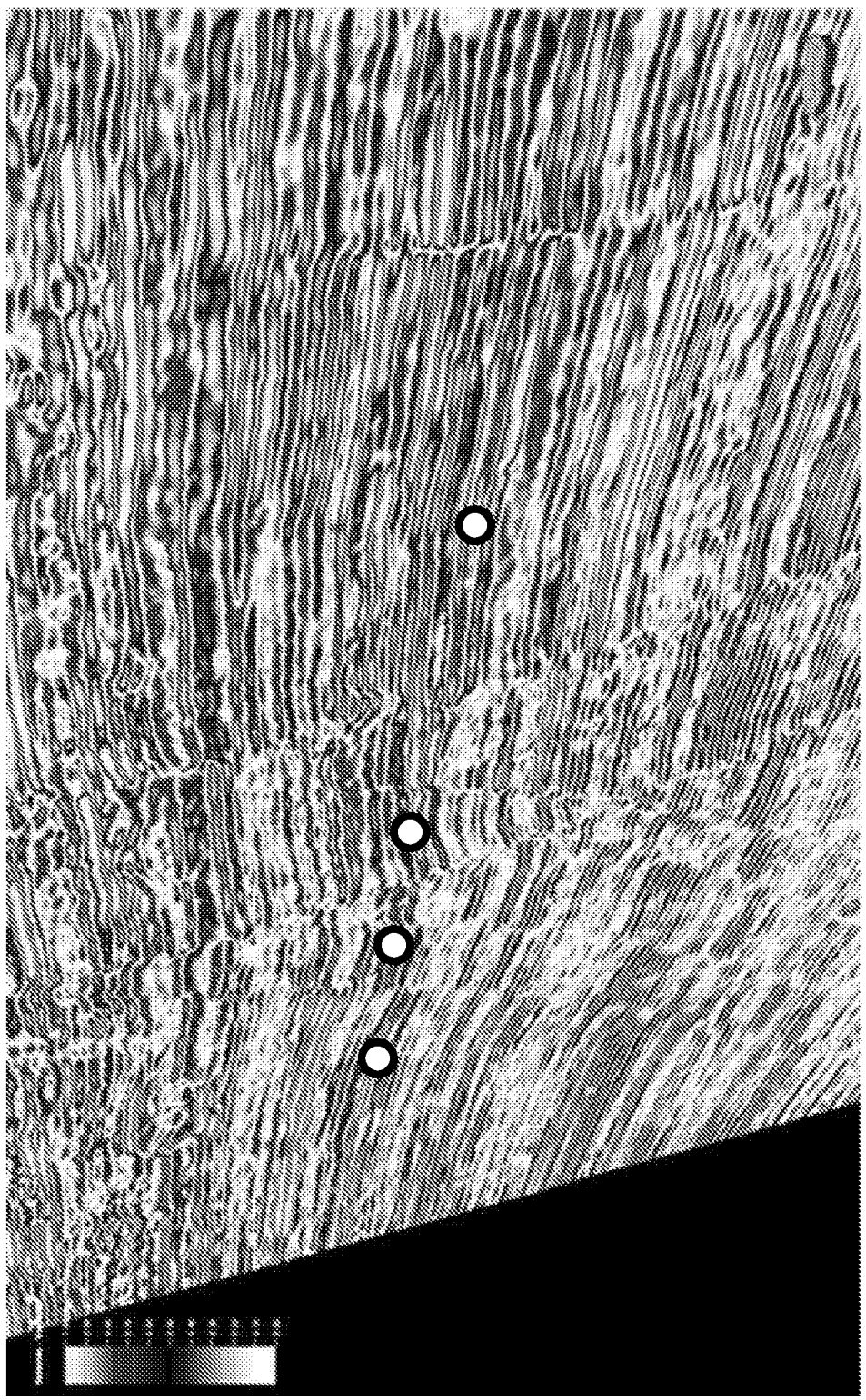
FIG. 12 illustrates an example of a graphical user interface.

FIG. 12 shows an example of a graphical user interface (GUI) 1200 that includes a seismic section, with four picked points in white. As an example, the picked points may be one or more user picked points via visual interpretation of the rendered seismic data to a display and/or may be one or more machine picked points via execution of an algorithm that automatically selects a number of points as being representative of a structural feature to be tracked.

Figure 13:
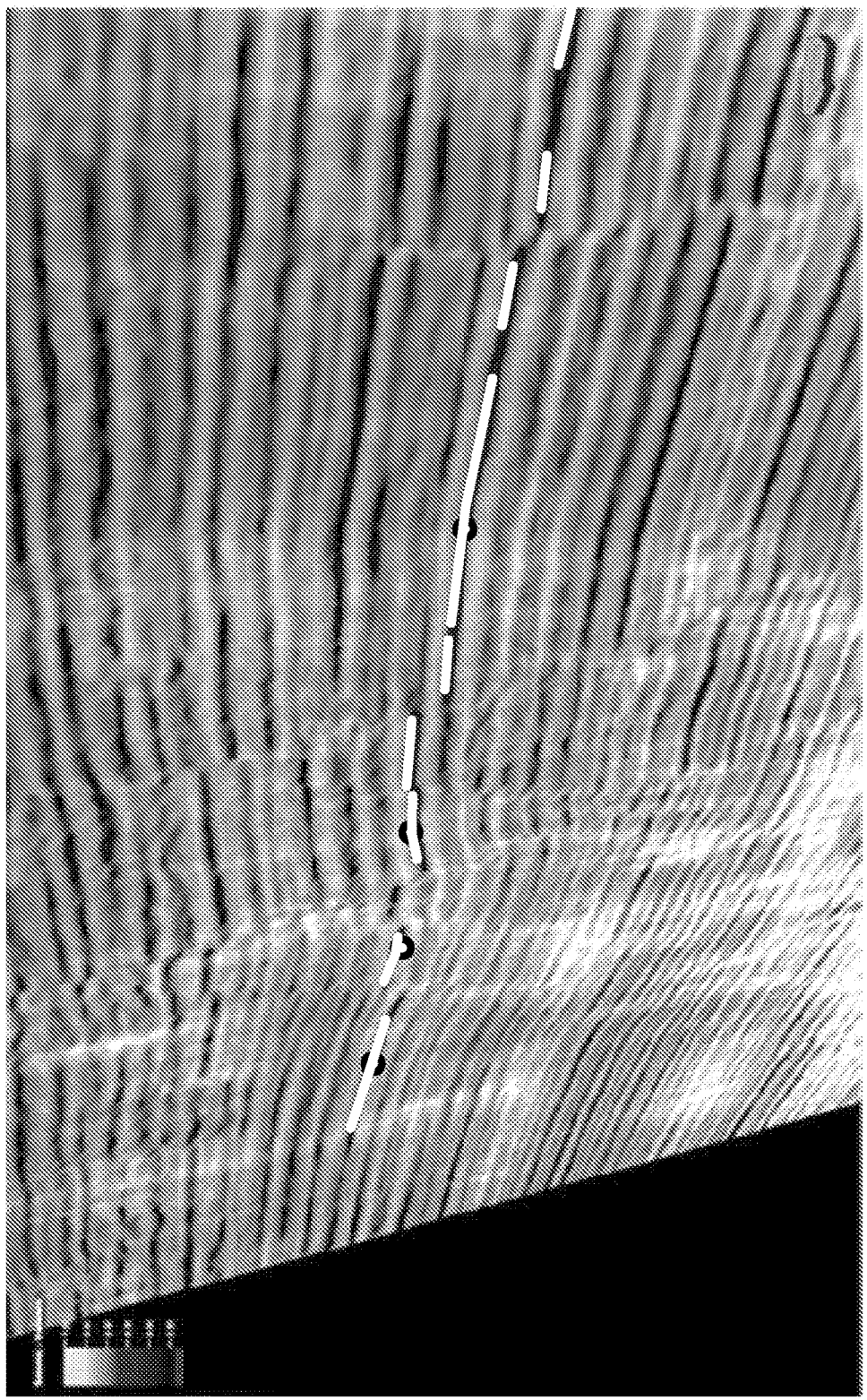
FIG. 13 illustrates an example of a graphical user interface.

FIG. 13 shows an example of a graphical user interface (GUI) 1300 that includes confidence displayed based on four picked points. In a table to the upper left, confidence levels are indicated, which may be in color to make the high confidence information stand out from dark or grayscale information. In the example of FIG. 13, white is utilized to represent high confidence levels.

Figure 14:
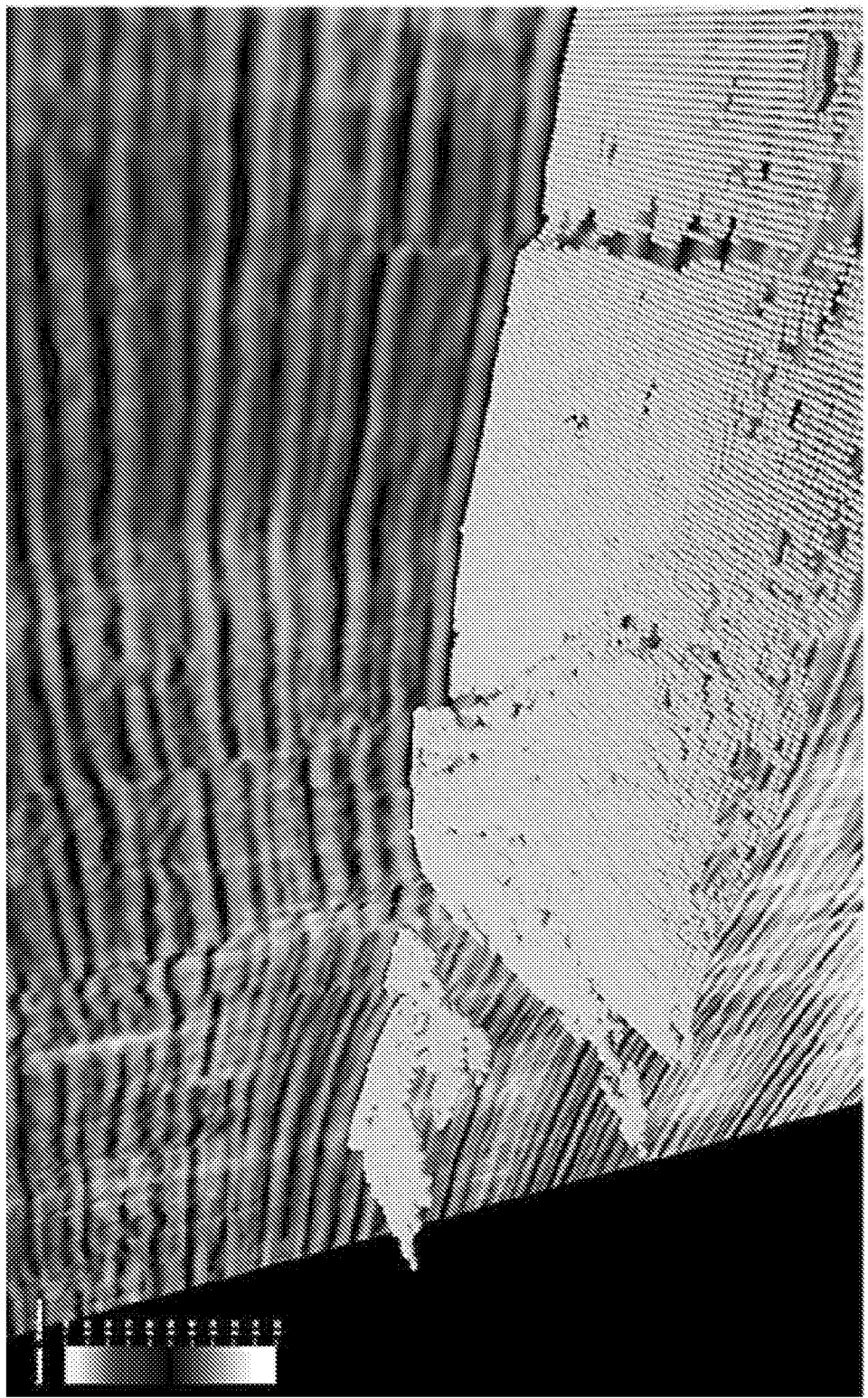
FIG. 14 illustrates an example of a graphical user interface.

FIG. 14 shows an example of a graphical user interface (GUI) 1400 that shows tracked points, starting from four picked points, and guided by a confidence volume (e.g., a confidence score volume). In the example of FIG. 14, tracking stops at faults or tracks across a fault honoring the confidence score. In the example of FIG. 14, a fault is a discontinuity that can be "tracked across" with respect to a surface. As an example, a method can include a parameter such as a "jumping" parameter that may encounter a discontinuity and identify a jump, make a jump, etc., as to a surface that is on the other side of the discontinuity. In such an example, a jump may be specified as being an "up" jump, a "down" jump or an up or down jump. For example, where information is available as to how layers may have shifted during faulting, a method can implement a jump approach that jumps up or down based on such information. Such an approach may expedite "jumping" across a discontinuity and improve tracking.

As an example, a method can include performing an analysis on seismic data in an iterative manner that follows from a picked point in a neighboring manner or a method can include performing an analysis on seismic data in a manner that does not adhere to a neighbor approach but aims to perform an analysis on a region, which may be an entire region. For example, a method can implement a continuity parameter such that a surface is to possess continuity, optionally with a jump that accounts for a discontinuity. Or, for example, a method can be implemented without regard to continuity and assess seismic data within a region, which may be an entire seismic cube. In the latter instance, processing may optionally be performed in parallel to calculate confidence information for points in the seismic cube, for example, on a voxel by voxel basis to generate a confidence cube. Such a confidence cube may then be rendered to a display where a user may interact with a GUI to adjust a confidence threshold (e.g., or range) and/or where a user may implement one or more tracking routines that account for neighborhood, adjacency, etc., to create one or more continuous structures (e.g., surfaces or portions of a surface). As an example, such an approach may be multi-directional and/or multi-seeded and optionally implemented in serial, parallel or a combination of serial and parallel processing. As to tracking, one example of tracking is referred to as ant-tracking. Ant-tracking can be a type of automated tracking or semi-automated tracking, which may aim to facilitate interpretation of multi-dimensional seismic data. However, as mentioned, tracking can encounter errors where faulting and/or other stratigraphic changes occur. As to computation of a confidence cube, such an approach may help to identify one or more surfaces and/or portions of common surfaces without encountering issues that an ant-tracking approach may encounter at a fault or other type of discontinuity. In a confidence cube approach, a user may view a rendering and then select portions of the cube based at least in part on confidence values and then affirmatively assign such portions to a common surface, which may be discontinuous across one or more types of discontinuities in a geologic region as imaged by reflection seismology, and as optionally supplemented via one or more other data acquisition techniques (e.g., wireline, MWD, LWD, imagery, etc.).

In the example GUI 1400 of FIG. 14, voxels can be seen within the seismic cube, or confidence cube, which may be assigned colors that correspond to confidence values calculated based at least in part on implementation of a radial basis function approach.

Figure 15:
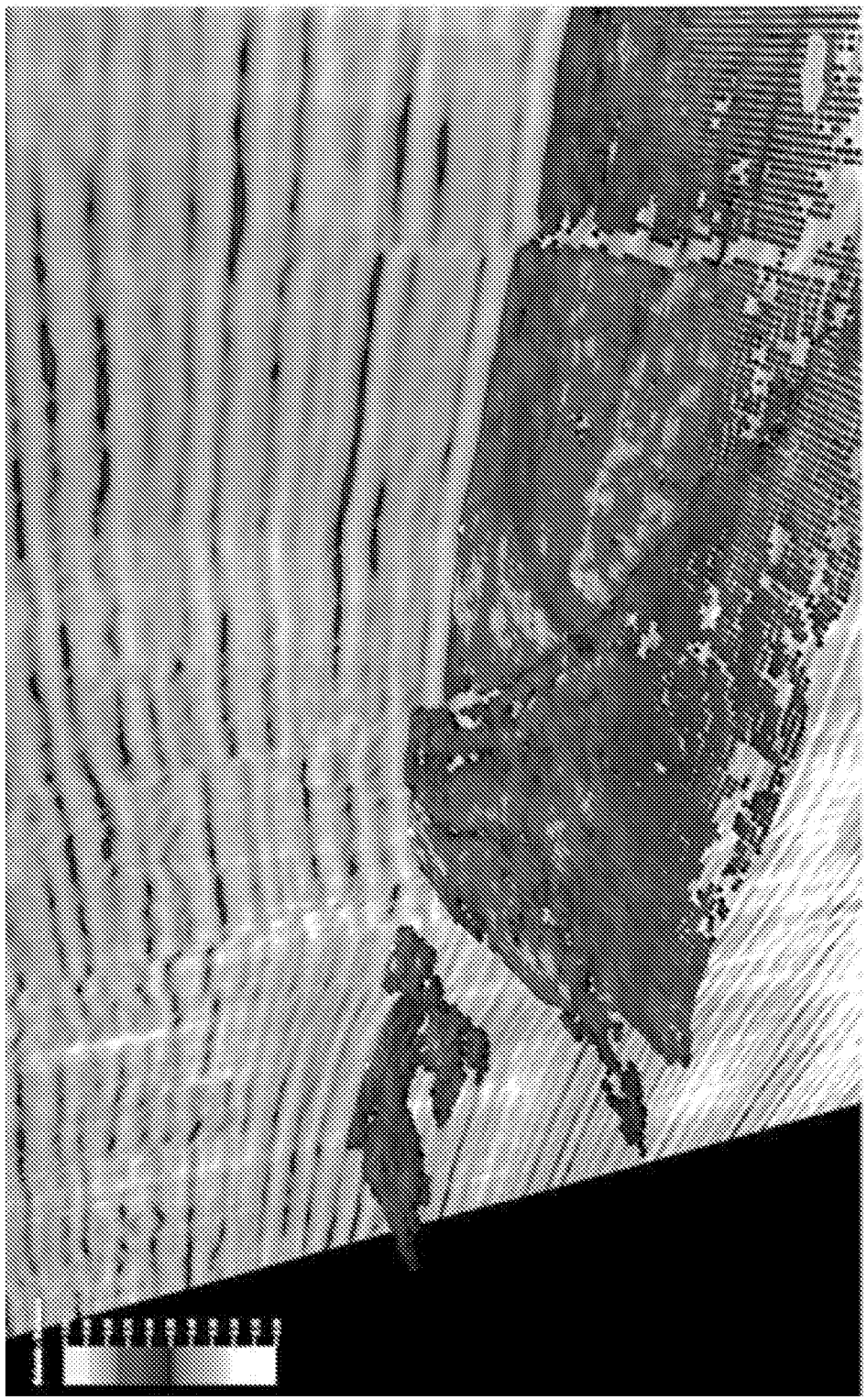
FIG. 15 illustrates an example of a graphical user interface.

FIG. 15 shows an example of a graphical user interface (GUI) 1500 where tracking has been implemented such that tracked points are guided by confidence scores, as displayed with extracted confidence.

Figure 16:
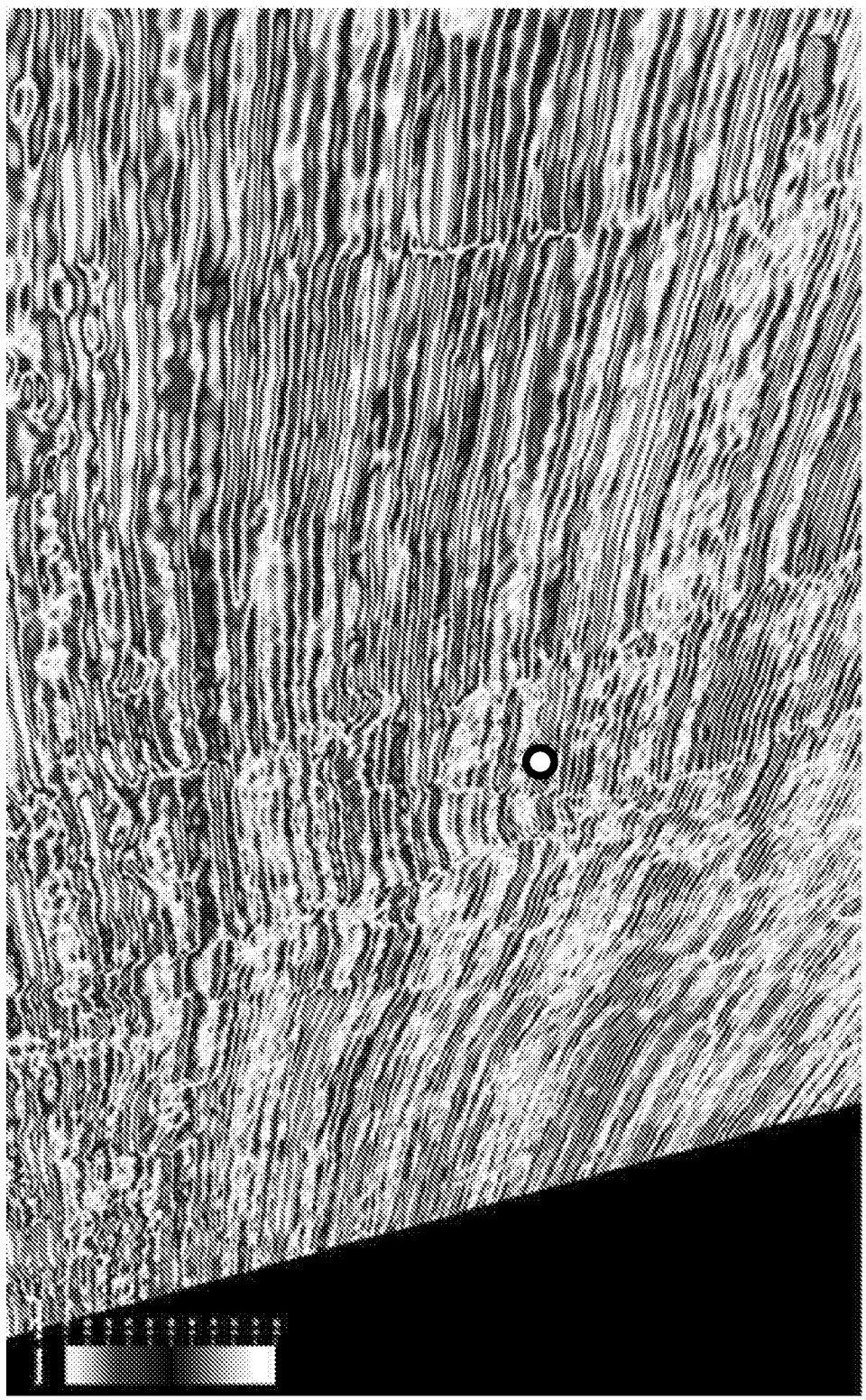
FIG. 16 illustrates an example of a graphical user interface.

FIG. 16 shows an example of a graphical user interface (GUI) 1600 that includes a seismic section, with one starting point as a white filled circle, which is a different surface than the previous example of FIGS. 12, 13, 14 and 15.

Figure 17:
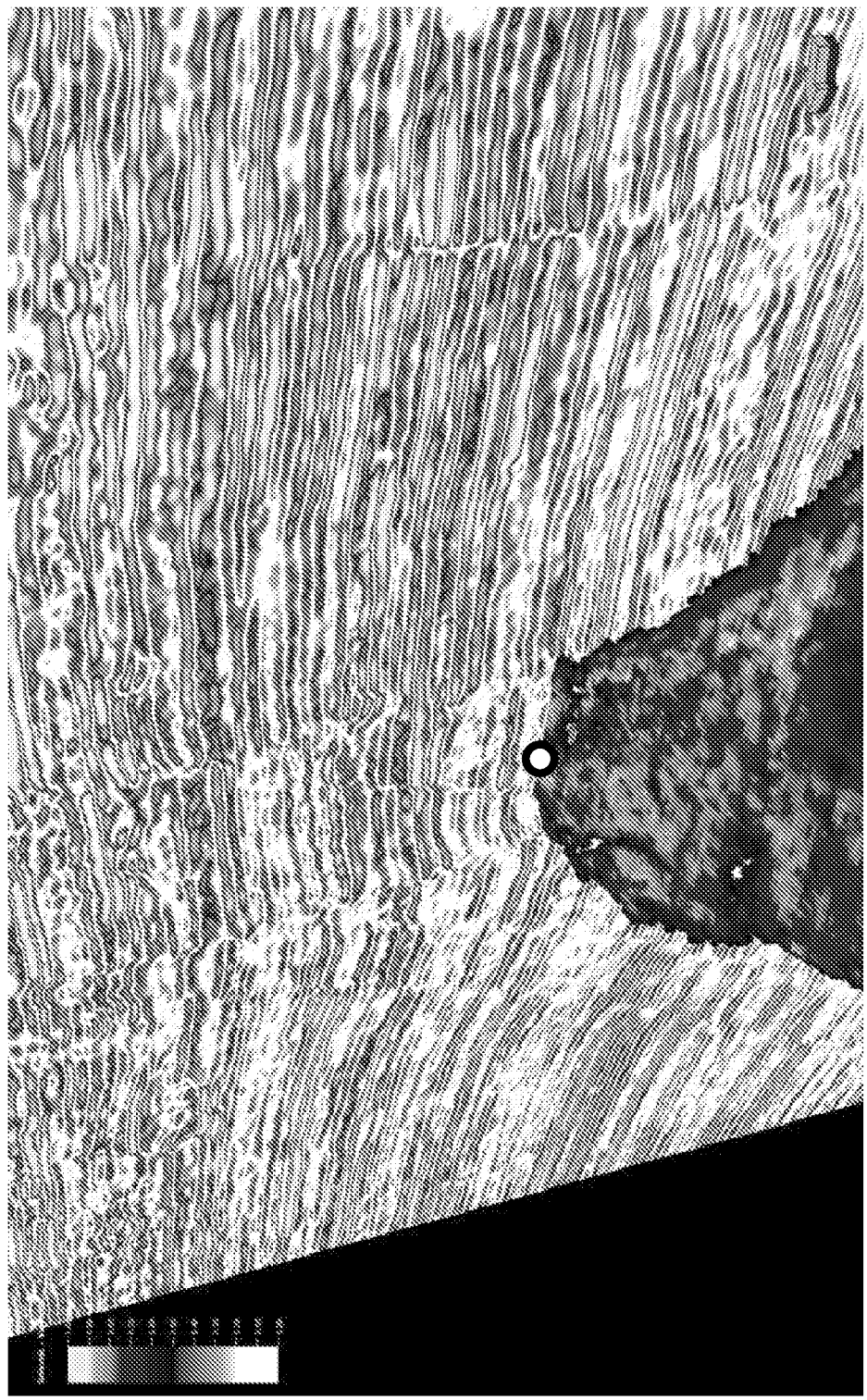
FIG. 17 illustrates an example of a graphical user interface.

FIG. 17 shows an example of a graphical user interface (GUI) 1700 that includes a rendering of a tracking result from the one starting point of FIG. 16, in white, using confidence scores as guidance. In the GUI 1700, confidence scores are displayed on points. Again, for this trial, notice how tracking stops at faults.

Figure 18:
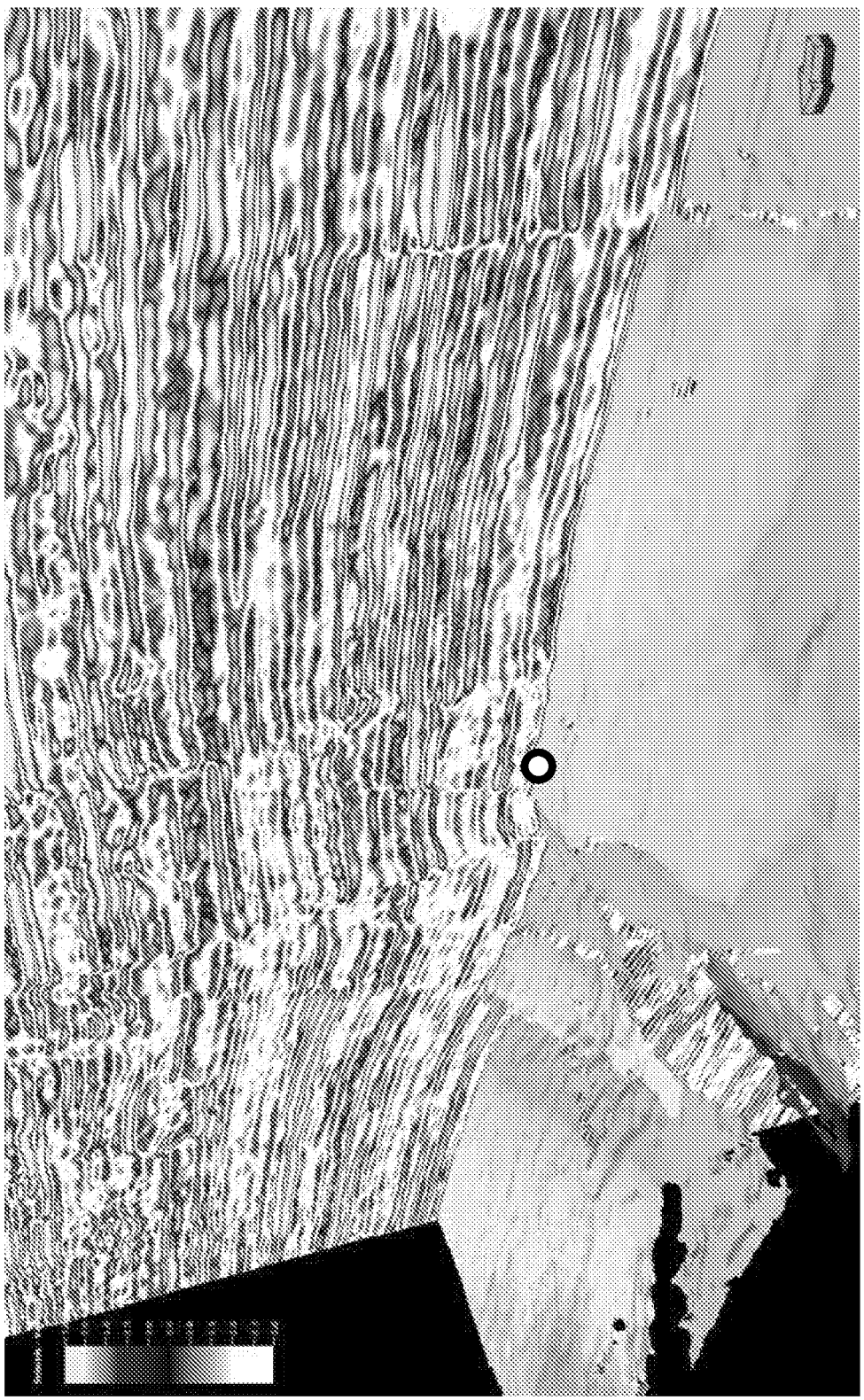
FIG. 18 illustrates an example of a graphical user interface.

FIG. 18 shows an example of a graphical user interface (GUI) 1800. In the example of FIG. 18, a surface is tracked from one starting point, represented as a white filled circle, following amplitude peaks, without using confidence score for guidance. As an example, a method may include using amplitude peaks and/or confidence scores.

Figure 19:
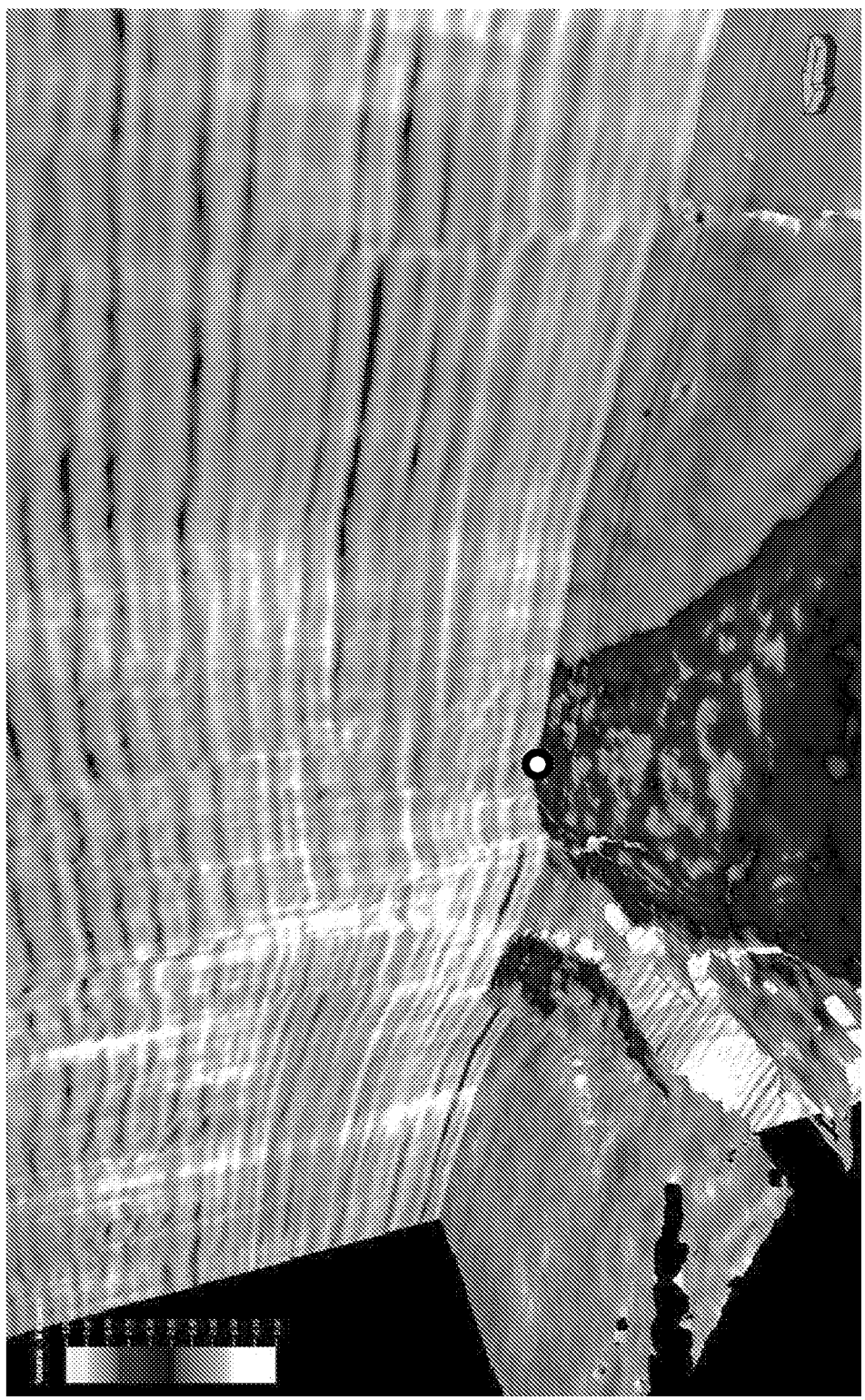
FIG. 19 illustrates an example of a graphical user interface.

FIG. 19 shows an example of a graphical user interface (GUI) 1900 which includes a tracked surface with confidence scores. In the example of FIG. 19, the confidence scores reveal one area with high confidence, but large areas with low confidence. To an interpreter, such a GUI 1900 with its rendered information as generated by a seismic interpretation system can be a signal that closer examination is warranted, possibly with reinterpretation. As an example, a confidence score may be used as a metric to consider tracking quality. For example, consider ant-tracking where a method that can include various actions of FIG. 8 can be implemented for assessing quality of the ant-tracking. As an example, a tracking algorithm can be implemented in a manner where confidence information is determined (e.g., based on RBFs, etc.) such that the algorithm can be assessed and/or guided.

Figure 20:
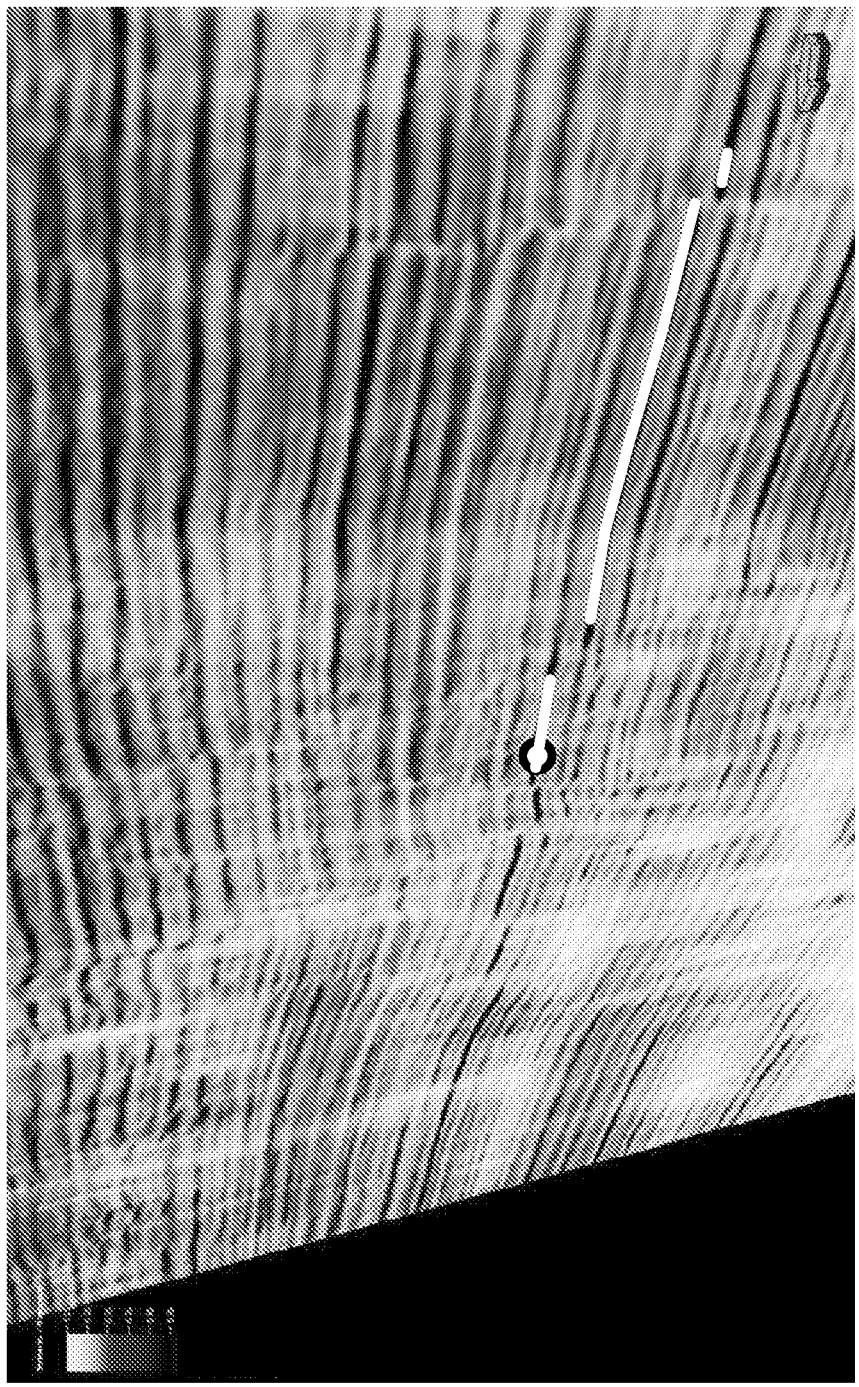
FIG. 20 illustrates an example of a graphical user interface.

FIG. 20 shows an example of a graphical user interface (GUI) 2000 that displays confidence score on a section, which reveals where the surface can be re-tracked in that there is indicated error and where re-tracking can reduce that error.

Figure 21:
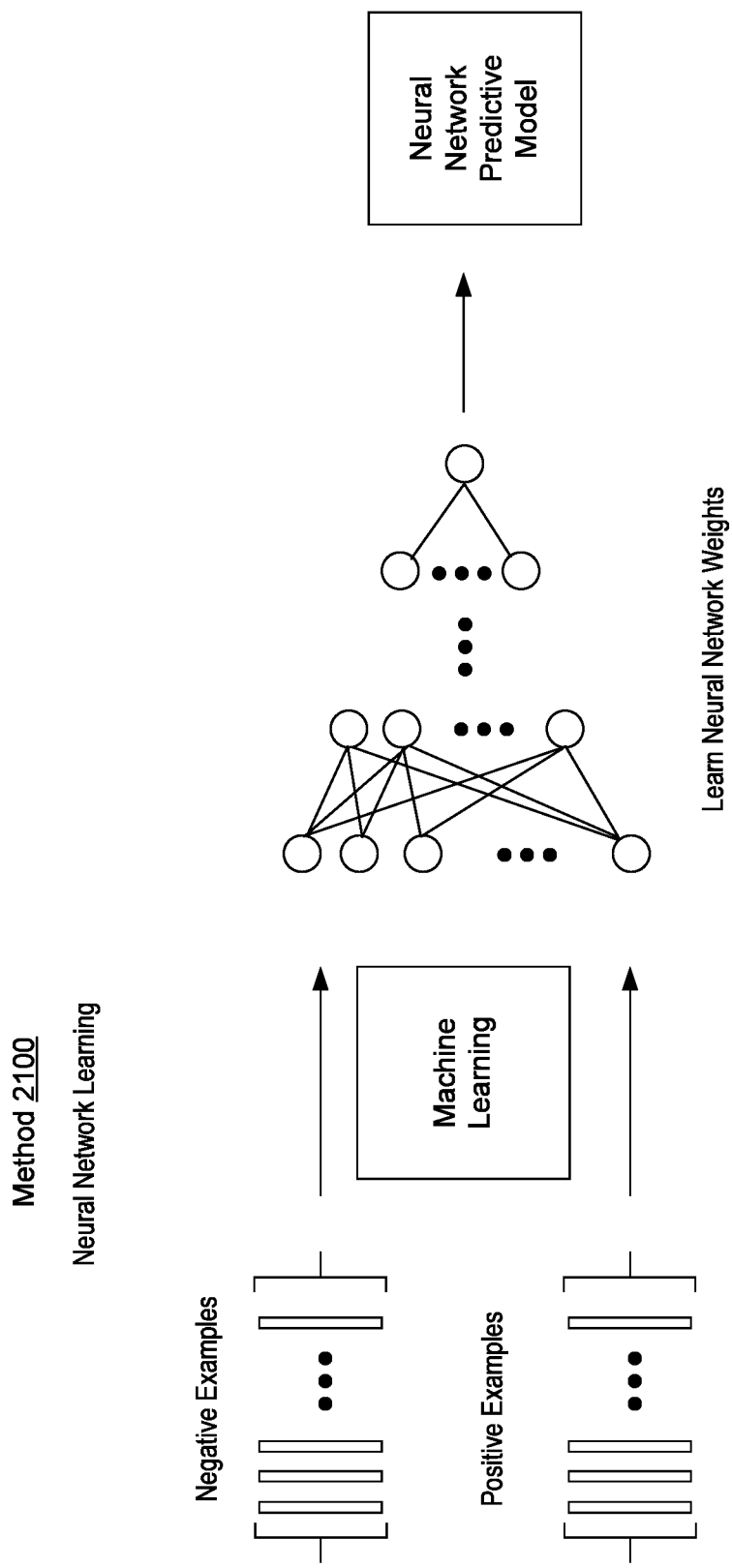
FIG. 21 illustrates an example of a method.

FIG. 21 shows an example of a method 2100 that includes machine learning using neural networks. In such an approach, instead of learning prototype patterns, as with radial basis functions, the class information is captured in the neural network weights. For example, from an input image (e.g., seismic data image), the trained network can produce and output values in, for example, a range [0, 1] which can be seen as the neural network confidence score.

Figure 22:
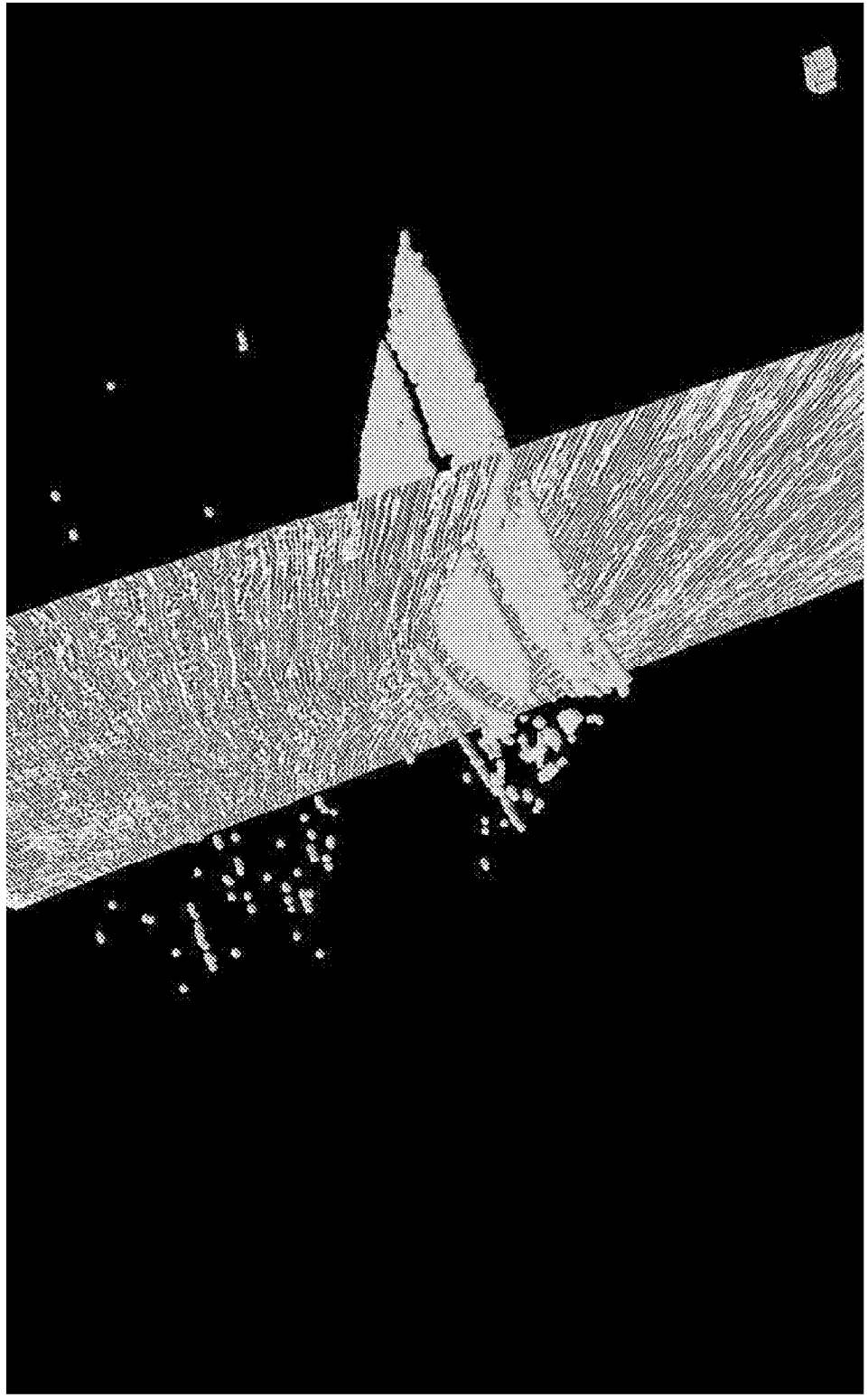
FIG. 22 illustrates an example of a graphical user interface.

FIG. 22 shows an example of a graphical user interface (GUI) 2200 that includes a rendering using a machine learning prediction model as a detector, returning trace-by-trace highest confidence, where the confidence score is above a pre-calculated threshold (e.g., predetermined, etc.), the results give a dense set of points at the surface. As to false positives, these may be seen as points far away from the main surface (e.g., desired surface to be interpreted). These points may be handled by altering the confidence score threshold or, for example, by geometric filtering. As to geometric filtering, such an approach may utilize a neighborhood exclusion approach a double trace identification exclusion approach, a region selection approach, etc. As to neighborhood exclusion, a boundary may be drawn about an identified surface using extreme points within a depth or time range where points outside of that depth or time range above and/or below may be selected for exclusion (filtering out). As to a double trace identification exclusion approach, a criterion can be specified such that a trace is to include a single instance of a surface such that a single trace does not give rise to multiple instances of a desired surface. In such an approach, a neighboring criterion can be utilized to assure that an outlier is excluded rather than a desired surface. As to a region selection approach, a user may interact with the GUI 2100 to select points in space that create a region where surface identifications within the region are kept and those outside the region are excluded.

As to various types of frameworks that include features for networks (e.g., kernel-based, neural networks, etc.), consider the TENSORFLOW framework (Google LLC, Mountain View, Calif.), which is an open source software library for dataflow programming that includes a symbolic math library, which can be implemented for machine learning applications that can include neural networks as well as kernel methods (e.g., with linear models). As an example, the CAFFE framework may be implemented, which is a deep learning framework developed by Berkeley AI Research (BAIR) (University of California, Berkeley, Calif.). As another example, consider the SCIKIT-LEARN library or platform (e.g., scikit-learn), which utilizes the PYTHON programming language (e.g., with features for neural networks, kernel methods, etc.). As an example, a framework such as the APOLLO AI framework may be utilized (APOLLO.AI GmbH, Germany).

Figure 23:
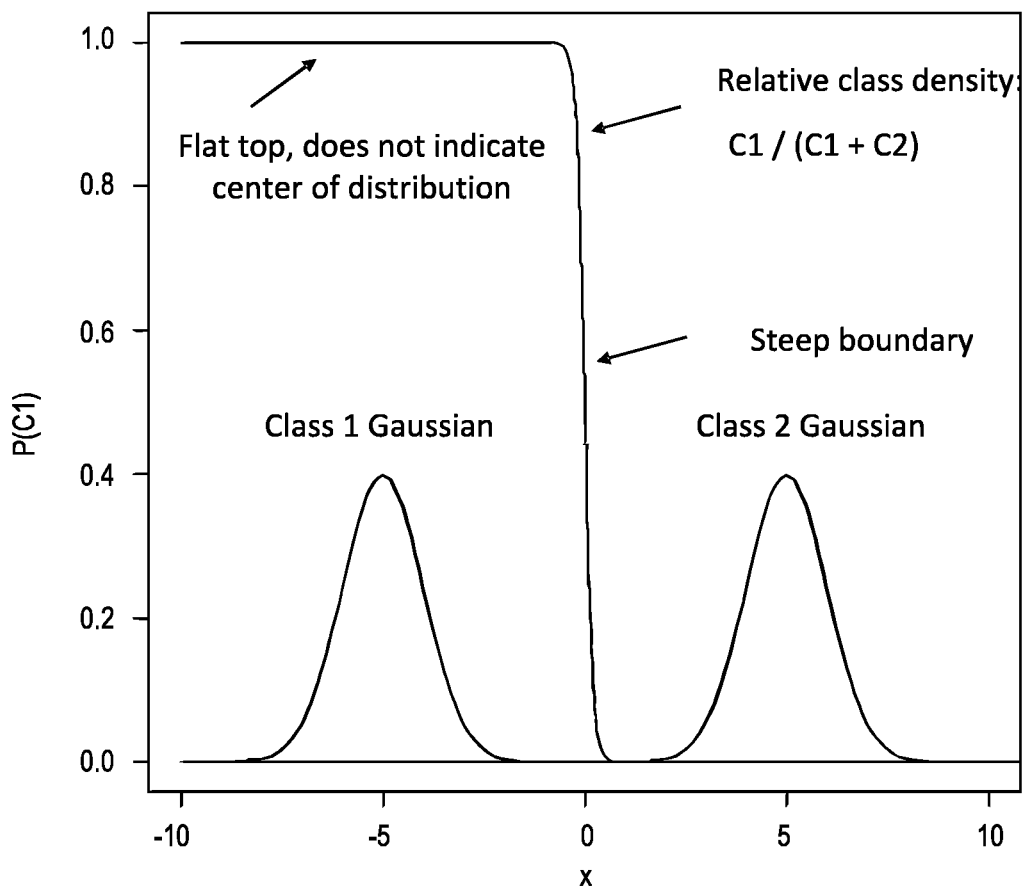
FIG. 23 illustrates an example of a method.
Figure 24:
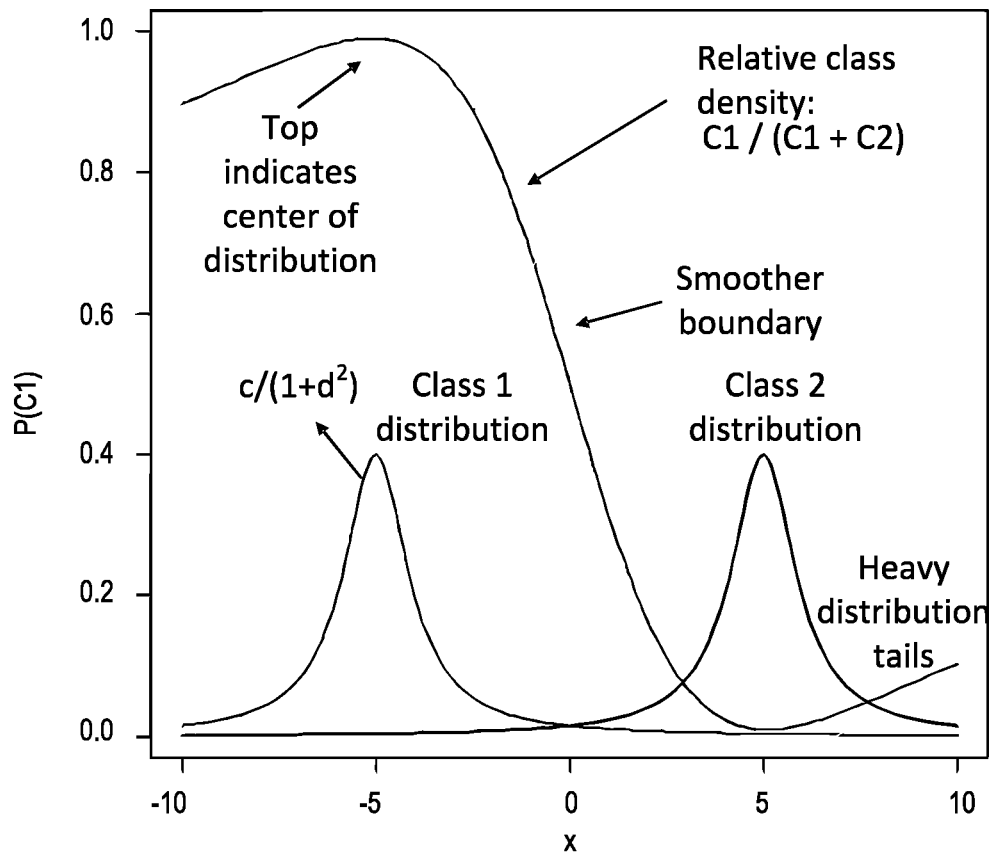
FIG. 24 illustrates an example of a method.
Figure 25:
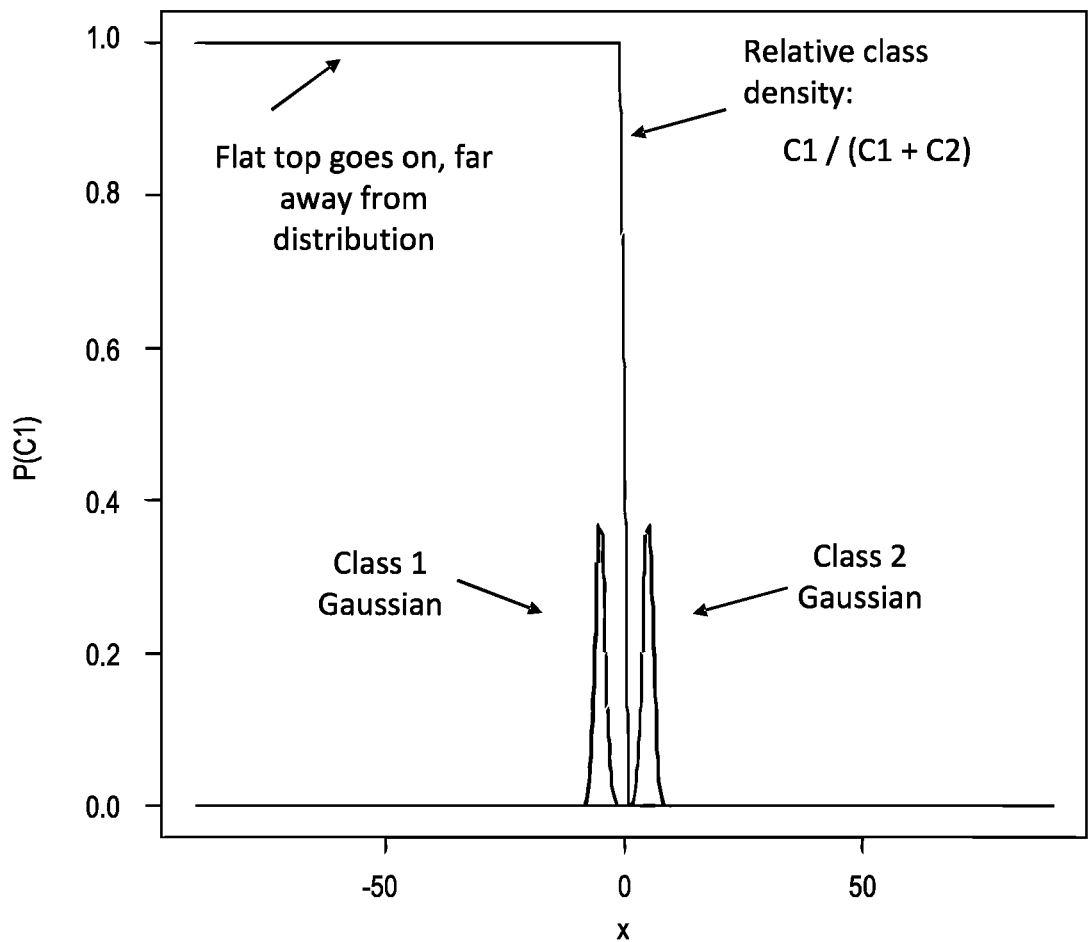
FIG. 25 illustrates an example of a method.
Figure 26:
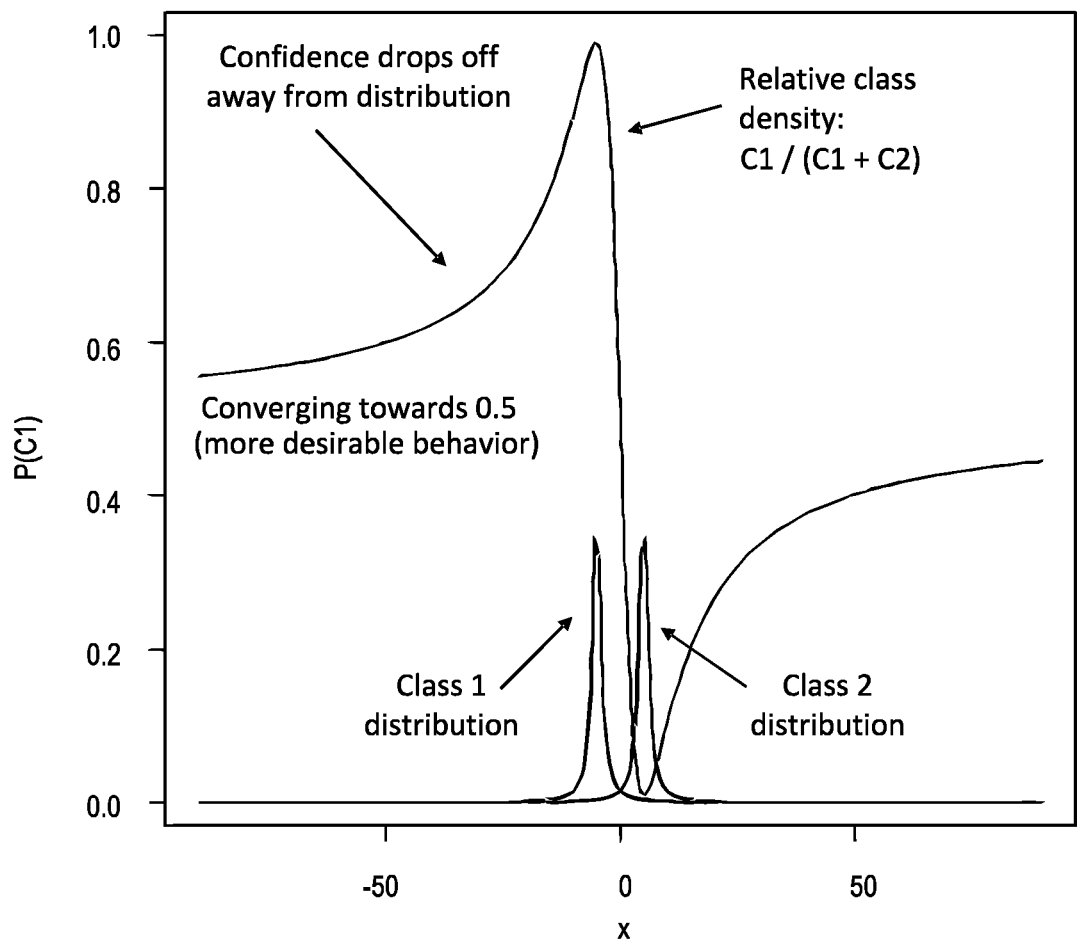
FIG. 26 illustrates an example of a method.

FIGS. 23, 24, 25 and 26 shows examples of methods 2300, 2400, 2500 and 2600 that utilize various techniques, which are illustrated via plots. As shown in FIG. 23, the method 2300 uses Gaussians as RBFs, which provide for 2 classes and a steep boundary where the flat top for Class 1 does not indicate a center of the Class 1 Gaussian distribution. As shown in FIG. 24, the method 2400 uses a heavy tail quadratic decay as RBFs, which provide for 2 classes and a smooth boundary where a top for Class 1 indicates a center of the Class 1 distribution (see also the bottom for Class 2). As shown in FIG. 25, on a large scale, the method 2500 with Gaussians as RBFs provide a flat top that continues on and on along the dimension x. As shown in FIG. 26, on a large scale, the method 2600 with heavy tail decay as RBFs provides for a diminishing confidence with increasing distances (dimension) from the Class 1 distribution, where such a diminishing confidence can tail off to a particular value (e.g., converge to a value of approximately 0.5 in the example of FIG. 26).

As mentioned, a method can utilize a nearest neighbor approach such as a K nearest neighbor approach. An example of an instance-based method is the K-nearest neighbor algorithm, which assumes instances correspond to points in an n-dimensional space R. As an example, the nearest neighbors of an instance can be defined in terms of a standard Euclidean distance (e.g., measure, dimension, etc.). More precisely, an arbitrary instance x can be described by a feature vector:

$$\langle a_1(x), a_2(x), \ldots a_n(x) \rangle$$

where $a_r(x)$ denotes the value of the rth attribute of instance x. In such an approach, the distance between two instances $x_i$ and $x_j$ can be defined to be $d(x_i, x_j)$, where:

$$d(x_i, x_j) \equiv \sqrt{\sum_{r=1}^{n} (a_r(x_i) - a_r(x_j))^2}$$

As explained, a radial basis function (RBF) is a type of approximation function. As an example, RBFs can be represented by a linear combination of many local kernel functions. As an example, a learned hypothesis can be a function of the form:

$$\hat{f}(x) = w_0 + \sum_{u=1}^{k} w_u K_u(d(x_u, x))$$

where each $x_u$ is an instance from X and where the kernel function $K_u(d(x_u, x))$ can be defined so that it decreases as the distance $d(x_u, x)$ increases. Above, k may be a user-provided constant that specifies a number of kernel functions to be included or it may be a machine provided number that may be tailored to a particular set of seismic data (e.g., region of the Earth, acquisition technique, etc.).

While $\hat{f}(x)$ is a global approximation to f(x), the contribution from each of the $K_u(d(x_u, x))$ terms can be localized to a region nearby the point $x_u$. As an example, a method can include selection of each function $K_u(d(x_u, x))$ to be a Gaussian function centered at the point x, with some amount of variance, denoted as $\sigma_u^2$. As mentioned, one or more other types of approaches may be utilized such as, for example, a heavy tail approach. An example of a Gaussian kernel function is presented below:

$$K_u(d(x_u, x)) = e^{1/2\sigma_u^2 d^2(x_u, x)}$$

In the SCIKIT-LEARN library written for PYTHON implementation, a function rbf_kernel can be called. The function rbf_kernel computes the RBF kernel between two vectors where the kernel is defined as:

$$k(x, y) = e^{(-\gamma \|x-y\|^2)}$$

where x and y are the input vectors. As explained, a variance may be utilized such as, for example, consider setting γ equal to $\sigma^{-2}$ such that the kernel is a Gaussian kernel of variance $\sigma^2$.

In SCIKIT-LEARN, the rbf_kernel function is specified as follows:

sklearn.metrics.pairwise. rbf_kernel(X, Y=None, gamma=None)

where parameters are:
  X: array of shape (n_samples_X, n_features)
  Y: array of shape (n_samples_Y, n_features)
  gamma: float, default None
  If None, defaults to 1.0/n_features where a call to the function returns:
    kernel_matrix: array of shape (n_samples_X, n_samples_Y)

The SCI KIT-LEARN library also provides the following class sklearn.gaussian_process.kernels with RBF(length_scale=1.0, length_scale_bounds=(1e-05, 100000.0)). RBF( ) provides a kernel given by:

k(x_i,x_j)=exp(-½d(x_i/length_scale, x_j/length_scale)^2)

with parameters:
  length_scale: float or array with shape (n_features,), default: 1.0; as the length scale of the kernel where if a float, an isotropic kernel is used and where, if an array, an anisotropic kernel is used where each dimension of I defines the length-scale of the respective feature dimension; and
  length_scale_bounds: pair of floats >=0, default: (1e-5, 1e5), for lower and upper bound on length_scale.

The SCI KIT-LEARN library provides for definition of customized kernels, which may, for example, be passed in methods as parameters, etc. The SCIKIT-LEARN library also includes a RBFSampler that provides for an approximation to a RBF kernel using random Fourier features. Specifically, the RBFSampler approximates a feature map of an RBF kernel by a Monte Carlo approximation of its Fourier transform.

As explained above, the RBF kernel includes a squared term in an exponential, which may be referred to as a "squared exponential" kernel. In the PYTHON programming language, using the SCI KIT-LEARN library, a kernel may be set as follows kernel=1.0*RBF([1.0]) or kernel=1.0*RBF([1.0, 1.0]), for example, to provide for isotropic kernel classification and for anisotropic kernel classification, respectively. As to an anisotropic kernel, it may assign different length-scaled to different feature dimensions.

As an example, a method may be implemented using a library such as, for example, the SCIKIT-LEARN library. As an example, a method may be implemented using a programming language such as, for example, the PYTHON programming language. As an example, one or more features in a library such as the SCIKIT-LEARN library may be utilized to train a machine model and/or utilize a trained machine model (e.g., RBF, neural network, etc.).

Figure 27:
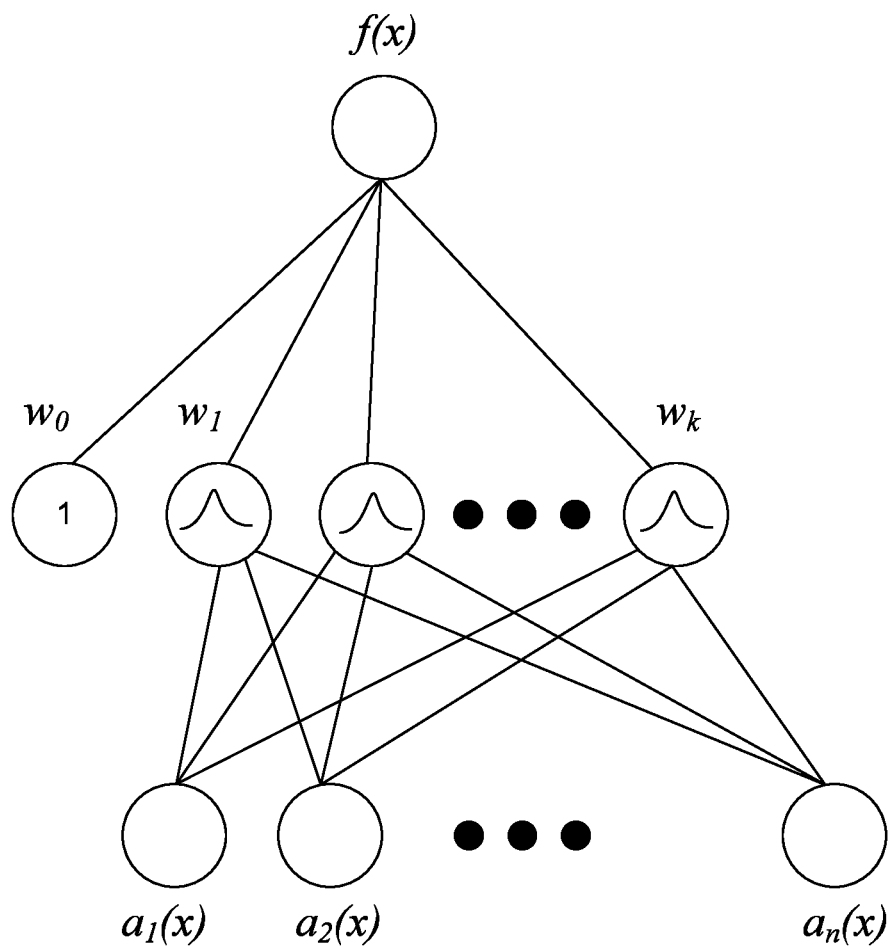
FIG. 27 illustrates an example of a method.

FIG. 27 shows an example of a method 2700 that includes a network that includes features associated with a RBF approach. As to the method 2700, a function may be viewed as describing a two-layer network where the first layer of units computes the values of the various $K_u(d(x_u,x))$, and the second layer computes a linear combination of these first-layer unit values. While a two-layer network is illustrated, a network with more than two layers may be utilized.

In FIG. 27, the illustrated network associated with the method 2700 can be a RBF network where each hidden unit produces an activation determined by a Gaussian function (e.g., or another function or functions) centered at some instance $x_u$. In such an example, activation can be close to zero (e.g., or other null) unless the input x is near $x_u$. In the example method 2700 of FIG. 27, the output unit produces a linear combination of the hidden unit activations.

As an example, a RBF network may be trained in a two-stage process when given a set of training examples. In such an example, first, a number k of hidden units may be determined where each hidden unit u is defined by selection of values of $x_u$ and a that define its kernel function $K_u$ $(d(x_u,x))$; and, second, the weights $w_u$ can be trained to maximize the fit of the network to the training data, for example, using a global error criterion.

As an example, a method can include minimizing the squared error over k nearest neighbors as follows:

$$E \equiv \frac{1}{2}\sum_{x \in D}(f(x) - \hat{f}(x))^2$$

As kernel functions can be held fixed during a second stage, the linear weight values $w_u$ can be trained, which can provide for efficiency of the method.

An approach for selection of an appropriate number of hidden units or kernel functions when the number of training examples can be large can be to select a set of kernel functions that is smaller than the number of training examples. As an example, a set of kernel functions may be distributed with centers spaced uniformly throughout the instance space X.

As an example, a network can be viewed as a smooth linear combination of many local approximations to a target function. A benefit to a RBF network can be efficient training, in that a RBF network can be trained much more efficiently than feed-forward networks trained with back-propagation. Efficiency follows from the input layer and the output layer of an RBF being trained separately.

As to a neuronal approach, a biological definition of a neuron can be a cell as in a brain whose principal function is collection, processing and dissemination of electrical signals.

FIG. 28 shows an example of a method 2800 that can utilize a neural network that includes neurons such as an example neuron 2850. As to the neuron 2850, it is illustrated as a diagram in a mathematical sense where the neuron includes an input function, an activation function and output; noting that a neural network can include a plurality of such neurons.

As to a mathematical description of the neuron 2850 (e.g., as a unit), the unit's output activation may be defined as $a_i = g\Sigma_{j=0}{}^n(W_{j,i},a_j)$, where $a_j$ is the output activation of unit j and $W_{j,i}$ is the weight on the link from unit j to this unit.

A neural network may be defined as set of machine learning algorithms (e.g., logistic regressions) that are combined to mimic biological neural activity. As an example, units can be trained to provide a trained machine model that is suitable for performing one or more tasks. Types of neural networks include acyclic or feed-forward networks and cyclic or recurrent networks. A difference between a feed-forward network and a recurrent network is that the first represents a function of its current input, while the last feeds its outputs back into its own inputs. This means that the activation levels of the neural network form a dynamical system that may reach a stable state or exhibit oscillations or even chaotic behavior. Recurrent neural networks can support short-term memory, which may be utilized in machine learning, for example, as an ability to memorize input and learn from it.

As to the method 2800 of FIG. 28, it can include utilizing a multilayer feed-forward neural network. As an example, an input component may take in a numerical value varying from 0 to 1 and, for example, a neuron with no input can output the same value, which can be useful for shifting of the activation function, known as a "bias" (see, e.g., the bias weight of the neuron 2850).

As an example, a neural network can be a fully-connected neural network with three or more hidden layers where each hidden layer may include, for example, at least approximately 10 units. For example, consider a fully-connected neural network with an input layer, three hidden layers and an output layer where each of the hidden layers includes at least approximately 10 units (e.g., neurons). Such a neural network can be trained (e.g., via weight assignment, etc.) to predict confidence information (e.g., confidence scores, etc.) for seismic data (e.g., points, pixels, voxels, etc.) in relationship to a structural feature as may be represented in seismic data as an event (e.g., a "wiggle" in a seismic trace).

As to training, a method may include augmenting data. For example, one or more approaches may be taken to generate more data for training where the data may be based on a smaller set of actual data and/or synthetic data (e.g., as may be generated using an earth model, etc.). As an example, the amount of training data may be less for a kernel based approach than for a neural network based approach. As an example, a computational framework may utilize a kernel based approach as a default, particularly where a user may have access to a limited amount of training data. In such an example, an option may exist for utilization of a neural network based approach, for example, where a user has access to an appropriate amount of training data (e.g., whether actual, augmented actual, synthetic, etc.).

As explained with respect to the neuron 2850, weights can be assigned to a certain input with a real value where the value can indicate relevancy. Each input can be multiplied by its weight. As explained with respect to the neuron 2850, an activation function can be a mathematical function for mapping the weighted input to an output. As an example, an output value may be with respect to a scale such as from 0 to 1, −1 to +1, 0 to 100, etc. As last component is for output, which receives one or more results from one or more activation functions.

As shown in FIG. 28, the layered structure of the neural network takes in one or more components as inputs and yields one or more results from the outputs. The layers in between the input and output are known as the hidden layers, as they may be hidden (e.g., not directly observed) when running the neural network. By adding hidden layers, a space of hypotheses that the network can represent can be enlarged.

As an example, a neural network can include output that is indicative of whether a point is likely a point of a structural feature, which may be a structural feature to be tracked. As an example, where a multiple event approach is utilized, a neural network may output multiple indications that can match a point with an event. As an example, an output node of a neural network may be a value or may be a binary (e.g., yes or no) type of output. As an example, a neural network can include one or more output nodes that represent values such as confidence values (e.g., consider a range from 0 to 1 or 0 to 100). In a single event approach, as an example, a node may be activated that corresponds to a confidence value or, as an example, a node may have a numeric value that corresponds to a confidence value. As an example, a neural network may be trained and have an architecture to provide one or more types of outputs for analyzing seismic data, which can be in digital form (e.g., as a vector of trace, as a 2D array of an image/slice, as a 3D array of a volume, etc.).

Precision and recall can be based on understanding and measure of relevance. Precision (positive predictive value) is a fraction of relevant instances among retrieved instances, while recall (sensitivity) is the fraction of relevant instances that have been retrieved over a total amount of relevant instances. Precision can provide an indication about usefulness of search results, while recall can provide an indication about completeness of the results. A high precision can yield an algorithm that returns substantially more relevant results than irrelevant ones. A high recall means that the algorithm returns most of the relevant results.

As an example, results may be combined into a single measure called the F-measure. The F-measure is the weighted harmonic mean of precision and recall (or the Matthews correlation coefficient, which is a geometric mean of the chance-corrected variants). The traditional F-measure or balanced F-score may be given as:

$$F = 2 \cdot \frac{\text{precision} \cdot \text{recall}}{\text{precision} + \text{recall}}$$

where the F-measure is approximately the average between precision and recall when they are close.

An example method can be based on one or more of a plurality of techniques within machine learning. For example, a method can include one or more of radial basis functions (RBF) and neural networks (NN) as options.

Figure 29:
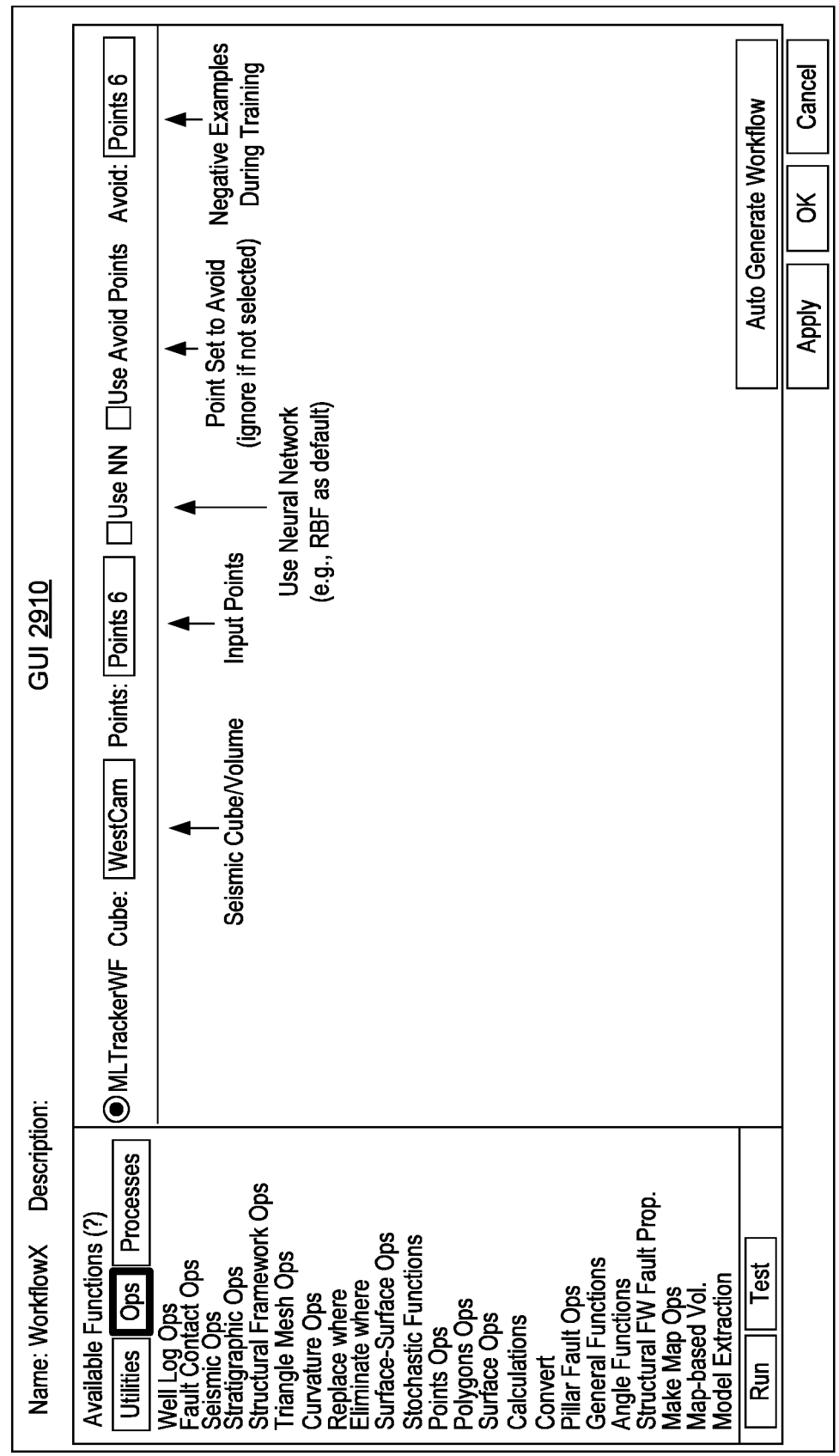
FIG. 29 illustrates an example of a method and an example of a graphical user interface.

FIG. 29 shows an example of a method 2900 that can utilize a graphical user interface 2910 rendered to a display, where the GUI 2910 may be part of a computational framework. For example, consider processor-executable instructions that can be executed via the PETREL framework during a seismic interpretation workflow. Such instructions may provide for local and/or remote rendering. For example, in a cloud architecture, a computational framework may execute using cloud-based resources where a user interacts with such resources using a client device (e.g., a tablet, a laptop, a workstation, etc.). In such an example, the client device can be operatively coupled to a network for receipt and transmission of information to the computational framework, for example, via a browser application. In such an example, interactions may utilize one or more types of formats such as, for example, the JAVASCRIPT OBJECT NOTATION format (JSON).

JSON is a lightweight data-interchange format that is based on a subset of the JAVASCRIPT programming language, Standard ECMA-262 3rd Edition, December 1999. JSON is a text format that is language independent but uses conventions that are familiar to programmers of the C-family of languages, including C, C++, C#, JAVA, JAVASCRIPT, PERL, PYTHON, etc. Such properties make JSON a useful data-interchange language.

JSON is built on two structures: a collection of name/value pairs (e.g., realized as an object, record, struct, dictionary, hash table, keyed list, or associative array); and an ordered list of values (e.g., realized as an array, vector, list, or sequence).

As an example, a method may be implemented at least in part as a microservice. As an example, a microservice may utilize the JSON format for transferring both requests and responses. In such an example, data may optionally be sent using REST where information is transformed to JSON format. As an example, a method may be implemented using the DELFI environment, the PETREL framework, etc. As an example, a method may be implemented using one or more application programming interfaces (APIs). For example, consider an approach that utilizes an API-based microservice where resources may be remote from a device of a user. In such an example, the device may include a browser application that can transmit information as one or more API calls to a remote computing system (e.g., cloud-based, etc.) and receive in response information generated by the remote computing system, which may include one or more machine models that are trained, can be trained, etc. For example, consider a user viewing a display of a client device with a rendering of seismic data as a seismic image. In such an example, the user may interact with a GUI to cause transmission of an API call as associated with a microservice. Such a call may be to train a machine model using a selected point that is representative of a structural feature in the seismic data (e.g., as from a survey of a geologic region). In response, the client device may receive an indication from the microservice that the trained machine model is ready to use, for example, to analyze at least a portion of the seismic data to generate results such as, for example, confidence results, tracking results, confidence and tracking results, etc.

The method 2900 of FIG. 29 can be a workflow generation method that interacts with the GUI 2910 to generate a workflow that can be executed, for example, to assist with interpretation of seismic data using one or more machine learning techniques. As an example, one or more features of the GUI 2910 may be associated with one or more microservices (e.g., provide via one or more microservices). As shown, a user may provide a name and a description of a workflow to be generated. The GUI 2910 can include features to select various types of utilities, operations (Ops) and processes. As shown, a MLTrackerWL operation is selected where a panel of the GUI 2910 provides for specifying how the MLTrackerWF is to perform, for example, to track structural features in seismic data.

As shown in the example of FIG. 29, the GUI 2910 includes a cube field for selection of a seismic volume (e.g., a seismic cube) as may be stored locally and/or remotely; noting that a seismic slice (e.g., 2D dataset) option can exist for selection of a seismic slice. The GUI 2910 also includes a points field for input of a number of points as well as a machine learning technique option, which can be RBF by default or neural network via selection using a graphical control. As mentioned, such a kernel based approach as a default may be beneficial to a user where the user may have access to a limited amount of training data where a kernel model is to be trained (e.g., as part of the workflow). As mentioned, where training is to occur and where a user has access to a sufficient amount of training data, a user may select the "UseNN" option. As an example, where a trained neural network is available, a user may select the "UseNN" option for a workflow. The GUI 2910 further includes a graphical control for points to avoid, along with points to avoid field for purposes of negative examples (see, e.g., FIGS. 10, 11 and 21).

As an example, the GUI 2910 may include an option for adjusting one or more machine learning techniques. For example, consider the various types of kernels that may be available and/or customizable (e.g., via the SCI KIT-LEARN library, etc.). The GUI 2910 may provide one or more graphical controls that can select, adjust, etc., one or more kernels. For example, consider selecting a Gaussian kernel, a non-Gaussian kernel, adjusting a tail parameter, adjusting a decay parameter, adjusting a length parameter, adjusting an isotropy parameter, adjusting an anisotropy parameter, etc., which may be performed with knowledge of a seismic survey and/or knowledge of one or more structural features in a region.

As an example, a user may generate a workflow via interactions with a GUI to handle tracking of a seabed as a first event in a series of traces from a seismic survey. In such an example, the user may execute the workflow to track the seabed as a structural feature. Once the seabed has been adequately characterized via the workflow, the user may proceed to another structural feature, for example, as a second event in the series of traces. Such an approach may be referred to as an iterative stratigraphic approach where a workflow may be designed for a particular event in a stratigraphic series of events (e.g., layers, etc.). Such an approach can optionally tailor a kernel in a manner that is best suited for a particular event, with recognition that events may exhibit differences. For example, an event below a seabed may differ from a seabed event (e.g., a trace "wiggle" for an event below the seabed may differ from a trace "wiggle" for the seabed event).

As an example, a workflow can involve selection of a number of events, for example, consider selecting five events where the workflow commences with a strongest event of the five events or commences with an uppermost of the five events. In such an approach, the workflow may analyze a seismic volume and determine which traces indicate "strong" events (e.g., amplitude, gradient, minimum, maximum, etc. of trace data). As an example, for a sea bottom may be a first strong event of a trace from the top of the trace. A workflow may optionally operate automatically starting with a sea bottom in a manner that does not involve manual input as a sea bottom (reflector) may be determined in a machine-based approach.

As an example, the GUI 2910 may include an option for handling a plurality of events in parallel and/or in series. For example, consider an approach that handles two events simultaneously where the two events may be separated by material as a relatively homogenous layer. For example, the first of the events may be an upper interface between two layers and the second of the events may be a lower interface between two layers where the relatively homogenous layer is disposed between the two interfaces. In such an example, a thickness of the layer may provide for spacing in time and/or distance of the two events. As an example, a machine model or machine models may leverage the thickness, which may be an approximated thickness optionally with a minimum and a maximum. Such an approach may be utilized to quality control and/or otherwise increase quality of tracking of the two events. As an example, in an iterative approach, where a structural feature as an event has been tracked to provide a surface (e.g., an interface), that information may be utilized in a subsequent iteration to facilitate tracking of a lower event for another surface. Information as to layers may be utilized, for example, as to one or more kernels. For example, consider utilization of an anisotropic kernel where a lateral dimension and a vertical dimension can be tailored based on knowledge of thickness of a layer that has an upper event and a lower event where a workflow aims to track the upper event and/or the lower event as distinct events. Where the layer thickness is relatively small, a vertical dimension of a kernel may be reduced and, where the layer thickness is relatively large, a vertical dimension of a kernel may be increased (e.g., or an isotropic kernel may be utilized, etc.).

As an example, a method can include manually and/or automatically selecting and/or adjusting a kernel to improve tracking of an event as present in seismic data (e.g., seismic traces). As an example, a GUI may provide for interactions with a computational framework, a library, libraries, etc., to provide for flexibility in kernel selections, adjustments, etc.

As an example, a method that performs simultaneous tracking of multiple structural features (e.g., multiple events) may utilize a kernel based approach as computational demands (e.g., training demands, etc.) may be less than those of a neural network based approach. In such an example, multiple machine models may be trained and utilized where each of the multiple machine models is trained to a particular structural feature (e.g., a particular event).

As an example, a tracking method may be referred to as an expansion method as a method can track via expansion of points. As mentioned, a method may provide for calculating confidence scores to generate, for example, a confidence score slice, a confidence score volume, etc., as types of seismic attributes. Such seismic attributes are based at least in part on something from which to measure confidence. For example, where one or more data points are provided as indicative of some type of feature, confidence scores may be calculated with respect to that feature. As mentioned, a feature may be a structural feature (e.g., a surface, a horizon, a conformity, an unconformity, a geobody, etc.).

In the example of FIG. 29, the GUI 2910 includes an auto generate workflow graphical control, which may be actuated via user interaction to cause the specified workflow to be automatically generated, which may then be executed (e.g., automatically and/or via user interaction). As an example, the GUI 2910 can provide a batch mode where a series of workflows may be generated and then executed in series and/or in parallel without user interaction. As an example, during batch execution, a graphical user interface may render results to a display where a user can visualize tracking, optionally in real time. In such an example, a GUI may provide for pausing, terminating, adjusting, etc., operation of the workflow, for example, depending on a user's assessment of the rendered results.

FIG. 30 shows an example of a method 3000 that can utilize a GUI 3010. As shown the GUI 3010 provides for specifying aspects of a MLTrackerWF workflow (WF). A column of names of parameters includes Cube, Points, UseNN, UseAvoidPoints, and Avoid, which are some examples. The GUI 3010 includes an apply control, an OK control and a Cancel control. The OK control may be actuated to cause generation of the specified workflow and closing of the GUI 3010 and execution of the workflow along with rendering of results to a display.

FIG. 31 shows an example of a method 3100, which pertains to a kernel based approach such as, for example, a RBF based approach. FIG. 31 illustrates how handling of a seed point (e.g., a picked point or otherwise selected point) that is utilized to seed a method, etc. As shown, a trace is represented using ovals as data samples, which may be raw or processed seismic data samples. A decision may be for deciding whether, at a particular time or depth or other dimension (e.g., a point), the trace exhibits a maximum or a minimum. Where the decision is "YES", the method 3100 can continue to a calculation block for calculation of a confidence score. The confidence score can then be compared to a threshold value where if the confidence score is greater than (e.g., or greater than or equal to) the threshold value, the method 3100 can proceed to a position block that positions the point in a priority queue (e.g., as a highest value, etc.). The method 3100 can then continue, as appropriate, in a loop for consideration of other points.

In the example of FIG. 31, a seed point can be compared to surrounding seeds in an interval [−5, 5], where, if the seed is a maxima or minima, the seed will calculate the confidence score, to determine if it is greater than a pre-determined value (e.g., 0.5, etc.). And, where it is greater than the pre-determined value, the method 3100 can place the seed in a priority queue and the method 3100 can continue to a next seed (e.g., where multiple seeds exist, are created, etc.).

FIG. 31 also shows an example of an expansion process, which may be performed as part of the method 3100. As illustrated from left to right, a planted seed point with its potential child points can be defined where one of the child points becomes a first expansion point (red) and results in definition of its surrounding child points. Similarly, a second expansion can be performed with another one of the potential child points, to define corresponding child points. In the example of FIG. 31, the L-shaped box areas identify seed points that can be put in queue for evaluation.

FIG. 32 illustrates an example of a method 3200 that includes output of confidence values as results of a prediction model (e.g., training that generates a digital signature as a trained model, etc.). As mentioned, a prediction model may be a kernel based model or a neural network based model. As an example, a method may generate a confidence trace sample, a confidence pixel, a confidence voxel, etc. For example, consider a method that generates a confidence trace for an input trace, a confidence pixel array for a seismic image (e.g., a seismic slice), and a confidence voxel array for a seismic volume.

As an example, a method can include selection of one or more inputs for data, which can be a seismic cube to be received and/or accessed and points, which can be a data structure stored in memory that is generated via interactions with a graphical user interface that renders a visualization to a display that include pixel values based on seismic data (e.g., digital seismic data as acquired for a geologic region that includes various subterranean structures (e.g., reflectors, interfaces, horizons, etc.). Such a method can include generating confidence values (e.g., confidence score) using a machine model, which can be a prediction model.

FIG. 33 illustrates an example of a method 3300 in the form of example pseudo-code. The method 3300 can include one or more features of the method 3100 of FIG. 31. For example, consider evaluation of points using a trained machine model. As shown in FIG. 33, the method 3300 can include learning a model (e.g., model learning or model training) using input points and surrounding data as positive and negative examples along with using the learned model (e.g., trained model) to evaluate points in a window (e.g., a vertical window) where such points may represent minima or maxima. In the example of FIG. 31, a window is illustrated as being +5 and −5 from a selected point where the plus and minus values can represent samples, pixels, voxels, etc., with corresponding values (e.g., amplitude values, etc.). As shown in FIG. 33, points (e.g., min/max) can be evaluated using the model and a threshold (e.g., a pre-determined confidence value). For example, model evaluation can be model prediction where a prediction is a confidence value in relationship to a structural feature. In such an approach, a higher confidence value means that the point evaluated is more likely to be associated with that structural feature. As shown in FIG. 32, a prediction model (e.g., a trained machine model) can be utilized to generate values for seismic data points (e.g., samples, pixels, voxels, etc.) where those values are in relationship to a structural feature, which may be represented as an event in seismic data.

As explained, a trained machine model can be trained for a particular structural feature that is represented by an event in a seismic trace as acquired by seismic survey equipment. Such a trained machine model can output confidence information, which may be directly related to whether a point is likely to be a point representing a structural feature.

Interpretation results of acquired data may be utilized to construct a model that is a geocellular model (e.g., a grid cell model, a nodal model, etc.). For example, consider a geocellular model that includes cells of length and width sizes of a few meters by a few meters with a height of approximately 0.1 meter to a few meters. As an example, a geocellular model can include more than 10,000 cells, more than 100,000 cells, more than 1,000,000 cells, etc. As an example, a geocellular model can be grouped into layers where layers may be grouped into stratigraphic intervals. Structural features may be classified as objects, which may be in one or more dimensions (e.g., 1D, 2D, 2.5D or 3D).

Figure 34:
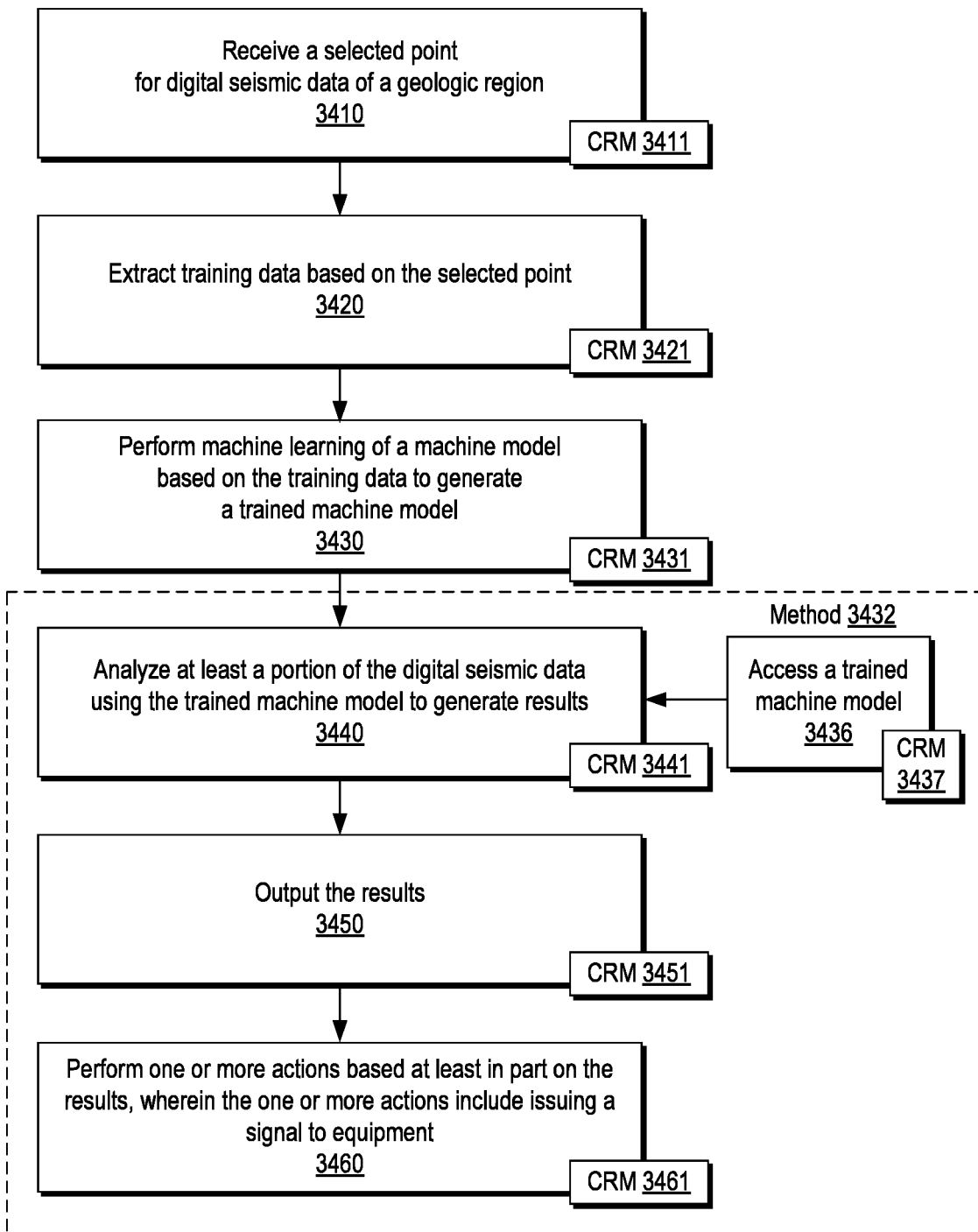
FIG. 34 illustrates an example of a method.

FIG. 34 shows an example of a method 3400 that includes a reception block 3410 for receiving a selected point (or points) for digital seismic data of a geologic region (e.g., a selected point from picking using a rendering of a visualization based on digital seismic data of a geologic region, a selected point via an automated structural feature identification technique, etc.); an extraction block 3420 for extracting training data based on the selected point (or points); a performance block 3430 for performing machine learning of a machine model based on the training data to generate a trained machine model; an analysis block 3440 for analyzing at least a portion of the digital seismic data using the trained machine model to generate results; and an output block 3450 for outputting the results. The method 3400 can include a performance block 3460 for performing one or more actions based at least in part on the results, where the one or more actions include issuing a signal to equipment.

As shown in the example of FIG. 34, a method 3432 may commence from an access block 3436 for accessing a trained machine model. For example, the method 3432 can include accessing a trained machine model as trained to analyze digital seismic data of a geologic region with respect to a structural feature of the region per the access block 3436; analyzing at least a portion of the digital seismic data using the trained machine model to generate results per the analysis block 3440; and outputting the results as indicators of spatial locations of the structural feature of the geologic region per the output block 3450. The method 3432 can include a performance block 3460 for performing one or more actions based at least in part on the results, where the one or more actions include issuing a signal to equipment.

As an example, a method can include animation. For example, consider performing a method such as the method of 3400 of FIG. 34 where the method generates information iteratively where a visualization can be rendered at one or more iterations such that a surface may be seen expanding from a selected point. In such an example, a GUI may be rendered that includes the visualization that can be interacted with, for example, to steer away from one or more regions, to pick one or more other points, etc.

As an example, one or more computer-readable storage media can include computer-executable instructions executable to instruct a computing system to perform a method, which may be, for example, a method as described herein.

In the example of FIG. 34, the method 3400 is shown with respect to computer-readable storage medium blocks (CRM blocks) 3411, 3421, 3431, 3441, 3451, and 3461; while the method 3432 is shown with respect to CRM blocks 3437, 3441, 3451, and 3461. Such blocks may be part of a system such as a seismic interpretation system. Such blocks can include instructions that are executable by one or more processors, which can be one or more processors of a computational framework, a system, a computer, etc. A computer-readable medium can be a computer-readable storage medium that is not a signal, not a carrier wave and that is non-transitory. For example, a computer-readable medium can be a physical memory component that can store information in a digital format. Where a CRM is part of a computing system or otherwise operatively coupled to a computing system, the system is a specialized system that can perform the method 3400 and/or the method 3432 of FIG. 34. Such a system can improve accuracy of an interpretation process for a subsurface region of the Earth. Such a process can include rendering one or more images to a display, rendering one or more graphics to a display, etc. In such examples, an image can be of a surface region, a subsurface region or a combination of a surface region and a subsurface region (e.g., as in an overlay of an analogue and a subsurface region). In such examples, a graphic may be a vector graphic rendering, which may be of a model that is defined by spatial positions that correspond to spatial positions of a subsurface region of the Earth, which may be in one or more coordinate systems and/or reference systems (e.g., actual, prior time, future time, etc.).

As an example, a method can include receiving a picked point from a rendering of a visualization based on digital seismic data of a geologic region; extracting training data based on the picked point; performing machine learning of a model based on the training data; analyzing at least a portion of the digital seismic data based on the model to generate results; and outputting the results. Such a method can include rendering of the visualization to a display where the digital seismic data of the geologic region is acquired by equipment that receives seismic energy signals and digitizes the seismic energy signals to generate the digital seismic data.

As an example, a method can include accessing a trained machine model as trained to analyze digital seismic data of a region with respect to a structural feature of a geologic region; analyzing at least a portion of the digital seismic data using the trained machine model to generate results; and outputting the results as indicators of spatial locations of the structural feature of the geologic region. In such an example, the method may include training to generate the trained machine model where the training includes receiving a selected point for the digital seismic data of the geologic region; extracting training data based on the selected point; and performing machine learning of a machine model based on the training data to generate the trained machine model.

As an example, a trained machine model can be a trained neural network model. As an example, a method can include training a neural network model to generate a trained neural network model. As an example, a trained machine model can be a trained kernel based model. As an example, a method can include training a kernel based model to generate a trained kernel based model. As an example, a kernel can be a radial basis function kernel or another type of kernel. For example, as mentioned, various types of kernels can be accessible via a library or, for example, may be programmed or otherwise accessed. As mentioned, a kernel may be isotropic or anisotropic. As mentioned, a kernel may have a decay characteristic, which may be a tail characteristic (e.g., a heavy or fat tail, etc.). As mentioned, a neural network may be a fully connected neural network with several hidden layers (e.g., approximately three to five hidden layers, etc.) where each hidden layer includes at least approximately 10 units (e.g., neurons).

As an example, outputting results can include augmenting a visualization by rendering of at least one confidence indicator that indicates a confidence of a correspondence between a trained machine model (e.g., a feature on which it was trained, etc.) and the at least a portion of the digital seismic data. Such a confidence indicator may be associated with a feature such as a surface that is desired to be interpreted.

As an example, digital seismic data can include trace data specified with respect to time and/or trace data specified with respect to distance. As an example, seismic attribute data may be utilized as a form of digital seismic data (e.g., processed raw seismic data, etc.).

As an example, machine learning can utilize radial basis functions. As an example, such radial basis functions can include heavy tails. As an example, radial basis function can include a decay term that decays with respect to a dimension (e.g., "d"). As an example, a dimension can be a time dimension or a distance dimension.

As an example, a method can utilize digital seismic data of a seismic cube. In such an example, results can be a confidence cube that corresponds to at least a portion of the seismic cube. In such an example, a method can include performing tracking on the confidence cube.

As an example, analyzing can include parallel processing that processes portions of the seismic cube in parallel with respect to the model to generate results for each of the portions of the seismic cube. In such an example, a method can include performing tracking on at least one of the results for at least one corresponding portion of the seismic cube. As an example, results can include confidence sub-cubes (e.g., corresponding to seismic sub-cubes).

As an example, results can include confidence results and a method can include analyzing the confidence results via a confidence score threshold. In such an example, a method can include comparing the analyzing to results of a tracking process to assess at least the quality of the tracking process.

As an example, a method can be implemented by a system that is a computational system that is operatively coupled to one or more displays where such a method can include rendering at least one graphical user interface to a display.

As an example, a system can include a processor; memory operatively coupled to the processor; and processor-executable instructions stored in the memory to instruct the system to: receive a picked point from a rendering of a visualization based on digital seismic data of a geologic region; extract training data based on the picked point; perform machine learning of a model based on the training data; analyze at least a portion of the digital seismic data based on the model to generate results; and output the results.

As an example, a system can include a processor; memory operatively coupled to the processor; and processor-executable instructions stored in the memory to instruct the system to: access a trained machine model as trained to analyze digital seismic data of a region with respect to a structural feature of a geologic region; analyze at least a portion of the digital seismic data using the trained machine model to generate results; and output the results as indicators of spatial locations of the structural feature of the geologic region. As an example, such a system can include processor-executable instructions stored in the memory to instruct the system to perform training to generate the trained machine model where the training utilizes instructions to receive a selected point for the digital seismic data of the geologic region; extract training data based on the selected point; and perform machine learning of a machine model based on the training data to generate the trained machine model.

As an example, one or more computer-readable storage media can include computer-executable instructions executable to instruct a computing system to: access a trained machine model as trained to analyze digital seismic data of a region with respect to a structural feature of a geologic region; analyze at least a portion of the digital seismic data using the trained machine model to generate results; and output the results as indicators of spatial locations of the structural feature of the geologic region.

As an example, one or more computer-readable storage media can include computer-executable instructions executable to instruct a computing system to perform one or more methods or portions thereof described herein.

As an example, a workflow may be associated with various computer-readable medium (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium that is non-transitory, not a carrier wave and not a signal. As an example, blocks may be provided as one or more sets of instructions, for example, such as the one or more sets of instructions 270 of the system 250 of FIG. 2.

Figure 35:
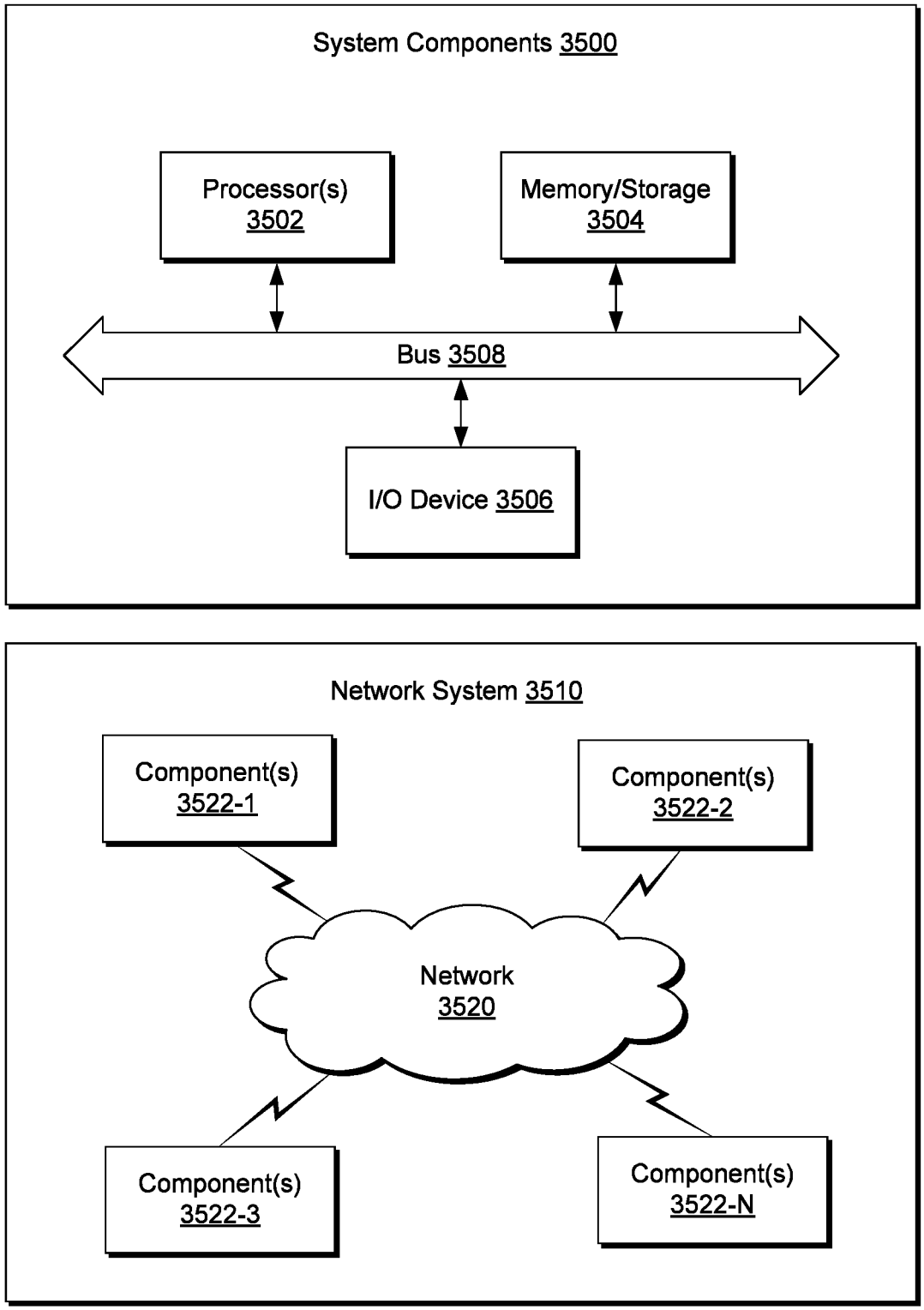
FIG. 35 illustrates example components of a system and a networked system.

FIG. 35 shows components of an example of a computing system 3500 and an example of a networked system 3510. The system 3500 includes one or more processors 3502, memory and/or storage components 3504, one or more input and/or output devices 3506 and a bus 3508. In an example embodiment, instructions may be stored in one or more computer-readable media (e.g., memory/storage components 3504). Such instructions may be read by one or more processors (e.g., the processor(s) 3502) via a communication bus (e.g., the bus 3508), which may be wired or wireless. The one or more processors may execute such instructions to implement (wholly or in part) one or more attributes (e.g., as part of a method). A user may view output from and interact with a process via an I/O device (e.g., the device 3506). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 3510. The network system 3510 includes components 3522-1, 3522-2, 3522-3, . . . 3522-N. For example, the components 3522-1 may include the processor(s) 3502 while the component(s) 3522-3 may include memory accessible by the processor(s) 3502. Further, the component(s) 3502-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
    accessing a trained machine model as trained to analyze digital seismic data of a region with respect to a structural feature of a geologic region;
    using the trained machine model to predict confidence values for the digital seismic data in relationship to the structural feature, wherein a higher confidence value indicates a more likely association between a portion of the digital seismic data and the structural feature; and
    based on the confidence values, generating results as indicative of spatial locations of the structural feature of the geologic region.

2. The method of claim 1 comprising training to generate the trained machine model wherein the training comprises:
    receiving a selected point for the digital seismic data of the geologic region as corresponding to the structural feature;
    extracting training data from the digital seismic data based on the selected point, wherein the training data comprises positive example training data and negative example training data; and
    performing machine learning of a machine model based on the training data to generate the trained machine model that, for a given input, predicts a confidence value for the given input in relationship to the structural feature.

3. The method of claim 1 comprising rendering a visualization that comprises at least one confidence indicator based at least in part on the confidence values.

4. The method of claim 1 wherein the digital seismic data comprise trace data specified with respect to time.

5. The method of claim 1 wherein the digital seismic data comprise trace data specified with respect to distance.

6. The method of claim 1 wherein the trained machine model comprises a trained kernel based model that is trained using positive example training data and negative example training data as to the structural feature to, for a given input, predict a confidence value for the given input in relationship to the structural feature.

7. The method of claim 6 wherein the trained kernel based model comprises radial basis functions that comprise heavy tails.

8. The method of claim 6 wherein the trained kernel based model comprises radial basis functions that comprise a decay term that decays with respect to a dimension wherein the dimension comprises a time dimension or a distance dimension.

9. The method of claim 1 wherein the trained machine model comprises a trained neural network model that is trained using positive example training data and negative example training data as to the structural feature to, for a given input, predict a confidence value for the given input in relationship to the structural feature.

10. The method of claim 1 wherein the digital seismic data comprise digital seismic data of a seismic cube.

11. The method of claim 10 wherein the results comprise a confidence cube that corresponds to at least a portion of the seismic cube.

12. The method of claim 11 comprising performing tracking on the confidence cube.

13. The method of claim 10 wherein using the trained machine model to predict confidence values comprises parallel processing that processes portions of the seismic cube in parallel with respect to the trained machine model to generate results for each of the portions of the seismic cube.

14. The method of claim 13 comprising performing tracking on at least one of the results for at least one corresponding portion of the seismic cube.

15. The method of claim 13 wherein the results comprise confidence sub-cubes.

16. The method of claim 1 comprising analyzing the confidence values via a confidence score threshold.

17. The method of claim 1 comprising analyzing a tracking process for the structural feature based at least on the confidence values to assess at least the quality of the tracking process; stopping the tracking process if the quality decreases below a threshold; and stopping the tracking process at a fault or jumping over the fault to continue the tracking process for the structural feature.

18. The method of claim 1 comprising rendering at least one graphical user interface to a display.

19. A system comprising:
a processor;
memory operatively coupled to the processor; and
processor-executable instructions stored in the memory to instruct the system to:
- access a trained machine model as trained to analyze digital seismic data of a region with respect to a structural feature of a geologic region;
- use the trained machine model to predict confidence values for the digital seismic data in relationship to the structural feature, wherein a higher confidence value indicates a more likely association between a portion of the digital seismic data and the structural feature; and
- based on the confidence values, generate results indicative of spatial locations of the structural feature of the geologic region.

20. One or more computer-readable storage media comprising computer-executable instructions executable to instruct a computing system to:
- access a trained machine model as trained to analyze digital seismic data of a region with respect to a structural feature of a geologic region;
- use the trained machine model to predict confidence values for the digital seismic data in relationship to the structural feature, wherein a higher confidence value indicates a more likely association between a portion of the digital seismic data and the structural feature; and
- based on the confidence values, generate results indicative of spatial locations of the structural feature of the geologic region.

* * * * *